(12) United States Patent
Lalancette et al.

(10) Patent No.: US 12,507,900 B2
(45) Date of Patent: Dec. 30, 2025

(54) PRESSURE BASED STRUCTURAL HEART ASSESSMENT SYSTEMS AND METHODS

(71) Applicant: OPSENS, INC., Quebec City (CA)

(72) Inventors: Sébastien Lalancette, Quebec City (CA); Thomas Goodhart, Calgery (CA); Maxime Picard Deland, Quebec City (CA); Claude Belleville, Quebec City (CA)

(73) Assignee: Opsens, Inc., Quebec City (CA)

( * ) Notice: Subject to any disclaimer, the term of this patent is extended or adjusted under 35 U.S.C. 154(b) by 1021 days.

(21) Appl. No.: 17/595,433

(22) PCT Filed: May 13, 2020

(86) PCT No.: PCT/US2020/032748
§ 371 (c)(1),
(2) Date: Nov. 16, 2021

(87) PCT Pub. No.: WO2020/236494
PCT Pub. Date: Nov. 26, 2020

(65) Prior Publication Data
US 2022/0361762 A1 Nov. 17, 2022

Related U.S. Application Data

(60) Provisional application No. 62/849,806, filed on May 17, 2019, provisional application No. 62/849,798, (Continued)

(51) Int. Cl.
 *A61B 5/0215* (2006.01)
 *A61B 5/00* (2006.01)
 *A61F 2/24* (2006.01)

(52) U.S. Cl.
 CPC ...... *A61B 5/02156* (2013.01); *A61B 5/02158* (2013.01); *A61B 5/6851* (2013.01); *A61F 2/2427* (2013.01); *A61B 2505/05* (2013.01)

(58) Field of Classification Search
 CPC .................................................... A61B 5/021
 See application file for complete search history.

(56) References Cited

U.S. PATENT DOCUMENTS

| 4,678,904 A | 7/1987 | Saaski et al. |
| 5,385,053 A | 1/1995 | Wlodarczyk et al. |

(Continued)

FOREIGN PATENT DOCUMENTS

| CA | 3 021 877 | 12/2018 |
| EP | 2 744 401 | 10/2016 |

(Continued)

OTHER PUBLICATIONS

510(k) Summary, Florence Medical Ltd., SmartFlowTM, 510(k( No. K012947, Oct. 2, 2001.

(Continued)

*Primary Examiner* — Charles A Marmor, II
(74) *Attorney, Agent, or Firm* — Knobbe, Martens, Olson & Bear, LLP

(57) ABSTRACT

The heart valve assessment systems described herein advantageously provide indicators of a heart valve condition, such as a pressure gradient or a valve regurgitation index. The heart valve assessment systems can provide indicators of a heart valve condition during a heart procedure. A pressure gradient indicates a severity or measurement of the narrowing (or stenosis) of a valve by the increase in pressure behind it. A valve regurgitation index indicates a leakiness measurement of a valve.

13 Claims, 40 Drawing Sheets

Related U.S. Application Data filed on May 17, 2019, provisional application No. 62/849,768, filed on May 17, 2019.

(56) References Cited

U.S. PATENT DOCUMENTS

| | | |
|---|---|---|
| 5,406,952 A | 4/1995 | Barnes et al. |
| 6,004,275 A | 12/1999 | Billiet |
| D420,340 S | 2/2000 | Baller |
| D441,761 S | 5/2001 | Machida et al. |
| 6,354,999 B1 | 3/2002 | Dgany et al. |
| 6,394,958 B1 | 5/2002 | Bratteli et al. |
| 6,471,656 B1 | 10/2002 | Shalman et al. |
| 6,565,514 B2 | 5/2003 | Svanerudh et al. |
| 7,759,633 B2 | 7/2010 | Duplain et al. |
| D644,240 S | 8/2011 | Arnold |
| D652,048 S | 1/2012 | Joseph |
| D674,401 S | 1/2013 | Trumble et al. |
| D674,812 S | 1/2013 | Joseph |
| D677,274 S | 3/2013 | Phelan |
| D678,302 S | 3/2013 | Trumble et al. |
| D682,846 S | 5/2013 | Cojuangco et al. |
| D685,391 S | 7/2013 | Blissenbach |
| D694,252 S | 11/2013 | Helm |
| D694,253 S | 11/2013 | Helm |
| D713,854 S | 9/2014 | Cojuangco et al. |
| D714,327 S | 9/2014 | Wood |
| D716,820 S | 11/2014 | Wood |
| D717,328 S | 11/2014 | Lin |
| D733,727 S | 7/2015 | Cojuangco et al. |
| D753,173 S | 4/2016 | Cojuangco et al. |
| 9,339,348 B2 | 5/2016 | Davies et al. |
| 9,364,153 B2 | 6/2016 | Merritt et al. |
| D763,284 S | 8/2016 | Edman |
| D773,478 S | 12/2016 | Wesley et al. |
| D775,650 S | 1/2017 | Zhao et al. |
| D786,921 S | 5/2017 | Akana et al. |
| D800,757 S | 10/2017 | Mullen |
| D802,001 S | 11/2017 | Javed et al. |
| 9,820,660 B2 | 11/2017 | Ryan et al. |
| D808,982 S | 1/2018 | Kavanagh et al. |
| 9,855,020 B2 | 1/2018 | Nair et al. |
| 9,901,260 B2 | 2/2018 | Manstrom et al. |
| 9,924,903 B2 | 3/2018 | Burkett |
| 9,974,443 B2 | 5/2018 | Merritt et al. |
| 10,076,301 B2 | 9/2018 | Millett et al. |
| 10,098,702 B2 | 10/2018 | Merritt et al. |
| 10,130,310 B2 | 11/2018 | Alpert et al. |
| D837,235 S | 1/2019 | Meng |
| 10,195,441 B2 | 2/2019 | Kaiser et al. |
| 10,226,189 B2 | 3/2019 | Davies et al. |
| D844,651 S | 4/2019 | Edman |
| 10,327,695 B2 | 6/2019 | Anderson |
| 10,363,017 B2 | 7/2019 | Strommer |
| 10,409,951 B2 | 9/2019 | Mansker et al. |
| D864,221 S | 10/2019 | Paulina et al. |
| 10,453,561 B2 | 10/2019 | Balignasay et al. |
| 10,456,051 B2 | 10/2019 | Corl et al. |
| 10,552,958 B2 | 2/2020 | Hansis et al. |
| 10,568,585 B2 | 2/2020 | Anderson et al. |
| 10,638,939 B2 | 5/2020 | Collins et al. |
| 10,642,953 B2 | 5/2020 | Cheline et al. |
| 10,660,769 B2 | 5/2020 | Keller |
| D887,420 S | 6/2020 | Koehler et al. |
| 10,667,775 B2 | 6/2020 | Anderson et al. |
| 10,694,955 B2 | 6/2020 | Haase et al. |
| D890,787 S | 7/2020 | Wenning |
| 10,751,015 B2 | 8/2020 | Anderson et al. |
| D899,440 S | 10/2020 | Schifano et al. |
| D921,003 S | 6/2021 | Lalancette et al. |
| D921,648 S | 6/2021 | Lalancette et al. |
| D924,910 S | 7/2021 | Laumann et al. |
| D926,199 S | 7/2021 | Lalancette et al. |
| D926,802 S | 8/2021 | Lee et al. |
| D934,884 S | 11/2021 | Bergenstal et al. |
| D936,690 S | 11/2021 | Griffin et al. |
| D937,876 S | 12/2021 | Harvey |
| D937,877 S | 12/2021 | Harvey |
| D939,540 S | 12/2021 | Mullen et al. |
| D948,542 S | 4/2022 | Yuan et al. |
| 11,323,434 B1 | 5/2022 | Vali et al. |
| D956,786 S | 7/2022 | Yang |
| D990,508 S | 6/2023 | Martinez Galan et al. |
| D1,018,557 S | 3/2024 | Lalancette et al. |
| 2003/0032986 A1 | 2/2003 | Kupper |
| 2003/0191400 A1 | 10/2003 | Shalman et al. |
| 2010/0312125 A1 | 12/2010 | Zhang |
| 2011/0257697 A1 | 10/2011 | Jarverud |
| 2013/0345574 A1 | 12/2013 | Davies et al. |
| 2014/0018687 A1 | 1/2014 | Mano |
| 2014/0135633 A1 | 5/2014 | Anderson et al. |
| 2014/0282256 A1 | 9/2014 | Fish et al. |
| 2015/0077502 A1 | 3/2015 | Jordan et al. |
| 2015/0105673 A1 | 4/2015 | Gregorich |
| 2015/0112210 A1 | 4/2015 | Webler |
| 2015/0119705 A1 | 4/2015 | Tochterman et al. |
| 2015/0223707 A1 | 8/2015 | Ludoph |
| 2015/0230713 A1 | 8/2015 | Merritt et al. |
| 2016/0000341 A1 | 1/2016 | Rotman et al. |
| 2016/0022159 A1 | 1/2016 | Caron et al. |
| 2016/0058307 A1 | 3/2016 | Svanerudh |
| 2016/0128583 A1 | 5/2016 | Caron et al. |
| 2016/0206214 A1 | 7/2016 | Davies et al. |
| 2016/0228013 A1 | 8/2016 | Al-Jilaihawi et al. |
| 2016/0310026 A1 | 10/2016 | Moen et al. |
| 2016/0346449 A1 | 12/2016 | Roche et al. |
| 2017/0027458 A1 | 2/2017 | Glover et al. |
| 2017/0071486 A1 | 3/2017 | Belleville et al. |
| 2017/0242935 A1 | 8/2017 | Wragg et al. |
| 2017/0322416 A1 | 11/2017 | Oserhout |
| 2018/0020929 A1 | 1/2018 | Gregorich |
| 2018/0042555 A1 | 2/2018 | Braido et al. |
| 2018/0103854 A1 | 4/2018 | Manstrom et al. |
| 2018/0116751 A1 | 5/2018 | Schwartz et al. |
| 2018/0228387 A1 | 8/2018 | Park et al. |
| 2018/0280088 A1 | 10/2018 | Davies |
| 2019/0038144 A1 | 2/2019 | Li |
| 2019/0053717 A1 | 2/2019 | Gu et al. |
| 2019/0069783 A1 | 3/2019 | Bullens et al. |
| 2019/0082978 A1 | 3/2019 | van der Horst et al. |
| 2019/0265802 A1 | 8/2019 | Parshionikar |
| 2019/0269335 A1 | 9/2019 | Groenland et al. |
| 2019/0274565 A1 | 9/2019 | Soli et al. |
| 2019/0320913 A1 | 10/2019 | Li |
| 2020/0022604 A1 | 1/2020 | Scabellone et al. |
| 2020/0035472 A1 | 1/2020 | Richardson et al. |
| 2020/0043608 A1 | 2/2020 | Kuo et al. |
| 2020/0178816 A1 * | 6/2020 | Lantelm ............... A61B 5/7235 |
| 2020/0289078 A1 | 9/2020 | Haase et al. |
| 2020/0363939 A1 | 11/2020 | Fitzgerald |
| 2021/0093208 A1 | 4/2021 | Tochterman et al. |
| 2021/0100462 A1 | 4/2021 | Belleville et al. |

FOREIGN PATENT DOCUMENTS

| | | |
|---|---|---|
| JP | 2015-501184 | 1/2015 |
| JP | 2017-504415 | 2/2017 |
| JP | 2018-531645 | 11/2018 |
| JP | 2018-536454 | 12/2018 |
| WO | WO 1999/034724 | 7/1999 |
| WO | WO 1999/056612 | 11/1999 |
| WO | WO 2000/035342 | 6/2000 |
| WO | WO 2000/039275 | 7/2000 |
| WO | WO 2000/053081 | 9/2000 |
| WO | WO 2000/055579 | 9/2000 |
| WO | WO 2001/013779 | 3/2001 |
| WO | WO 2001/021057 | 3/2001 |
| WO | WO 2002/032300 | 4/2002 |
| WO | WO 2002/100238 | 12/2002 |
| WO | WO 2003/022122 | 3/2003 |
| WO | WO 2004/019778 | 3/2004 |
| WO | WO 2013/028612 | 2/2013 |
| WO | WO 2013/028613 | 2/2013 |
| WO | WO 2015/109339 | 7/2015 |
| WO | WO 2017/013020 | 1/2017 |

(56) References Cited

FOREIGN PATENT DOCUMENTS

| WO | WO2017/087642 A1 | 5/2017 |
|----|------------------|--------|
| WO | WO 2020/148162 | 7/2020 |
| WO | WO 2020/236494 | 11/2020 |
| WO | WO 2023/183260 | 9/2023 |

OTHER PUBLICATIONS

510(k) Summary, Florence Medical Ltd., SmartFlow®, 510(k( No. K020127, Feb. 14, 2002.
Patel et al., "Hemodynamic Assessment of Aortic/Mitral Stenosis and Regurgitation", Practical Manual of Interventional Cardiology, Oct. 27, 2014, (Retrieved from the Internet Nov. 3, 2020). Internet URL: <https://link.springer.com/chapter/10.1007/978-1-4471-6581-1_12> (Year: 2014).
Pijls, "Coronary Physiology In The Cathlab: Theory and Practical Set-up of FFR", Educational Training Program ESC, European Heart House, Apr. 24-26, 2014, in 150 pages.
Pijls et al., "Coronary Pressure Measurement to Assess the Hemodynamic Significance of Serial Stenoses Within One Coronary Artery", Circulation, Nov. 7, 2000, vol. 120, pp. 2371-2377.
Radianalyzer, Instrument for Physiological Assessment, Instructions for Use, 2004, in 39 pages.
Radianalyzerxpress, Interface for Physiological Assessment, Instructions for Use, 2004, in 46 pages.
Shalman et al., "Numerical modeling of the flow in stenosed coronary artery. The relationship between main hemodynamic parameters", Computers in Biology and Medicine, 2002, vol. 32, pp. 329-344.
Smartflowtm, Intergrated Lumen Physiology for the Cathlab, Smartflow CFR/FFRTM, Model 2000, Version 5.0, CFR/FFR, 2001.
Smartflowtm, Intergrated Lumen Physiology, Version 5.0, Operator's Manual, Apr. 2001, in 42 pages.
Ballinger, "What do normal and abnormal heart rhythms look like on Apple Watch?", Cardiogram, published May 31, 2016 (Retrieved from the internet Mar. 3, 2021. Internet URL: <https://blog.cardiogr.am/what-do-normal-and-abnormal-heart-rhythms-look-like-on-apple-watch-7b33b4a8ecfa> (Year: 2016).
"BitScope Chart Recorder", BitScope, Published Jul. 18, 2018 (Retrieved from the Internet Jul. 20, 2023. Internet URL: ,https://web.archive.org/web/20180718231406/https://bitscope.com/softwarechart/> (Year: 2018).
Mylotte et al., "Paravalvular aortic regurgitation after TAVI: new insight", Europa Digital & Publishing, 2015, pp. 371-372.
Stundl et al., "Early versus newer generation transcatheter heart valves for transcatheter aortic valve implantation: Echocardiographic and hemodynamic evaluation of an all-comers study cohort using the dimensionless aortic regurgitation index (AR-index)", https://journals.plos.org/plosone/article?id=10.1371/journal.pone.0217544, published May 31, 2019, in 10 pages.
Valsalva Wave. Coherent Breathing Biofeedback, published Jun. 2016 (Retrieved from the Internet Mar. 3, 2021). Internet URL:<https://coherentbreathingbiofeedback.com/valsalvawave.html>(Year: 2016).
Van Wely et al., "Aortic Regurgitation Index Ratio Is a Strong Predictor of 1-Year Mortality After Transcatheter Aortic Valve Implantation Using Self-Expanding Devices", Semin Thoracic Surg., 2020, vol. 33, pp. 923-930.
International Search Report and Written Opinion issued in PCT Application No. PCT/US2020/032748, dated Sep. 24, 2020, in 23 pages.

\* cited by examiner

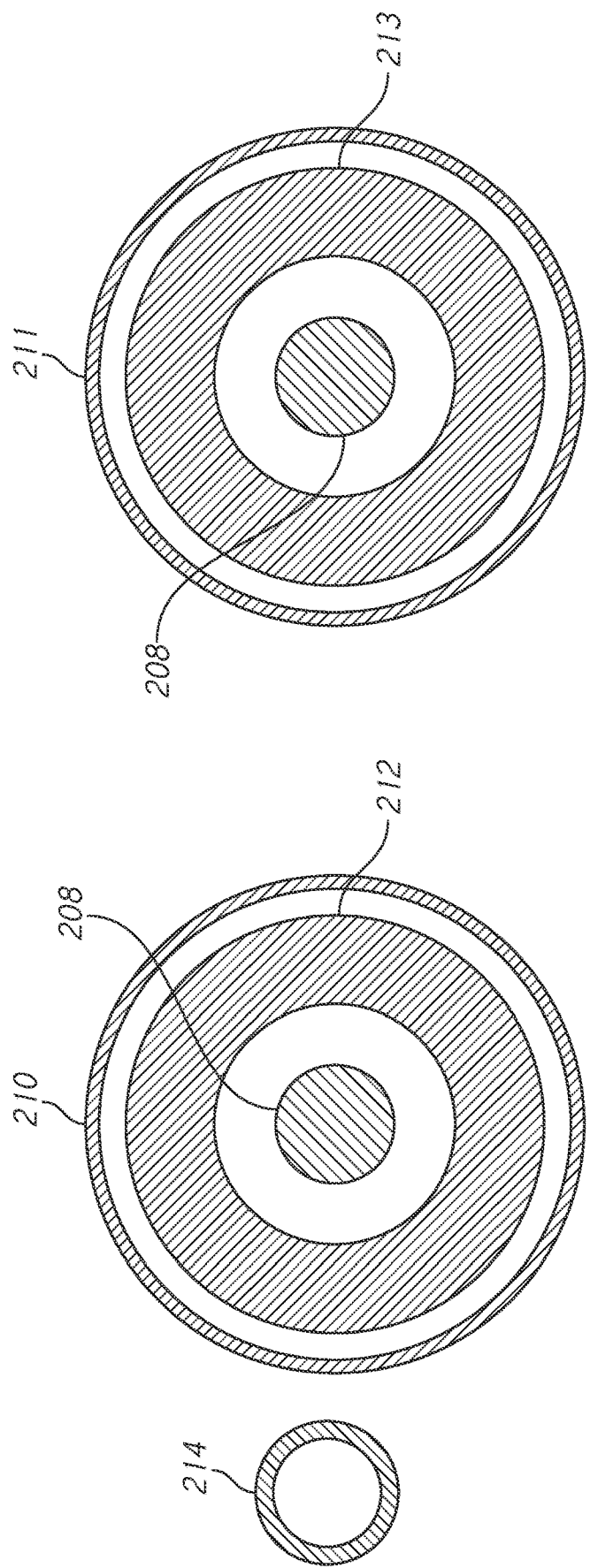

PRESSURE BASED STRUCTURAL HEART ASSESSMENT SYSTEMS AND METHODS

INCORPORATION BY REFERENCE TO ANY PRIORITY APPLICATIONS

This application claims benefit of U.S. Provisional Patent Application Ser. No. 62/849,768 entitled "Pressure Sensing Guidewires, Systems and Methods for Structural Heart Procedures" filed May 17, 2019, U.S. Provisional Patent Application Ser. No. 62/849,806 entitled "Heart Valve Assessment Systems and User Interfaces" filed May 17, 2019, and U.S. Provisional Patent Application Ser. No. 62/849,798 entitled "Pressure Based Structural Heart Assessment Systems and Methods" filed May 17, 2019, each of which are hereby incorporated by reference in their entireties.

BACKGROUND

Field

This application is directed to devices, user interfaces, algorithms, and systems associated with a structural heart guidewire that is configured to sense blood pressure to provide information about blood flow through a heart valve before, during and/or immediately after a structural heart procedure.

Description of the Related Art

Guidewires are known for delivering catheters to many vascular locations in the body. Access to vascular locations is facilitated by a combination of mechanical properties such as flexibility, pushability and torqueability. It is known for coronary procedures to include a pressure sensor to enable a measure of blood flow through a static occlusion to help a cardiologist determine whether to treat a patient.

While pressure sensing around static lesions in coronary vessels is known such concepts have not been applied to structural heart procedures, such as for treatment of heart valves and improving heart pumping function. Pumping function has been addressed with mechanical pumps of various sorts. Heart valves have historically been treated by open heart surgery. Presently, however, heart valves are more and more replaced by cardiologists using catheters upon which percutaneous heart valves are mounted and by which such valves are delivered.

SUMMARY

For purposes of summarizing the disclosure, certain aspects, advantages and novel features are discussed herein. It is to be understood that not necessarily all such aspects, advantages or features will be embodied in any particular embodiment of the invention and an artisan would recognize from the disclosure herein a myriad of combinations of such aspects, advantages or features.

According to an embodiment, a method for determining a heart valve condition during deployment of a replacement heart valve is disclosed comprising: calibrating a second pressure sensor relative to a first pressure sensor while both sensors are positioned in a heart; determining a first plurality of pressure values from a first pressure sensor positioned in a first portion of the heart; determining a second plurality of pressure values from the second pressure sensor positioned in a cardiovascular region adjacent to the first portion of the heart; adjusting the second plurality of pressure values based at least in part on the calibrating; detecting a first feature in the first plurality of pressure values; detecting a second feature in the adjusted plurality of pressure values; determining a heart valve condition based at least in part on the first feature and the second feature; and displaying the heart valve condition on a user interface.

According to an aspect, calibrating the second pressure sensor relative to the first pressure sensor may further comprise: receiving a first calibration pressure value corresponding to a first calibration signal received from the first pressure sensor measuring a first cardiovascular region; receiving a second calibration pressure value corresponding to a second calibration signal received from the second pressure sensor measuring the first cardiovascular region; and calculating a calibration parameter based at least in part on the first calibration pressure value and the second calibration pressure value, wherein adjusting the second plurality of pressure values further comprises applying the calibration parameter to the second plurality of pressure values.

According to another aspect, receiving the first calibration pressure value may further comprise receiving a first plurality of calibration pressure values, the first plurality of calibration pressure values may comprise the first calibration pressure value, the first plurality of calibration pressure values can correspond to a first vector, receiving the second calibration pressure value may further comprise receiving a second plurality of calibration pressure values, the second plurality of calibration pressure values may comprise the second calibration pressure value, the second plurality of calibration pressure values can correspond to a second vector, and wherein calculating the calibration parameter may further comprises determining a linear fit between the first vector and the second vector.

According to yet another aspect, the first vector can correspond to $[P_1]$, the second vector can correspond to $[P_2]$, the calibration parameter may comprise K and b, and wherein determining the linear fit comprises a determining relationship substantially as:

$$[P_1] = K \cdot [P_2] + b.$$

According to yet another aspect, the first feature may comprise at least one of a first systolic phase or a first diastolic phase in the first plurality of pressure values.

According to yet another aspect, detecting the at least one of the first systolic phase or the first diastolic phase may further comprise: detecting a first dicrotic notch feature in the first plurality of pressure values; and identifying the at least one of the first systolic phase or the first diastolic phase according to the first dicrotic notch feature.

According to yet another aspect, detecting the first dicrotic notch feature may further comprise: calculating a plurality of second derivative values from the first plurality of pressure values; and identifying a point of zero crossing based at least in part on the plurality of second derivative values, wherein the point of zero crossing corresponds to the first dicrotic notch feature.

According to yet another aspect, detecting the first dicrotic notch feature may further comprise: calculating, from the first plurality of pressure values, a first angle for a first point based at least in part on a first preceding point and a first following point; calculating, from the first plurality of pressure values, a second angle for a second point based at least in part on a second preceding point and a second following point; determining that the second angle is less than the first angle; and identifying the second point as the first dicrotic notch feature.

According to yet another aspect, the second feature may comprise at least one of a second systolic phase or a second diastolic phase in the adjusted plurality of pressure values.

According to yet another aspect, the heart valve condition may comprise a regurgitation index, and determining the heart valve condition may further comprise: calculating the regurgitation index based at least in part on: a first subset of the first plurality of pressure values according to the at least one of the first systolic phase or the first diastolic phase; and a second subset of adjusted plurality of pressure values according to the at least one second systolic phase or the second diastolic phase.

According to yet another aspect, the heart valve condition may comprise a gradient value, and wherein determining the heart valve condition may further comprise: calculating the gradient value based at least in part on a difference between: a first subset of the first plurality of pressure values during the first systolic phase; and a second subset of adjusted plurality of pressure values during second systolic phase.

According to yet another aspect, detecting the at least one of the first systolic phase or the first diastolic phase may further comprise: identifying a first subset of rising pressure values from the first plurality of pressure values; identifying a local minimum pressure value from the first plurality of pressure values; determining a tangent from the first subset; identifying a horizontal line intersecting the local minimum pressure value; identifying a first intersection between the tangent and the horizontal line; and identifying a first point from the first plurality of pressure values as an end of the first diastolic phase or a beginning of the first systolic phase based at least in part on the first intersection.

According to yet another aspect, identifying the first point may further comprise: adjusting the first intersection by a predetermined time period.

According to yet another aspect, the predetermined time period may comprise approximately 60 milliseconds.

According to yet another aspect, the predetermined time period may comprise between approximately 40 milliseconds and approximately 100 milliseconds.

According to yet another aspect, identifying the first point may further comprise: adjusting the first intersection by a percentage of a heartbeat period.

According to yet another aspect, the percentage may comprise between approximately 8 percent and 12 percent of the heartbeat period.

According to yet another aspect, the percentage may comprise between approximately 5 percent and 8 percent of the heartbeat period.

According to yet another aspect, calibrating the second pressure sensor relative to the first pressure sensor may occur while (i) the first pressure sensor is positioned in the first portion of the heart and (ii) the second pressure sensor is positioned in the cardiovascular region adjacent to the first portion of the heart.

According to yet another aspect, calibrating the second pressure sensor relative to the first pressure sensor may further comprise: determining a third plurality of pressure values from the first pressure sensor positioned in the first portion of the heart; determining a fourth plurality of pressure values from the second pressure sensor in the cardiovascular region adjacent to the first portion of the heart; detecting a value at a substantially beginning of a systolic phase in the third plurality of pressure values; and calculating a time adjustment to the fourth plurality of pressure values such that a value from the fourth plurality of pressure values corresponds to the value at the substantially beginning of the systolic phase in the third plurality of pressure values, wherein adjusting the second plurality of pressure values further comprises applying the time adjustment to the second plurality of pressure values.

According to yet another aspect, calibrating the second pressure sensor relative to the first pressure sensor may further comprise: detecting a dicrotic notch feature in the third plurality of pressure values; identifying a timestamp corresponding to the dicrotic notch feature; determining, from the third plurality of pressure values, a first value at the timestamp; determining, from the fourth plurality of pressure values, a second value at the timestamp; and calculating a gain adjustment based at least in part on the first value and the second value, wherein adjusting the second plurality of pressure values further comprises applying the gain adjustment to the second plurality of pressure values.

According to yet another aspect, calibrating the second pressure sensor relative to the first pressure sensor may further comprise: determining a third plurality of pressure values from the first pressure sensor positioned in the first portion of the heart; determining a fourth plurality of pressure values from the second pressure sensor in the cardiovascular region adjacent to the first portion of the heart; detecting a value at a substantially beginning of a systolic phase in the third plurality of pressure values; calculating a time adjustment to the fourth plurality of pressure values such that a value from the fourth plurality of pressure values corresponds to the value at the substantially beginning of the systolic phase in the third plurality of pressure values; detecting a dicrotic notch feature in the third plurality of pressure values; identifying a timestamp corresponding to the dicrotic notch feature; determining, from the third plurality of pressure values, a first value at the timestamp; determining, from the fourth plurality of pressure values and the time adjustment, a second value at the timestamp; and calculating a gain adjustment based at least in part on the first value and the second value, wherein adjusting the second plurality of pressure values further comprises applying the time adjustment and the gain adjustment to the second plurality of pressure values.

According to yet another aspect, calibrating the second pressure sensor relative to the first pressure sensor may further comprise: identifying the substantially beginning of the systolic phase within a percentage of a heartbeat period before or after an end of a diastolic phase in the third plurality of pressure values. According to yet another aspect, the percentage may comprise between approximately 0 percent and 1 percent of the heartbeat period. According to yet another aspect, the percentage may comprise between approximately 0 percent and 2 percent of the heartbeat period. According to yet another aspect, the percentage may comprise between approximately 0 percent and 5 percent of the heartbeat period. According to yet another aspect, the percentage may comprise between approximately 0 percent and 10 percent of the heartbeat period.

According to yet another aspect, identifying the timestamp corresponding to the dicrotic notch feature may further comprise: identifying the timestamp within a percentage of a heartbeat period before or after the dicrotic notch in the third plurality of pressure values. According to yet another aspect, the percentage may comprise between approximately 0 percent and 1 percent of the heartbeat period. According to yet another aspect, the percentage may comprise between approximately 0 percent and 2 percent of the heartbeat period. According to yet another aspect, the percentage may comprise between approximately 0 percent and 5 percent of the heartbeat period. According to yet another aspect, the percentage may comprise between approximately 0 percent and 10 percent of the heartbeat period.

According to yet another aspect, the first value may correspond to $V_1$, the second value may correspond to $V_2$, the gain adjustment may correspondg, and wherein calculating the gain adjustment may further comprise a determining relationship substantially as:

$$g = \frac{V_1}{V_2}.$$

According to another embodiment, a system is disclosed comprising: a non-transitory computer storage medium configured to at least store computer-executable instructions; and one or more hardware processors in communication with the non-transitory computer storage medium, the one or more hardware processors configured to execute the computer-executable instructions to at least: determine a first plurality of pressure values from a first pressure sensor positioned in a first portion of a heart; determine a second plurality of pressure values from a second pressure sensor positioned in a cardiovascular region adjacent to the first portion of the heart; detect a first feature in the first plurality of pressure values; detect a second feature in the second plurality of pressure values; determine a heart valve condition based at least in part on the first feature and the second feature; and display the heart valve condition on a user interface.

According to an aspect, the one or more hardware processors may be further configured to: calibrate the second pressure sensor relative to the first pressure sensor while both sensors are positioned in the heart.

According to another aspect, to calibrate the second pressure sensor relative to the first pressure sensor may further comprise: receive a first calibration pressure value corresponding to a first calibration signal received from the first pressure sensor measuring a first cardiovascular region; receive a second calibration pressure value corresponding to a second calibration signal received from the second pressure sensor measuring the first cardiovascular region; and calculate a calibration parameter based at least in part on the first calibration pressure value and the second calibration pressure value, wherein to determine the second plurality of pressure values further comprises: apply the calibration parameter to an initial plurality of pressure values.

According to yet another aspect, to receive the first calibration pressure value may further comprise: receive a first plurality of calibration pressure values, the first plurality of calibration pressure values comprises the first calibration pressure value, the first plurality of calibration pressure values corresponding to a first vector, wherein to receive the second calibration pressure value further comprises: receive a second plurality of calibration pressure values, the second plurality of calibration pressure values comprises the second calibration pressure value, the second plurality of calibration pressure values corresponding to a second vector, and wherein to calculate the calibration parameter further comprises: determine a linear fit between the first vector and the second vector.

According to yet another aspect, to calibrate the second pressure sensor relative to the first pressure sensor may occur while (i) the first pressure sensor is positioned in the first portion of the heart and (ii) the second pressure sensor is positioned in the cardiovascular region adjacent to the first portion of the heart.

According to yet another aspect, to calibrate the second pressure sensor relative to the first pressure sensor may further comprise: determine a third plurality of pressure values from the first pressure sensor positioned in the first portion of the heart; determine a fourth plurality of pressure values from the second pressure sensor in the cardiovascular region adjacent to the first portion of the heart; detect a value at a substantially beginning of a systolic phase in the third plurality of pressure values; and calculate a time adjustment to the fourth plurality of pressure values such that a value from the fourth plurality of pressure values corresponds to the value at the substantially beginning of the systolic phase in the third plurality of pressure values, wherein to determine the second plurality of pressure values further comprises: apply the time adjustment to an initial plurality of pressure values.

According to yet another aspect, to calibrate the second pressure sensor relative to the first pressure sensor may further comprise: detect a dicrotic notch feature in the third plurality of pressure values; identify a timestamp corresponding to the dicrotic notch feature; determine, from the third plurality of pressure values, a first value at the timestamp; determine, from the fourth plurality of pressure values, a second value at the timestamp; and calculate a gain adjustment based at least in part on the first value and the second value, wherein to determine the second plurality of pressure values further comprises: apply the gain adjustment to an initial plurality of pressure values.

According to yet another aspect, to calibrate the second pressure sensor relative to the first pressure sensor may further comprise: determine a third plurality of pressure values from the first pressure sensor positioned in the first portion of the heart; determine a fourth plurality of pressure values from the second pressure sensor in the cardiovascular region adjacent to the first portion of the heart; detect a value at a substantially beginning of a systolic phase in the third plurality of pressure values; calculate a time adjustment to the fourth plurality of pressure values such that a value from the fourth plurality of pressure values corresponds to the value at the substantially beginning of the systolic phase in the third plurality of pressure values; detect a dicrotic notch feature in the third plurality of pressure values; identify a timestamp corresponding to the dicrotic notch feature; determine, from the third plurality of pressure values, a first value at the timestamp; determine, from the fourth plurality of pressure values and the time adjustment, a second value at the timestamp; and calculate a gain adjustment based at least in part on the first value and the second value, wherein to determine the second plurality of pressure values further comprises: apply the time adjustment and the gain adjustment to an initial plurality of pressure values.

According to yet another aspect, to calibrate the second pressure sensor relative to the first pressure sensor may further comprise: identify the substantially beginning of a systolic phase within a percentage of a heartbeat period before or after an end of a diastolic phase in the third plurality of pressure values. According to yet another aspect, the percentage may comprise between approximately 0 percent and 1 percent of the heartbeat period. According to yet another aspect, the percentage may comprise between approximately 0 percent and 2 percent of the heartbeat period. According to yet another aspect, the percentage may comprise between approximately 0 percent and 5 percent of the heartbeat period. According to yet another aspect, the percentage may comprise between approximately 0 percent and 10 percent of the heartbeat period.

According to yet another aspect, to identify the timestamp corresponding to the dicrotic notch feature may further comprise: identify the timestamp within a percentage of a heartbeat period before or after the dicrotic notch in the third plurality of pressure values. According to yet another aspect, the percentage may comprise between approximately 0 percent and 1 percent of the heartbeat period. According to yet another aspect, the percentage may comprise between approximately 0 percent and 2 percent of the heartbeat period. According to yet another aspect, the percentage may comprise between approximately 0 percent and 5 percent of the heartbeat period. According to yet another aspect, the percentage may comprise between approximately 0 percent and 10 percent of the heartbeat period.

According to yet another aspect, the first value may correspond to $V_1$, the second value may correspond to $V_2$, the gain adjustment may comprise g, and to calculate the gain adjustment may further comprise a determining relationship substantially as:

$$g = \frac{V_1}{V_2}.$$

According to yet another aspect, the first feature may comprise at least one of a first systolic phase or a first diastolic phase in the first plurality of pressure values.

According to yet another aspect, to detect the at least one of the first systolic phase or the first diastolic phase may further comprise: detect a first dicrotic notch feature in the first plurality of pressure values; and identify the at least one of the first systolic phase or the first diastolic phase according to the first dicrotic notch feature.

According to yet another aspect, to detect the first dicrotic notch feature may further comprises: calculate a plurality of second derivative values from the first plurality of pressure values; and identify a point of zero crossing based at least in part on the plurality of second derivative values, wherein the point of zero crossing corresponds to the first dicrotic notch feature.

According to yet another aspect, to detect the first dicrotic notch feature may further comprise: calculate, from the first plurality of pressure values, a first angle for a first point based at least in part on a first preceding point and a first following point; calculate, from the first plurality of pressure values, a second angle for a second point based at least in part on a second preceding point and a second following point; and determine that the second angle is less than the first angle; and identify the second point as the first dicrotic notch feature.

According to yet another aspect, the second feature may comprise at least one of a second systolic phase or a second diastolic phase in the adjusted plurality of pressure values.

According to yet another aspect, the heart valve condition may comprise a regurgitation index, and wherein to determine the heart valve condition may further comprise: calculate the regurgitation index based at least in part on: a first subset of the first plurality of pressure values according to the at least one of the first systolic phase or the first diastolic phase; and a second subset of adjusted plurality of pressure values according to the at least one second systolic phase or the second diastolic phase.

According to yet another aspect, the heart valve condition may comprise a gradient value, and wherein to determine the heart valve condition may further comprise: calculate the gradient value based at least in part on a difference between: a first subset of the first plurality of pressure values during the first systolic phase; and a second subset of adjusted plurality of pressure values during second systolic phase.

According to yet another aspect, to detect the at least one of the first systolic phase or the first diastolic phase may further comprise: identify a first subset of rising pressure values from the first plurality of pressure values; identify a local minimum pressure value from the first plurality of pressure values; determine a tangent from the first subset; identify a horizontal line intersecting the local minimum pressure value; identify a first intersection between the tangent and the horizontal line; and identify a first point from the first plurality of pressure values as an end of the first diastolic phase or a beginning of the first systolic phase based at least in part on the first intersection.

According to yet another aspect, to identify the first point may further comprise: adjust the first intersection by a predetermined time period. According to yet another aspect, the predetermined time period may comprise approximately 60 milliseconds. According to yet another aspect, the predetermined time period may comprise between approximately 40 milliseconds and approximately 100 milliseconds.

According to yet another aspect, to identify the first point may further comprise: adjust the first intersection by a percentage of a heartbeat period. According to yet another aspect, the percentage may comprise between approximately 8 percent and 12 percent of the heartbeat period. According to yet another aspect, the percentage may comprise between approximately 5 percent and 8 percent of the heartbeat period.

According to yet another embodiment, a system is disclosed comprising: a pressure guidewire configured to be positioned at a first cardiovascular region; a second pressure sensing device configured to be positioned at a second cardiovascular region adjacent to the first cardiovascular region; and one or more hardware processors configured to at least: determine a first plurality of pressure values from the pressure guidewire; determine a second plurality of pressure values from the second pressure sensing device; and detect a first feature in the first plurality of pressure values; detect a second feature in the second plurality of pressure values; determine a heart valve condition based at least in part on the first feature and the second feature; and display the heart valve condition on a user interface.

According to an aspect, wherein the one or more hardware processors are further configured to: calibrate one of the pressure guidewire or the second pressure sensing device relative to the other one of the pressure guidewire or the second pressure sensing device while both the pressure guidewire or the second pressure sensing device are positioned in a same cardiovascular region.

According to another aspect, to calibrate one of the pressure guidewire or the second pressure sensing device may further comprise: receive a first calibration pressure value corresponding to a first calibration signal received from the pressure guidewire measuring the first cardiovascular region; receive a second calibration pressure value corresponding to a second calibration signal received from the second pressure sensing device measuring the first cardiovascular region; and calculate a calibration parameter based at least in part on the first calibration pressure value and the second calibration pressure value, wherein to determine the second plurality of pressure values further comprises: apply the calibration parameter to an initial plurality of pressure values.

According to yet another aspect, to receive the first calibration pressure value may further comprise: receive a first plurality of calibration pressure values, the first plurality of calibration pressure values comprises the first calibration pressure value, the first plurality of calibration pressure values corresponding to a first vector, to receive the second calibration pressure value may further comprise: receive a second plurality of calibration pressure values, the second plurality of calibration pressure values comprises the second calibration pressure value, the second plurality of calibration pressure values corresponding to a second vector, and wherein to calculate the calibration parameter further comprises: determine a linear fit between the first vector and the second vector.

According to yet another embodiment, a method for determining a heart valve condition during deployment of a replacement heart valve is disclosed comprising: detecting a first feature from a first plurality of pressure values responsive to measurements by a first pressure sensor positioned in a first portion of a heart; detecting a second feature from a second plurality of pressure values responsive to measurements by a second sensor positioned in a cardiovascular region adjacent to the first portion of the heart; determining a heart valve condition based at least in part on the first feature and the second feature; and displaying the heart valve condition on a user interface.

According to yet another embodiment a method for calibrating pressure waveforms used for determining a heart valve condition during deployment of a replacement heart valve is disclosed comprising: receiving a first calibration pressure value corresponding to a first calibration signal received from a first pressure sensor measuring a first cardiovascular region; receiving a second calibration pressure value corresponding to a second calibration signal received from a second pressure sensor measuring the same first cardiovascular region; calculating a calibration parameter based at least in part on the first calibration pressure value and the second calibration pressure value; determining a first plurality of pressure values from a first pressure sensor positioned in a first portion of a heart; determining a second plurality of pressure values from a second pressure sensor positioned in a cardiovascular region adjacent to the first portion of the heart; adjusting the second plurality of pressure values based at least in part on the calculated calibration parameter; and determining a heart valve condition using the adjusted second plurality of pressure values.

According to an aspect, determining the heart valve condition may further comprise using the first plurality of pressure values.

According to another aspect, the heart valve condition may comprise a valve stenosis severity index.

According to another aspect, the heart valve condition may comprise a corrected aortic regurgitation index.

According to an embodiment, a method for presenting an interactive graphical user interface of a patient monitor during deployment of a replacement heart valve is disclosed comprising: receiving a first plurality of pressure values, wherein each pressure value from the first plurality of pressure values corresponds to a first signal received from a first pressure sensor measuring a first portion of a heart; receiving a second plurality of pressure values, wherein each pressure value from the second plurality of pressure values corresponds to a second signal received from a second pressure sensor measuring a cardiovascular region adjacent to the first portion of the heart; presenting a first user interface for a first gradient type, the first user interface comprising: a first graph based at least in part on the first plurality of pressure values; a second graph based at least in part on the second plurality of pressure values; and a first gradient representation that visually presents an area between the first graph and the second graph, the area indicating a difference in pressure between the first portion of the heart and the second portion of the heart and a first gradient of a valve; receiving, via the first user interface, a user selection of a second gradient type; and presenting, instead of the first user interface, a second user interface for the second gradient type, the second user interface comprising: the first graph and the second graph; and a second gradient representation that visually presents a gradient measurement between a first peak in the first graph and a second peak in the second graph.

According to an aspect, the first user interface may further comprise: a numerical value indicating an amount of regurgitation of the valve.

According to another aspect, the first user interface may further comprise: a regurgitation representation that visually presents a regurgitation measurement between a first point in the first graph and a second point in the second graph, the regurgitation measurement indicating an amount regurgitation of the valve.

According to yet another aspect, the first user interface may further comprise: a numerical value for the first gradient of the valve according to a statistical measure.

According to yet another aspect, the method may further comprise: receiving, via the second user interface, a second user selection of a third gradient type; and presenting, instead of the second user interface, a third user interface for the third gradient type, the third user interface comprising: the first graph and the second graph; and a third gradient representation that visually presents a second gradient measurement between a first point in the first graph and a second point in the second graph.

According to yet another aspect, the first user interface may further comprise: a first numerical value for the first gradient and a second numerical value for a second gradient.

According to yet another aspect, the first numerical value and the second numerical value are presented on a display comprising the first graph and the second graph.

According to yet another aspect, the method may further comprise: presenting a third user interface comprising an electrocardiography graph.

According to yet another aspect, the method may further comprise: detecting rapid pacing from at least one of the first plurality of pressure values or the second plurality of pressure values; and presenting a warning of the rapid pacing in a user interface.

According to yet another aspect, wherein the first user interface may further comprise a first numerical value for the first gradient, the method may further comprise: receiving a user heartbeat selection; and calculating the first numerical value based at least in part on the user heartbeat selection.

According to yet another aspect, the user heartbeat selection may further comprise a quantity of heartbeats, and wherein calculating the first numerical value may further comprise determining the first numerical value according to a statistical measure for the quantity of heartbeats.

According to yet another aspect, the user heartbeat selection may comprise a selection of a particular heartbeat.

According to yet another aspect, calculating the first numerical value may further comprise determining the first numerical value for the particular heartbeat.

According to yet another aspect, calculating the first numerical value may further comprise determining the first numerical value for one or more other heartbeats that excludes the particular heartbeat.

According to another embodiment, a system is disclosed comprising: a non-transitory computer storage medium configured to at least store computer-executable instructions; and one or more hardware processors in communication with the non-transitory computer storage medium, the one or more hardware processors configured to execute the computer-executable instructions to at least: determine a first plurality of pressure values from a first pressure sensor positioned in a first portion of a heart; determine a second plurality of pressure values from a second pressure sensor positioned in a cardiovascular region adjacent to the first portion of the heart; and present a first user interface for a first gradient type, the first user interface comprising: a first graph based at least in part on the first plurality of pressure values; a second graph based at least in part on the second plurality of pressure values; and a first gradient representation that visually presents a first gradient measurement between a first peak in the first graph and a second peak in the second graph.

According to an aspect, the one or more hardware processors may be further configured to: receive, via the first user interface, a user selection of a second gradient type; and present, instead of the first user interface, a second user interface for the second gradient type, the second user interface comprising: the first graph and the second graph; and a second gradient representation that visually presents an area between the first graph and the second graph, the area indicating a difference in pressure between the first portion of the heart and the second portion of the heart and a second gradient of a valve.

According to another aspect, the one or more hardware processors may be further configured to: receive, via the first user interface, a user selection of a second gradient type; and present, instead of the first user interface, a second user interface for the second gradient type, the second user interface comprising: the first graph and the second graph; and a second gradient representation that visually presents a second gradient measurement between a first point in the first graph and a second point in the second graph.

According to yet another aspect, the first user interface may further comprise: a numerical value indicating an amount of regurgitation of the valve.

According to yet another aspect, the first user interface may further comprise: a regurgitation representation that visually presents a regurgitation measurement between a first point in the first graph and a second point in the second graph, the regurgitation measurement indicating an amount regurgitation of the valve.

According to yet another aspect, the first user interface may further comprise: a numerical value for a first gradient of the valve according to a statistical measure.

According to yet another aspect, the first user interface may further comprise: a first numerical value for a first gradient and a second numerical value for a second gradient.

According to yet another aspect, the first numerical value and the second numerical value may be presented on a display comprising the first graph and the second graph.

According to yet another aspect, the one or more hardware processors may be further configured to: present a third user interface comprising an electrocardiography graph.

According to yet another aspect, the one or more hardware processors may be further configured to: detect rapid pacing from at least one of the first plurality of pressure values or the second plurality of pressure values; and present a warning of the rapid pacing in a user interface.

According to yet another aspect, the first user interface may further comprise a first numerical value for the first gradient, wherein the one or more hardware processors may be further configured to: receive a user heartbeat selection; and calculate the first numerical value based at least in part on the user heartbeat selection.

According to yet another embodiment, a system is disclosed comprising: a pressure guidewire configured to be positioned at a first cardiovascular region; a second pressure sensing device configured to be positioned at a second cardiovascular region adjacent to the first cardiovascular region; one or more hardware processors configured to at least: determine a first plurality of pressure values from the pressure guidewire; determine a second plurality of pressure values from the second pressure sensing device; and present a first user interface for a first gradient type, the first user interface comprising: a first graph based at least in part on the first plurality of pressure values; a second graph based at least in part on the second plurality of pressure values; and a first numerical value for a first gradient of a valve.

According to an aspect, the first user interface may further comprise: a first gradient representation that visually presents a first gradient measurement between a first point in the first graph and a second point in the second graph.

According to another aspect, the one or more hardware processors may be further configured to: receive, via the first user interface, a user selection of a second gradient type; and present, instead of the first user interface, a second user interface for the second gradient type, the second user interface comprising: the first graph and the second graph; and a second gradient representation that visually presents an area between the first graph and the second graph, the area indicating a difference in pressure between the first portion of the heart and the second portion of the heart and a second gradient of a valve.

According to yet another aspect, the one or more hardware processors may be further configured to: receive, via the first user interface, a user selection of a second gradient type; and present, instead of the first user interface, a second user interface for the second gradient type, the second user interface comprising: the first graph and the second graph; and a second gradient representation that visually presents a second gradient measurement between a first peak in the first graph and a second peak in the second graph.

According to yet another aspect, the first user interface may further comprise: a second numerical value indicating an amount of regurgitation of the valve.

According to yet another aspect, the first user interface may further comprise: a regurgitation representation that visually presents a regurgitation measurement between a first point in the first graph and a second point in the second graph, the regurgitation measurement indicating an amount regurgitation of the valve.

According to yet another aspect, the first user interface may further comprise: a second numerical value for the first gradient of the valve according to a statistical measure.

According to yet another aspect, the first user interface may further comprise: a second numerical value for a second gradient.

According to yet another aspect, the first numerical value and the second numerical value are presented on a display comprising the first graph and the second graph.

According to yet another aspect, the one or more hardware processors may be further configured to: present a second user interface comprising an electrocardiography graph.

While pressure measuring coronary guidewires have been described and marketed for many years, structural heart guidewires have not been developed. Accordingly, structural heart guidewires are needed for enabling a cardiologist to improve structural heart procedures.

During structural heart procedures, a downstream pressure curve and an upstream pressure curve can be used to determine a condition of a heart valve, a status of blood flow through a heart valve and in some cases to determine how and when to treat a patient. Depending on the valve to be treated and the approach, in some implementations, the downstream pressure curve can be provided by a guide catheter pressure sensor, a pressure guidewire or another device capable of sensing pressure. The upstream pressure curve can be provided by a pressure guidewire or other device capable of sensing pressure upstream to the downstream pressure measurement. In other implementations, the upstream pressure curve can be provided by a guide catheter pressure sensor, a pressure guidewire or another device capable of sensing pressure. The downstream pressure curve can be provided by a pressure guidewire or other device capable of sensing pressure downstream to the upstream pressure measurement.

For example, some methods for evaluating a heart valve include accessing a blood flow passage of a patient at an access point. The access point may be a femoral artery, radial artery, femoral vein, radial vein, left ventricle apex, or otherwise. A pressure guidewire may be advanced through the access point to a location adjacent to a treatment site of the patient, for example the heart valve to be assessed, treated, or replaced. A pressure sensing device separate from the pressure guidewire may be advanced to the opposite side of the treatment site, e.g., to the side of a heart valve opposite to the side of the valve where a pressure sensing device located toward a distal tip of the pressure guidewire is located. The pressure sensing device may comprise or may be disposed in an aortic pigtail catheter, a guide catheter, a pressure guidewire, or another device capable of sensing pressure. Treatment devices, such as a balloon or replacement heart valve, may be advanced over the pressure guidewire. In some implementations, the pressure sensing device may sense pressure on a first side of the heart valve, e.g. in the aorta or atrium, and the pressure guidewire may sense pressure on a second side of the heart valve, e.g. in the left ventricle or the right ventricle. In some implementations, the pressure sensing device may sense pressure in a heart chamber and the pressure guidewire may sense pressure in a blood flow passage on an opposite of a heart valve, e.g., in a second heart chamber or in the aorta. A specific example includes positioning the pressure sensing device in the left ventricle to sense pressure therein and positioning the pressure guidewire in the aorta to sense pressure therein to evaluate the aortic valve from a transapical heart access approach. Another specific example includes positioning the pressure sensing device in the left ventricle to sense pressure therein and positioning the pressure guidewire in the left atrium to sense pressure therein to evaluate the mitral valve from a transapical heart access approach. The pressure measurements may be used to measure a valve state condition, such as pressure gradient across the heart valve and/or valve regurgitation.

The methods described herein may include equalizing pressure measurements between the pressure sensing device and the pressure guidewire. Pressure equalization may take place in any location such as the aorta or the left ventricle. Equalizing pressure measurements may include automatically or manually adjusting a phase delay between the pressure curves generated from the pressure sensing device and the pressure guidewire.

Some methods described herein are directed towards assessing and/or treating a cardiac and/or a cardiovascular condition. In some cases, the method invovles treating a structural heart condition. For example, the method may include: accessing a blood flow passage of a patient at an access point, advancing an access catheter through the access point to a location in the heart, advancing a pressure guidewire through the access catheter, and/or sensing pressure using the pressure guidewire. The method may also include inducing rapid pacing through the pressure guidewire. For example, current may be delivered from a proximal segment of the pressure guidewire and through a core wire of the pressure guidewire to a distal segment of the pressure guidewire. The access catheter or other delivery catheter may insulate the patient from current in the rapid pacing pressure guidewire. In some configurations, the pressure guidewire may include an insulator along at least a portion of the pressure guidewire, for example a polymeric layer such as a PTFE layer can insulate the patient from the rapid pacing pressure guidewire where the current application is not desired. By combining pressure sensing with rapid pacing capabilities, these methods eliminate the need for a separate pacing device and/or for exchange of such devices to sequentially provide these capabilities.

Various pressure guidewire configurations are suitable for the pressure sensing methods described herein. These pressure guidewires may guide other catheters advanced over the pressure guidewires. A distal segment of the catheter may include a curvature to provide an atraumatic tip. The pressure guidewire may include a distal tip to enclose a distal end of the pressure guidewire, e.g., to prevent fluid flow or passage of structures through the distal end of the pressure guidewire.

Some of the pressure guidewires described herein may include an outer tube having a lumen extending through the outer tube. At least a portion of the outer tube includes a coil portion and/or connector tube. The pressure guide wire may also include a core wire extending through at least a portion of the lumen of the outer tube. In some configurations, the core wire may extend substantially the entire length or the entire length of the lumen of the outer tube. The core wire may include a reduced diameter portion, such as a tapered portion. The pressure guide wire may also include a pressure sensor assembly having a pressure sensor and one or more pressure wires leads extending from the pressure sensor toward a proximal end of the pressure guidewire. For example, the pressure sensor may be an optical sensor, electrical, MEMS, or a membrane-based sensor, and the pressure wire lead(s) may be an optical fiber or an electrical wire. The pressure sensor may be positioned radially between the reduced diameter portion of the core wire and the coil portion of the outer tube. The pressure sensor may be disposed within a sensor housing or the outer tube itself may provide a sensor housing. The pressure sensor may be exposed to or in pressure communication with blood flow outside the pressure guidewire through the spacing in the coil portion and/or through one or more openings in the sensor housing.

At least a portion of at least one pressure wire lead may not be concentric with the outer tube. For example, a first section of the pressure wire lead may be concentric with the outer tube and a second section of the pressure wire lead may be off-axis relative to a longitudinal axis of the outer tube. The second section may be positioned radially outward of the core wire. For example, in the distal region of the pressure guidewire where the core wire has a reduced diameter, there may be space between the core wire and the outer tube for the pressure sensor to be positioned off-axis relative to the longitudinal axis of the outer tube. When the pressure sensor is located in the distal region of the pressure guidewire, the pressure guidewire is capable of measuring pressure at a position more centrally located in the chamber of the heart while the core wire maintains structural integrity in the distal region. However, it may be beneficial for at least a portion of the pressure wire lead to be concentric with the outer tube to facilitate connection to an optical or other connector at a proximal end of the pressure guidewire.

The outer tube may include an opening configured to permit at least one pressure wire lead to transition from the first section that is concentric with the outer tube to the second section that is not concentric with the outer tube. The opening may be a partial thickness cut out or extend through the full thickness of the outer tube. If the opening extends through the full thickness of the outer tube, the opening may be sealed, e.g. using adhesive, to prevent fluid from flowing into the pressure guidewire through the opening.

In some implementations, current may be delivered through the core wire to a conductive surface on an outside of the guidewire to induce rapid pacing. When the core wire extends the substantially entire or entire working length of the pressure guidewire, the current generator may deliver current directly to the core wire or to an exposed conductor in contact directly or indirectly with a proximal portion of the core wire. Additionally or alternatively, the current may be delivered to a conductive tube and/or coil and then directly or indirectly transferred to the core wire, for example through a separate conductive connector. In some configurations, the outer tube of the pressure guidewire may include an insulator along at least a portion of the pressure guidewire, for example a polymer layer such as PTFE, to insulate the patient from the core wire.

Some of the pressure guidewires described herein include connector tube, a core wire, a coil portion, and/or a pressure sensor assembly. The connector tube may extend from a proximal end of the pressure guidewire such that a current generator may be connected to the connector tube. The core wire may extend distally of a distal end of the connector tube, for example through the distal end of the connector tube or distal of the distal end of the connector tube. The core wire may include a reduced diameter portion such as a tapered portion. In some implementations, current may be directly or indirectly delivered from the connector tube to the core wire for rapid pacing. For example, current may be delivered from the connector tube to the core wire via a separate connector from the connector for the optical connection when using optical sensing.

The coil portion may be positioned distal to the distal end of the connector tube and surround at least a portion of the core wire. The coil portion may include a sensor housing section, e.g. a tube or weld, that is stiffer than another section or remainder of the coil portion. The pressure sensor of the pressure sensor assembly may be disposed within the sensor housing section of the coil portion. In this configuration, the sensor housing section of the coil portion may include one or more openings to allow the blood or another fluid in pressure communication with the blood to reach the pressure sensor.

The pressure sensor assembly may include a pressure sensor and one or more pressure wires leads extending from the pressure sensor toward the proximal end of the pressure guidewire. For example, the pressure sensor may be an optical sensor, electrical, MEMS, or a membrane-based sensor. The pressure sensor may be positioned radially between the reduced diameter portion of a core wire and a coil portion such that fluid may flow through a space in the coil portion to the pressure sensor. In some configurations, the pressure sensor assembly may include a separate pressure housing disposed over the pressure sensor.

The pressure wire(s) lead(s) may be an optical fiber or an electrical wire. A first section of at least one pressure wire lead may be concentric with the connector tube and a second section of the pressure wire lead may be off-axis relative to a longitudinal axis of the connector tube. The second section of the pressure wire lead may be positioned radially outward of the core wire. The tube wall of the connector tube may include an opening to permit the pressure wire lead to transition from the first section that is concentric with the connector tube to the second section that is off-axis relative to the longitudinal axis of the connector tube. The opening may be a partial thickness cut out or extend through the full thickness of the connector tube. If the opening extends through the full thickness of the outer tube, the opening may be sealed to prevent fluid from flowing into the pressure guidewire through the opening. In other configurations, the pressure guidewire may include a separate connector with an opening to permit the pressure wire lead to transition from the first section that is concentric with the connector tube to the second section that is off-axis relative to the longitudinal axis of the connector tube.

Some of the pressure guidewire discussed herein include an outer tube, connector tube positioned radially inward of the outer tube, a pressure sensor assembly, and/or a distal tip at the distal end of the outer tube. The outer tube may have a uniform or substantially uniform diameter. A core wire may be positioned distal to the connector tube. The core wire may have a reduced diameter portion such as a tapered portion. The pressure sensor assembly may include a pressure sensor positioned distal of the connector tube, for example radially between a coil portion of the outer tube and the core wire. The pressure sensor assembly may also include one or more pressure wires leads extending from the pressure sensor and through the connector tube lumen.

The pressure guidewire may also include a sensor housing, for example in the outer tube or over the pressure sensor but within the outer tube. The sensor housing may include at least one opening to allow blood or other fluid to flow to the pressure sensor. In this configuration, the pressure guidewire may include a second coil portion extending proximally from the sensor housing toward a proximal end of the pressure guidewire. The coil portions of the outer tube may extend along a majority of a working length of the pressure guidewire or substantially the entire working length of the pressure guidewire. A proximal end of the connector tube may be exposed from a proximal end of the second coil portion to facilitate rapid pacing. For example, less than ten percent, or less than five percent, of a length of the connector tube may be exposed from the proximal end of the second coil portion.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters denote corresponding features consistently throughout similar embodiments. The following is a brief description of each of the drawings.

FIG. 2C is a transverse cross-sectional view a system including a system including an aortic pigtail catheter and a guide catheter for a TAVR delivery system;

FIG. 2D is a transverse cross-sectional view a system including a system including a guide catheter for a TMVR delivery system;

DETAILED DESCRIPTION

This application is directed to systems and methods for providing pressure curves during surgical heart procedures, including valvuloplasty procedures, transcatheter aortic valve replacement (TAVR) procedures sometimes also called transcatheter aortic valve implantation (TAVI) procedures, and transcatheter mitral valve replacement (TAMR) procedures. The systems and methods can be used to aid a cardiologist in completing critical aspects of a structural heart procedure. The embodiments herein can be used to convey by a user interface output, e.g., graphically, the condition of a heart valve before, during and/or immediately after the deployment of structural heart device such as an aortic valve, a mitral valve or another heart valve. The embodiments herein can be used to convey the nature of blood flow through a heart valve before, during and/or immediately after the deployment of structural heart device such as an aortic valve, mitral valve or another heart valve. Novel displays provide an intuitive and/or immediate sense of a condition of the patient to simplify and to expedite procedures and to increase the success thereof. Further discussion of the user interface output can be found in Section III of the present application.

The pressure measurements obtained from the systems and methods described herein may be used to calculate a heart valve or blood flow index, such as a valve regurgitation index or a pressure gradient across a natural heart valve, a previous placed replacement heart valve or a replacement heart valve being currently implanted. The valve regurgitation index and pressure gradient enable the cardiologist to properly evaluate the heart valve. During systole, a higher pressure gradient across the aortic valve (or lower pressure in the aorta) may be indicative of greater valve calcification. A lower regurgitation index at the end of diastole may be indicative of greater regurgitation. Further discussion of such calculations can be found in Sections III and IV of the present application.

I. Example Methodologies

FIGS. 1A-1F illustrate various methods of accessing a heart during a structural heart procedure. One of the pressure guidewire 30 or the pressure sensing device (e.g., a pigtail catheter 10 or access catheter 20) may be used to calculate an upstream pressure curve (with respect to flow) and the other of the pressure guidewire 30 or the pressure sensing device may be used to calculate a downstream pressure curve (with respect to flow). Although certain methods are described below with respect to particular heart valves and approaches to access, similar systems may be used to evaluate other valves such as the tricuspid valve or the pulmonary valve.

Figure 1A:
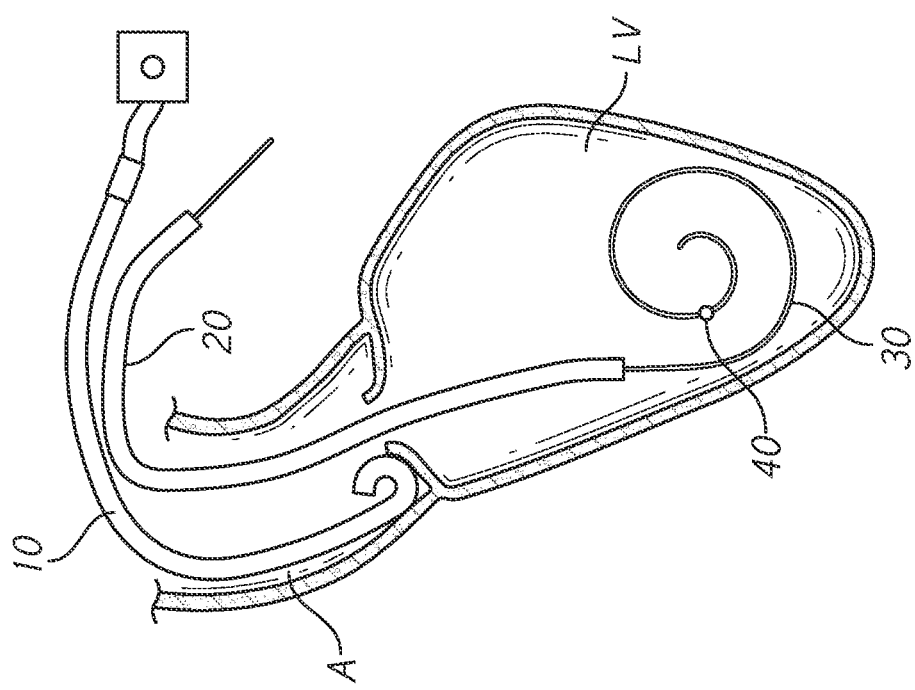
FIGS. 1A-1F are schematic diagrams of a pressure guidewire deployed in a heart.
Figure 1B:
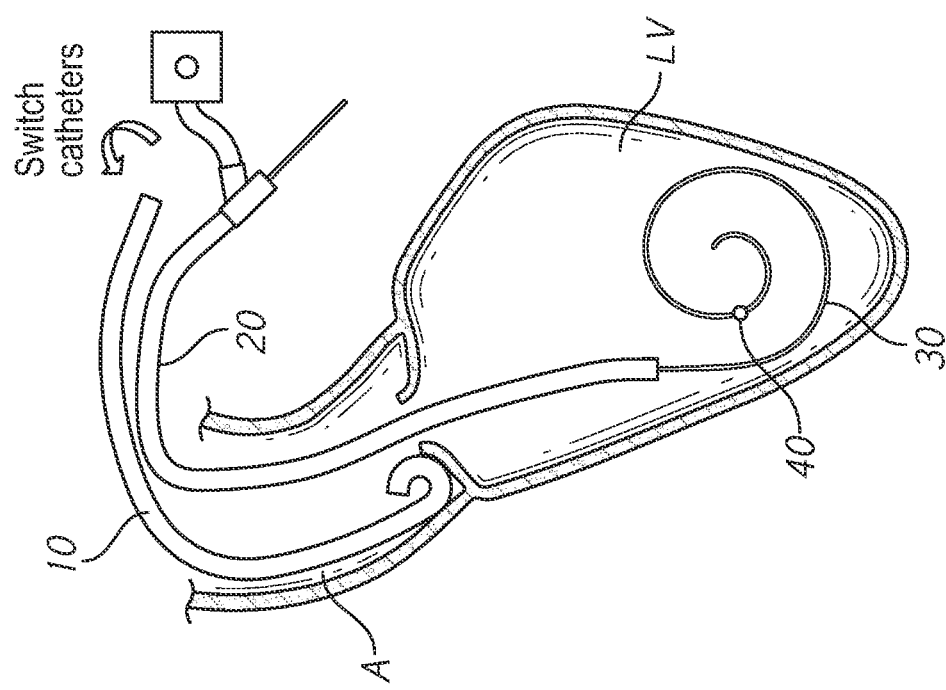

FIG. 1A illustrates a system and method for measuring the performance of an existing or a replacement aortic heart valve. An existing heart valve can be a natural but diseased valve or a previously implanted replacement heart valve that is being assessed in a subsequent procedure. As shown, a pigtail catheter 10 may be positioned downstream of a treatment site, for example downstream of an aortic valve in an aorta A, to provide the downstream pressure curve. The pigtail catheter 10 may also be used to deliver contrast media to facilitate visualization of the treatment site. An access catheter 20 may be delivered to the heart from the same or different access site as the pigtail catheter 10. The access catheter 20 or a separate delivery catheter exchanged with the access catheter 20 may be used to advance a valve dilation balloon, replacement valve, and or other device to the treatment site. A pressure guidewire 30 may extend through the access catheter 20 to a position upstream of the treatment site, for example in left ventricle LV, to provide the upstream pressure curve. The pressure guidewire 30 may include a pressure sensor 40 anywhere along a distal segment of the pressure guidewire 30, for example within an atraumatic curvature, at the transition to the atraumatic curvature, or proximal of the atraumatic curvature (see FIG. 2B). Prior to entering the heart, access is provided using an arterial approach, such as a femoral or a radial approach. FIG. 1B illustrates a similar configuration to FIG. 1A except one or both of the pigtail catheter 10 and/or the access catheter 20 can be used to provide pressure reading with the use of the external pressure sensing. Catheter 20 can allow the measurement of the downstream pressure, similar to the pressure read by the pressure guidewire 30. This configuration can be used to equalize the external pressure sensor with the pressure guidewire. Alternatively, any other delivery catheter exchanged with the access catheter may be used to provide the downstream pressure curve. In some cases, the downstream pressure output can be received by a console that can be coupled with the pressure signal of either or both of the pigtail catheter 10 and the access catheter 20.

It can be important to equalize the pressure readings between the downstream and the upstream pressure sensing devices. Equalization may be done in term of pressure accuracy (gain and offset), but also in term of phase delay between the two pressure curves. For example, pressure readings may be taken from the downstream and upstream pressure sensing devices in the same general anatomical region and the pressure measurements may be manually or automatically adjusted for the phase delay between the two pressure curves. As shown in FIG. 1B, the pressure measurements for equalization may be taken from the left ventricle LV. In this approach, the downstream pressure output is provided by the access catheter 20 and the upstream pressure output is provided by the pressure guidewire 30. The sensing feature of the access catheter 20 (e.g., a distal end of a column of fluid in the catheter 20) is advanced to be adjacent to the sensing feature of the pressure guidewire 30. The sensing features of the access catheter 20 and the pressure guidewire 30 can be confirmed to be placed in the left ventricle LV. The sensing features of the access catheter 20 and the pressure guidewire 30 can be confirmed to be in a similar position in the left ventricle LV.

Figure 1C:
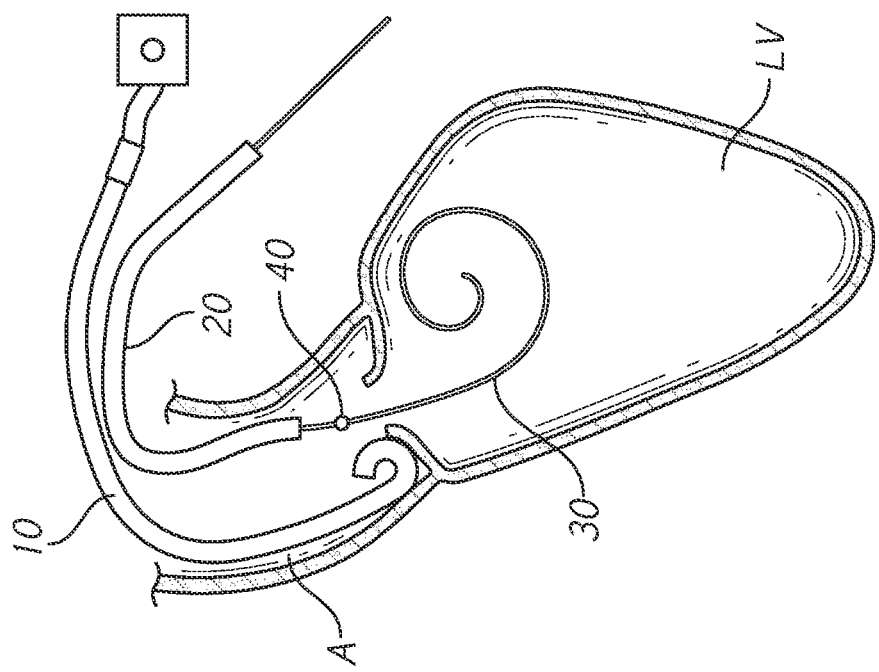

FIG. 1C illustrates a similar configuration to FIG. 1A except the pressure sensor 40 is located proximal of the atraumatic curvature of the pressure guidewire 30. For example, the sensing feature of the pigtail catheter 10 (e.g., a distal end of a column of fluid in the catheter 10) is advanced to be adjacent to the sensing feature of the pressure guidewire 30. The sensing features of the pigtail catheter 10 and the pressure guidewire 30 can be confirmed to be placed in the aorta A. In this configuration, pressure equalization may be performed in the aorta A. After pressure equalization, the pressure guidewire 30 may be advanced into the left ventricle LV to provide the upstream pressure curve while the pigtail catheter 10 remains in the aorta A to provide the downstream pressure curve.

Figure 1D:
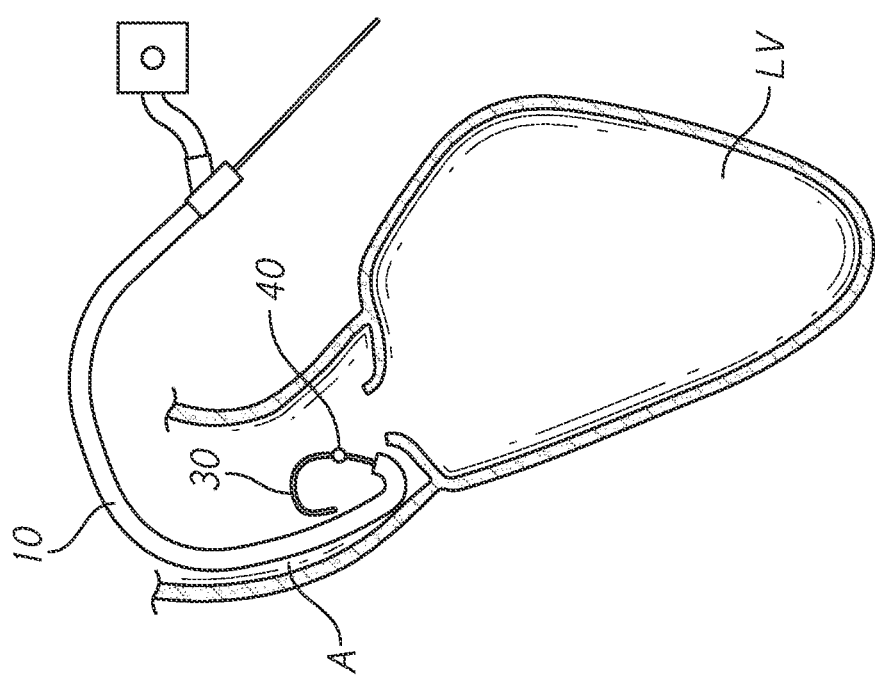

In FIG. 1D, pigtail catheter 10 may be positioned in the aorta A to provide the downstream pressure curve. The pressure guidewire 30 extends through the pigtail catheter 10 in this embodiment to provide the upstream pressure curve. In this configuration, pressure equalization may be performed in the aorta A. For example, the sensing feature of the pressure guidewire 30 can be advanced to the end of a fluid column in the pigtail catheter 10 or just distal thereto. The signals from the sensing feature of the pressure guidewire 30 and the fluid column can be compared to equalize them (as discussed further in Section IV below). After pressure equalization, the pressure guidewire 30 may be retrieve from the aortic pigtail and insert in the left ventricle via the access catheter like it is usually done while the pigtail catheter 10 remains in the aorta A to provide the downstream pressure curve.

Figure 1E:
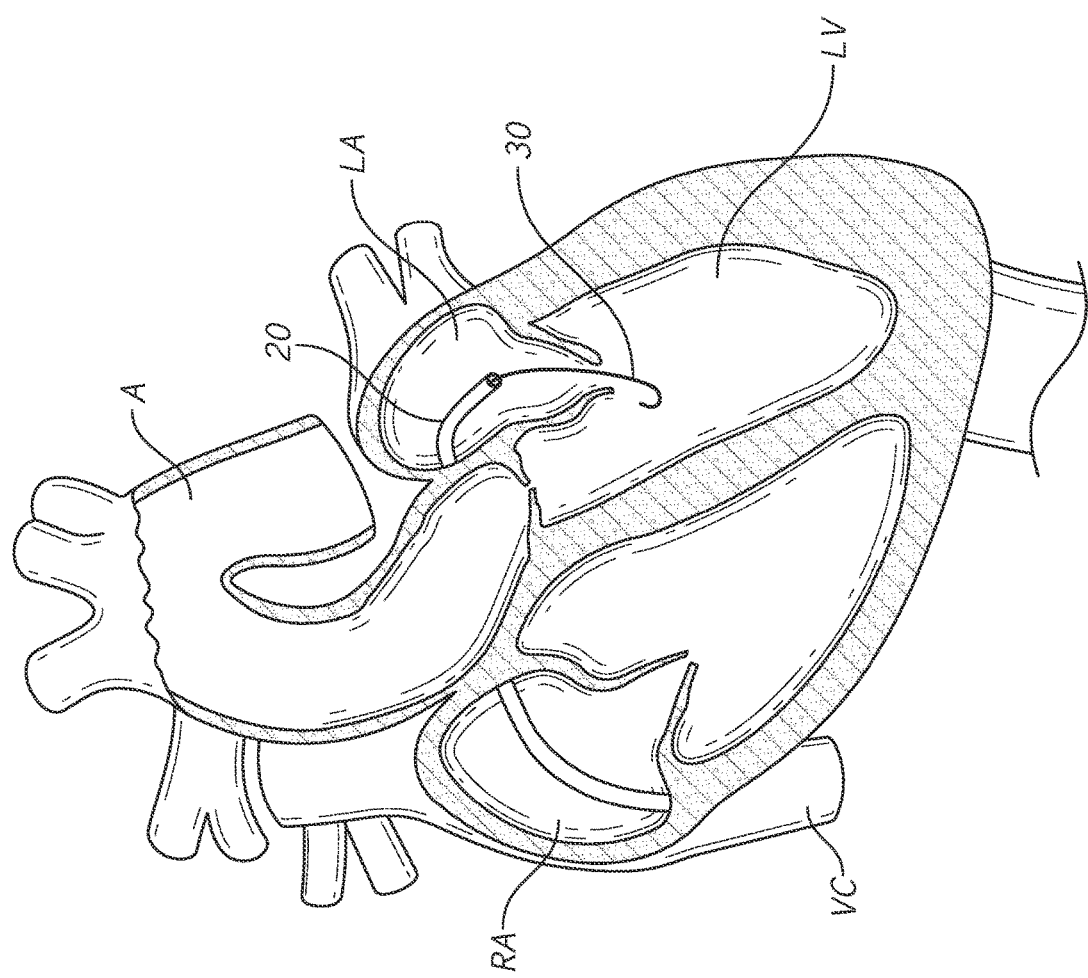

The systems described herein may also be used to measure the performance of an existing or replacement mitral valve. For example, as shown in FIG. 1E, the access catheter 20 may be advanced through the venous vasculature, e.g., through an inferior or superior vena cava VC, e.g., from a femoral approach, to a right atrium RA. The access catheter 20 may then be advanced through an atrial septum to a position in a left atrium LA. In some variations, the access catheter 20 may be configured to provide access through a patent foramen ovale or may be configured to track a guidewire or device that has provided such access. The access catheter 20 or a separate delivery catheter exchanged with the access catheter 20 may be used to advance a valve dilation balloon, replacement valve, and or other device to the treatment site. The pressure guidewire 30 may extend through the access catheter 20 to the left ventricle LV. The access catheter 20 may provide pressure signals that can be used to generate an upstream pressure curve, while the pressure guidewire 30 provides pressure signals that can be used to generate a downstream pressure curve. Alternatively, any other delivery catheter exchanged with the access catheter may be used to provide the upstream pressure curve.

Figure 1F:
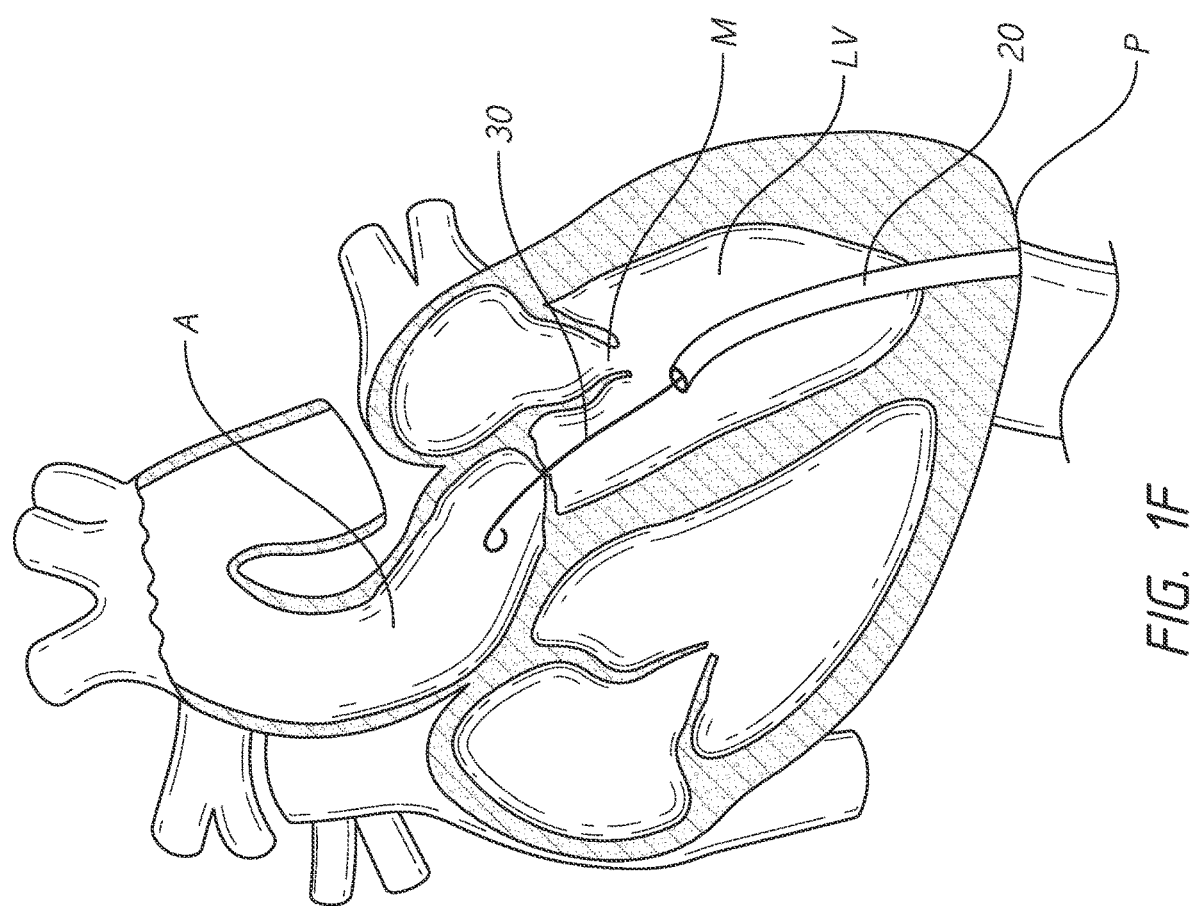

Similar systems may be used in an apical approach for aortic or mitral valve procedures. For example, as shown in FIG. 1F, the access catheter 20 may access the left ventricle LV through the apex P of a heart. A separate device (not shown) can be used to open a pathway through the apex P. The access catheter 20 can be advanced through such as device. The access catheter 20 or a separate delivery catheter exchanged with the access catheter 20 may be used to advance a valve dilation balloon, replacement valve, and or other device to the treatment site. The pressure guidewire 30 may extend through the access catheter 20 to the aorta A in an aortic valve procedure. The access catheter 20 may provide the pressure signals that can be used to calculate an upstream pressure curve, while the pressure guidewire 30 can provide signals that can be used to calculate a downstream pressure curve. Alternatively, any other delivery catheter exchanged with the access catheter may be used to provide the upstream pressure curve.

Although FIG. 1F shows an aortic valve assessment or procedure via the apex P of the heart, the pressure guidewire 30 can be advanced through the mitral valve M such that the sensing feature thereof is in the left atrium. In this way, the pressure guidewire can provide pressure signals that can be used to calculate a left atrial pressure curve (proximal or upstream pressure curve from the perspective of flow). The access catheter 20 can generate pressure signals that can be used to calculate a left ventricle pressure curve (distal or downstream pressure curve from the perspective of flow).

During valve dilation procedures, sometimes called a valvuloplasty, or a valve implantation procedure, natural circulation through the heart valve may be blocked by the valvuloplasty balloon, valve replacement delivery system, or other treatment device. However, when the heart is pumping, pressure from the left ventricle LV or compression of the heart muscle may drive the treatment device back into the aorta A making it difficult to properly position the treatment device. Rapid pacing or defibrillating the left ventricle LV can reduce the pressure gradient between the aorta A and the left ventricle LV and also heart muscle forces and allow the clinician to complete the procedure. Conventional rapid pacing may involve introducing a temporary pace maker to the heart, but this usually requires a separate access point, for example a venous access point. Temporary pace makers may also burn the heart causing other complications. Instead, the pressure guidewire 30 may be used to perform the rapid pacing. As explained above, the pressure guidewire 30 may be introduced through the same access point as the access catheter 20 or other delivery catheter, which reduces the total number of access points. A current may be delivered to a proximal segment pressure guidewire and transmitted to a distal segment of the pressure guidewire via connector tube and/or the core wire, as explained in further detail below. The access catheter 20 or other delivery catheter may insulate at least an intermediate segment of the rapid pacing pressure guidewire 30 from the patient to prevent burns. Alternatively or additionally, the pressure guidewire 30 may include an insulator portion to isolate the pressure guidewire 30. As shown in FIG. 2B, the distal segment of the pressure guidewire may include a curvature allowing the current to contact ventricle walls in multiple locations.

II. Overview of Pressure Wire Systems and Their Use

Figure 2A:
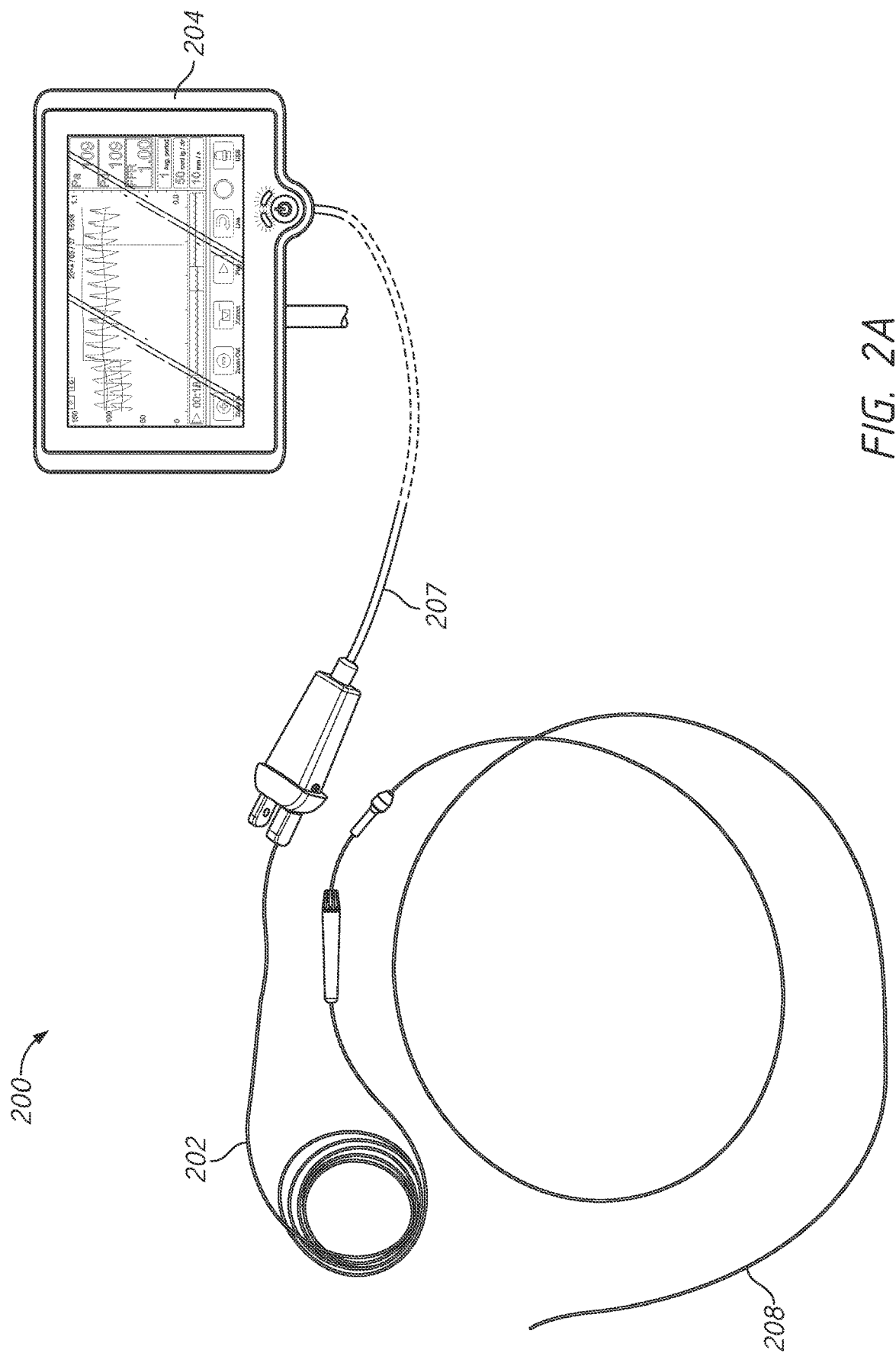
FIG. 2A is a schematic view of a system including a console and a guidewire adapted for facilitating delivery of a structural heart device.
Figure 2B:
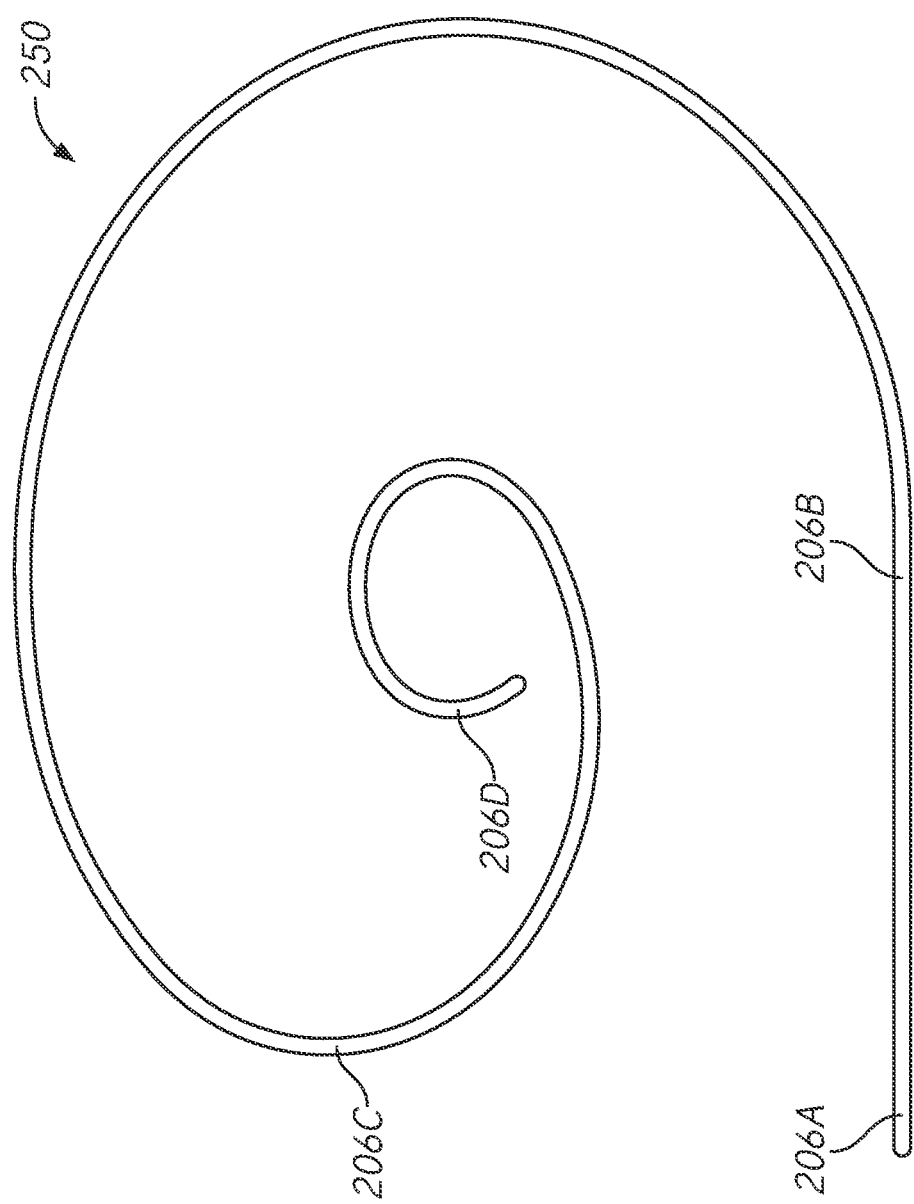
FIG. 2B is a plan view of a coiled distal tip of a pressure sensing guidewire that can be incorporated into the system of FIG. 2.

FIG. 2A illustrates a diagnostic system 200 that can be used in the vasculature of a patient. The diagnostic system 200 is configured to determine whether the extent of valve damage is great enough to indicate that a balloon dilation (e.g., valvuloplasty), valve replacement or other catheter intervention ought to be performed.

The diagnostic system 200 can include a monitor assembly 204 that is configured to be coupled to the pressure guidewire 208. The diagnostic system 200 may include a connection (indicated by the dashed line A) that facilitates connection to and disconnection of the pressure guidewire 208 from the monitor assembly 204. The connection to and disconnection from the monitor assembly 204 is useful in allowing a clinician to use the pressure guidewire 208 initially for assessing the effect of the heart valve damage. The pressure guidewire 208 may also be used for delivering a treatment device such as a balloon catheter or valve delivery system.

A fiber optic interface cable 202 can be used to couple the pressure guidewire 208 with the monitor assembly 204 by way of a handle 207. In some embodiments, the system 200 receives an input from a tubular catheter body used to access the vasculature. For example, the access catheter 20 may be an access catheter. A distal tip of the pressure sensing of or in the access catheter 20 can be positioned adjacent the treatment site such that pressure signals corresponding to the pressure on a first side of the treatment site, e.g., in the aorta, can be obtained. This pressure measurement is sometimes referred to herein as Pa. In other configurations, the system 200 may include a pressure sensing device, such as a pigtail catheter, delivered separate from the pressure guidewire to obtain Pa.

The pressure guidewire 208 can take any suitable form. For example, the pressure guidewire 208 may include a proximal segment that has a proximal end that is positioned outside the patient and a distal end that may be advanced through the access catheter 20 to the vasculature. The pressure guidewire 208 can be configured to have the flexibility to navigate the tortuous vasculature while maintaining structural integrity for pushability and torqueability. For example, at least proximal section of the pressure guidewire 208 may be supported by a connector tube and/or core for structural integrity, while a distal section of the pressure guidewire 208 can be formed to include an atraumatic curvature 250, such as the coiled end shown in FIG. 2B, to provide more flexibility and prevent puncture. In other configurations, a curved distal section may be joined to the pressure guidewire 208 to provide the atraumatic curvature 250.

Any sensing modality can be used. For example, an optical sensor can be configured to sense pressure when exposed to blood. The optical sensor can be disposed within an interior space of the pressure guidewire 208 in fluid communication with an exterior of the pressure guidewire 208. The sensor may be an optical or electrical pressure sensor. The sensor can be selectively placed in communication with the monitor assembly 204 by pressure wire lead(s) disposed between the sensor and a proximal end of the pressure guidewire 208. The pressure wire lead(s) may be an optical fiber or an electrical wire.

As shown in FIG. 2B, the pressure sensor may be located anywhere along the distal section of the pressure guidewire 208. For example, the pressure sensor may be positioned near the distal-most tip of the guidewire at location 206D, along the curvature 250 of the guidewire at location 206C, at the transition to the curvature 250 of the guidewire at location 206B, or proximal of the curvature 250 of the guidewire at location 206A. For example, location 206C may be at about 270 degrees around the curvature 250 from the straight region (around location 206A) of the pressure guidewire and location 206D may be about 540 degrees around the curvature from the straight region of the pressure guidewire. However, the pressure sensor may be located any position in the curved distal region of the pressure guidewire, for example between and including about 0 degrees to about 90 degrees, between and including about 90 degrees to about 180 degrees, between and including about 180 degrees to about 270 degrees, between and including about 270 degrees to about 360 degrees, between and including about 360 degrees to about 450 degrees, or between and including about 450 degrees to about 540 degrees from the straight region of the pressure guidewire.

When the distal section is curled up, pressure sensor may be positioned about 270 degrees along the curvature 250 from the straight section of the pressure guidewire 208. The location of the pressure sensor within the distal section of the guidewire may influence the accuracy of the pressure measurements. For example, when the pressure sensor is in the more distal locations 206C, 206D, the pressure sensor may be more centrally located within the chamber of the heart, e.g. the left ventricle LV, and displaced from the chamber walls. Also, in the more distal locations 206C, 206D the pressure sensor is less likely to be obstructed by the access catheter or other delivery catheter during the valvuloplasty or heart replacement procedure. In the more proximal positions 206A, 206B, the pressure measurements will be taken closer to the heart valve but it is possible to perform equalization in the aorta A while maintaining the distal tip of the pressure guidewire 208 within the left ventricle LV. In some procedures, performing equalization in the aorta A requires less manipulation of the pigtail catheter or other pressure sensing device is required. For example, during an aortic valve procedure, the pigtail catheter is already located in the aorta. Although the pressure sensor may be proximal to the curvature 250, the pressure sensor is sufficiently distal to take pressure measurements distal to the heart valve. Leaving the distal tip of the pressure guidewire 208 within the left ventricle LV maintains access to the left ventricle LV.

FIG. 2C illustrates a cross-section of a TAVR system within a descending aorta of a patient, with the anatomy removed for clarity. The TAVR system could be used in connection with the monitor display 204. For example, the pressure guidewire 208 extends through an access catheter 210. The same access catheter 210 can be used to advance a delivery system 212 over the pressure guidewire 208. The delivery system 212 may be used to advance a valve replacement or other treatment device. Other configurations are also possible. For example, the catheter for the access catheter 210 could be exchanged with the delivery system 212 and thereafter advanced over the pressure guidewire 208. As shown, the pressure sensing device that is used to provide pressure signals for the pressure of blood in the aorta is an aortic pigtail catheter 214 delivered separately from the access catheter 210, although possibly from the same access point.

In other configurations, the access catheter 210 or the delivery system 212 may be used to obtain pressure signals for the pressure of blood in the aorta and thus may be the pressure sensing device for aortic pressure. As shown in FIG. 2D, for a mitral valve replacement, the access catheter 211 may be the pressure sensing device. The pressure guidewire 208 extends through the access catheter 211 and the delivery system 213 may be advanced over the pressure guidewire 208. The delivery system 213 may be used to deliver a mitral valve or other replacement or treatment device.

a. Wire-Based Pressure Guidewires

Figure 3:
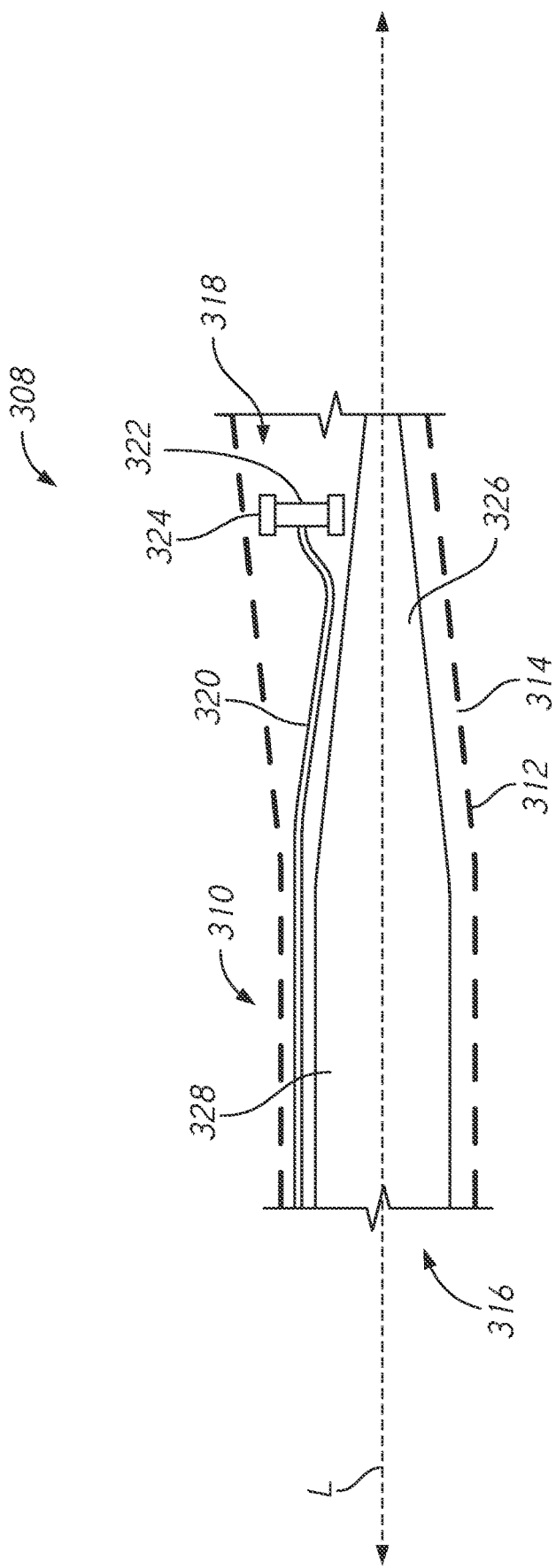
FIG. 3 is a schematic view of one of the variations of the pressure sensing guidewire shown in FIG. 2B.
Figure 4:
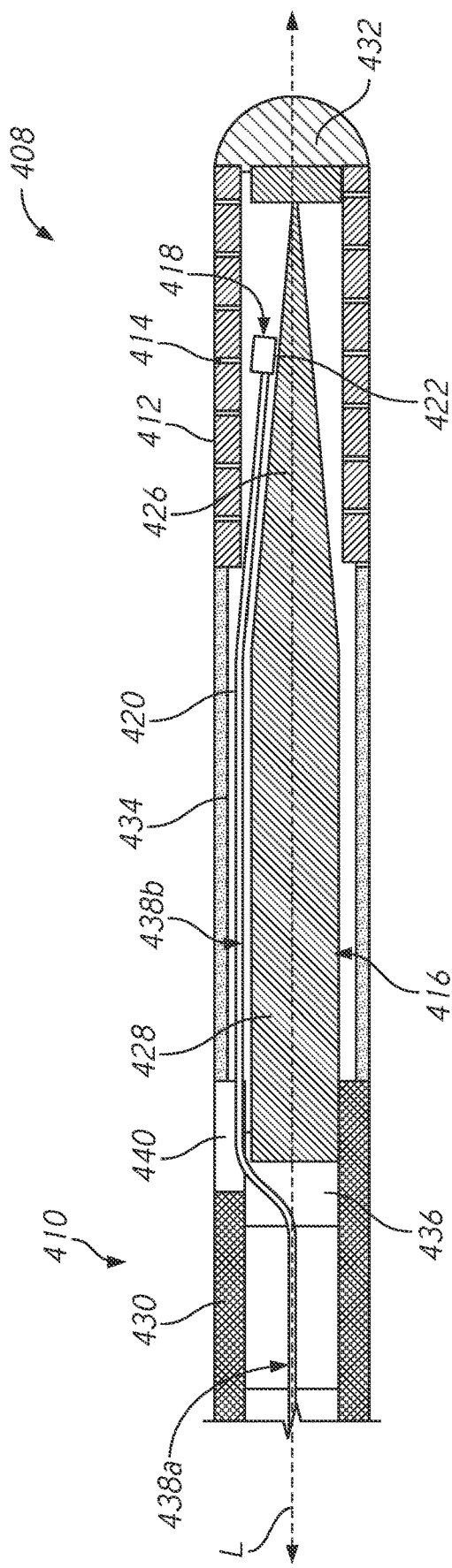
FIG. 4 is a cross-sectional view of another one of the variations of the pressure sensing guidewire shown in FIG. 2B.

FIGS. 3 and 4 illustrate different pressure guidewires 308, 408 that may be used in any of the above-described methods. Numerals used to identify features of the pressure guidewire 308 are incremented by a factor of one hundred (100) to identify like features of the pressure guidewire 408. This numbering convention generally applies to the remainder of the figures. Any component of the pressure guidewires 308, 408 can be interchanged.

In general, the pressure guidewires 308, 408 include an outer tube 310, 410 defining a lumen, a core wire 316, 416 extending at least partially through the lumen of the outer tube 310, 410, a pressure sensor assembly 318, 418 disposed within the lumen of the outer tube 310, 410, and/or a distal tip 432. The pressure guidewire 308 also can include a distal tip that can be the same as or similar to the tip 432 or any of the other tips disclosed herein. An outer diameter of the pressure guidewire 308, 408 may be uniform or substantially uniform along substantially the entire or entire working length of the pressure guidewire 308, 408. For example, the outer diameter of the pressure guidewire 308 may be uniform or substantially uniform along the entire working length, excluding distal tip 432 or atraumatic curvature 250. The pressure guidewire 308, 408 may include an outer diameter of up to 0.035 inches, for example between 0.018 inches and 0.035 inches. In some configurations, the distal portion of the pressure guidewire 308, 408 may be form an atraumatic curvature 250 such as the coiled portion shown in FIG. 2B. In other configurations, the distal portion of the pressure guidewire 308, 408 may remain straight from at least the pressure sensor of the pressure sensor assembly to the distal tip of the pressure guidewire.

FIG. 3 is a schematic view of one variation of the pressure sensing guidewire 308. As illustrated, at least a distal portion of the outer tube 310 may be coiled. For example, the coil portion 312 may be a flat ribbon coil or a round coil. The coil portion 312 may extend along a majority of the working length of the pressure guidewire 308, along substantially the entire working length of the pressure guidewire 308, or along the entire working length of the pressure guidewire 308. With a substantial length of the outer tube 310 being coiled, the coil portion 312 provides sufficient flexibility and softness to avoid any trauma during use (e.g. perforation and/or dissection). The coil portion 312 also promotes safety in case of distal tip failure. When rapid pacing, the coil portion 312 may also ensure electrical contact with the heart.

As shown in FIG. 3, at least a proximal portion 328 of the core wire 316 may be concentric with the outer tube 310 and extend through at least a portion of the lumen of the outer tube 310. For example, the core wire 316 may extend along a majority of the working length of the pressure guidewire 308, along substantially the entire working length of the pressure guidewire 308, or along the entire working length of the pressure guidewire 308. The core wire 316 provides the pressure guidewire 308 with sufficient rigidity for pushability and to prevent kinking. It also provides sufficient rigidity to support the delivery catheter during valve implementation.

At least a portion of the core wire 316 may include a reduced diameter portion 326 to provide space in the lumen outer tube 310 for a pressure sensor 322. For example, as shown in FIG. 3, the reduced diameter portion 326 may be tapered toward the distal end of the pressure guidewire 308. The transition between the proximal portion 328 and the reduced diameter portion 326 of the core wire 316 may be positioned proximal of at least a portion or the entirety of the atraumatic curvature 250 in the distal section of the pressure guidewire 308 (shown in FIG. 2B) to promote a flexible transition to the atraumatic curvature 250 of the pressure guidewire 308. The core wire 316 would continue to extend through at least a portion of the atraumatic curvature 250. This flexible transition acts as a force absorber and ensures no kink is formed in the proximal section of the atraumatic curvature 250 of the pressure guidewire 308. A kink could complicate a procedure, such as advancing another catheter over the guidewire 308 or removing the guidewire 308 from the patient without trauma.

The proximal portion 328 of the core wire 316 may include an outer diameter of up to 0.03 inches, for example between 0.015 inches and 0.03 inches. A reduced diameter portion 326 of the core wire 316 may include an outer diameter that is less than one-third, or less than one-fourth, of the outer diameter of the proximal portion 328 of the core wire 316. For example, the reduced diameter portion 326 of the core wire 316 may include an outer diameter of less than 0.01 inches or less than 0.0075 inches.

The core wire 316 may include a conductive material such as stainless steel to provide a conductive path for current applied to the guidewire 308 in connection with a rapid pacing technique as described above. A proximal end of the core wire 316 may be exposed from the proximal end of the outer tube 310 for connection to the monitor display 204 and/or connection to a current generator. Less than ten percent, or less than five percent, of a length of the core wire 316 may be exposed from the proximal end of the outer tube 310 for connection to a current source for rapid pacing.

The pressure sensor assembly 318 may include a pressure sensor 322 and one or more pressure wire leads 320 extending from the pressure sensor 322. The pressure wire leads 320 may extend along the core wire 316. For example, the pressure sensor 322 may be an optical or electrical sensor, membrane-based sensor, a MEMS sensor or other device that can generate a signal in response to pressure levels or fluctuations. The one or more pressure wire leads 320 may be an optical fiber or electrical wire. As shown in FIG. 3, the pressure sensor assembly 318 may also include a sensor housing 324 disposed over the pressure sensor 322 and positioned between the outer tube 310 and the core wire 316. The sensor housing 324 can include a ring or short tubular member or a cylinder in which a membrane is supported. The sensor housing 324 can enhance handling during assembly in the coil portion 312.

The pressure sensor assembly 318 may be disposed radially between the core wire 316 and the outer tube 310 with the pressure sensor 322 disposed radially between the reduced diameter portion 326 of the core wire 316 and the coiled portion 312 of the outer tube 310. At least a portion of the pressure sensor assembly 318 may be off-axis relative to a longitudinal axis L of the pressure guidewire 308. In some configurations, the entire pressure sensor assembly 318 may be off-axis relative to the longitudinal axis of the pressure guidewire 308.

The pressure sensor 322 may be exposed to blood or other fluid through the spacing or gaps 314 in the coil portion 312. Although, in other variations, the outer tube 310 may include a sensor housing section with one or more openings to expose the pressure sensor 322 to blood or other fluid. The sensor housing section may be stiffer than the remainder of the coil portion 312. For example, the sensor housing section may be a metallic tube splitting the coil portion 312 into two sections. The sensor housing section may be mounted to a distal portion of a first coil section of the coil portion 312 and to a proximal portion of a second coil section of the coil portion 312. As another example, the coil portion 312 may include two coils welded together to create a stiffened section.

At least a portion of the pressure guidewire 308 may be covered by a lubricious insulator, for example a polymeric layer such as PTFE. The insulator may secure one or more pressure wire(s) lead(s) 320 in place. When rapid pacing is induced through the core wire 316, the insulator may also electrically isolate the core wire 316 from the patient along the length of the insulator. The insulator may replace the need for a separate catheter to electrically isolate the pressure guidewire 308.

FIG. 4 illustrates another variation of the pressure guidewire 408. The pressure guidewire 408 can include any of the features described with respect to the pressure guidewire 308. In this variation, a distal portion of the outer tube 410 may be formed by the coil portion 412. A proximal portion of the outer tube 410 may be formed by a connector tube 430. The connector tube 430 may include a conductive material to facilitate rapid pacing. For example, the connector tube 430 may be formed with a metal structure such as a stainless steel tube. The connector tube 430 is not covered with a coating or other insulator to allow for rapid pacing. In some configurations, current may alternatively or additionally flow through the one or more pressure wire leads 420. The connector tube 430 may be connected directly or indirectly to the coil portion 412 and/or to the distal tip 432. For example, the coil portion 412 may be indirectly connected to the connector tube 430 by an insulated portion. The insulated portion can provide a length that is insulated from the patient and thus may be an insulator portion 434 in some embodiments. The insulator portion 434 may insulate the patient from the core wire 416. In some configurations, the insulator portion 434 may include a polymeric layer such as PTFE.

At least a non-reduced diameter portion of the core wire 416 may be concentric with the outer tube 410. The core wire 416 may extend through at least the coil portion 412, but may also extend through at least a portion of the insulator portion 434 and/or the connector tube 430 of the outer tube 410. For example, a proximal end of the core wire 416 may be sealed, for example using adhesive 436, to a distal end of the connector tube 430 and extend distally from a distal end of the connector tube 430.

The core wire 416 may include any of the features of the core wire 316. For example, a distal portion of the core wire 416 may include a reduced diameter portion 426. A proximal end of the coil portion 412 may be distal of a transition between the non-reduced diameter portion 428 and the reduced diameter portion 426 of the core wire 416.

The pressure sensor assembly 418 may be disposed radially between the core wire 416 and the outer tube 410 with the pressure sensor 422 positioned radially between the reduced diameter portion 426 of the core wire 416 and the coil portion 412. At least a portion of the pressure sensor assembly 418 may be off-axis relative to a longitudinal axis L of the pressure guidewire 408. For example, a first section 438a of at least one pressure wire lead 420 may be concentric with the outer tube 410 and a second section 438b of the pressure wire lead 420 may be off-axis relative to a longitudinal axis of the outer tube 410. The outer tube 410 may include an opening 440 to permit the pressure wire lead 420 to transition from the first section 438a that is concentric with the outer tube 410 to the second section 438b that is off-axis relative to the longitudinal axis of the outer tube 410. The opening 440 may be a partial thickness cut out or extend through the full thickness of the outer tube 410. If the opening 430 extends through the full thickness of the outer tube 410, the opening 440 may be sealed, for example with adhesive 436, to prevent blood or other fluids from flowing into the pressure guidewire through the opening 440. As shown in FIG. 4, the opening 440 is disposed in the connector tube 430. However, in other configurations, the opening 440 may be disposed in the insulator portion 434.

Alternative to the opening 440, the core wire 416 may be sized or offset relative to a longitudinal axis of the pressure guidewire 408 to permit the pressure wire lead 420 to transition from the first section 438a that is concentric with the outer tube 410 to the second section 438b that is off-axis relative to the longitudinal axis of the outer tube 410. The core wire 416 can have a groove in one side configured to receive a span of the pressure wire lead 420 such that the lead can transition from the first section 438a to the second section 438b.

The pressure guidewire 408 may include a distal tip 432 that is rounded to form an atraumatic tip. For example, the distal tip 432 may have a hemispherical shape. The tip 432 may also reduce or even to prevent ingress of unwanted foreign matter through a distal end of the pressure guidewire 408.

In some configurations, the distal tip 432 is a separate component adhered, welded, and/or otherwise joined to the coil portion 412 and/or the core wire 416. The distal tip may be joined to an inner surface of the coil portion 412 and/or the distal most edge of the coil portion 412. The core wire 416 may be bent up to 180 degrees within the outer tube 410 to strengthen the adhesive joint to the distal tip 432. In other configurations, the distal tip 432 may be an enlarged distal end of the core wire 416 that is distal of the reduced diameter portion 426. The distal end of the core wire 416 may be adhered, welded, and/or otherwise joined to the inner surface and/or distal most edge of the coil portion 412. In one method, the distal tip 432 is formed by transforming an enlarged segment of the core wire 416 into a hemispherical member. The enlarged segment can be melted to form the hemispherical member. The hemispherical member can be joined to a distal portion of the coil portion 412. In any of these configurations, the atraumatic portion of the distal tip 432 may be formed from the core wire 416, adhesive, and/or welding.

b. Tube-Based Pressure Guidewires

FIGS. 5 to 9 illustrate further variations of pressure guidewires that may be used in any of the above-described methods. The pressure guidewires described below may include any of the features of the above-described pressure guidewires 308, 408. In general, the pressure guidewires shown in FIGS. 5 to 9 include an outer tube defining a lumen, connector tube positioned radially inward of the outer tube, a pressure sensor assembly disposed within the lumen of the outer tube, and/or a distal tip. An outer diameter of the pressure guidewire may be uniform or substantially uniform along substantially the entire or entire working length of the pressure guidewire. For example, the outer diameter of the pressure guidewire may be uniform or substantially uniform along the entire working length, excluding distal tip or grinded down curvature. The pressure guidewire may include an outer diameter of up to 0.035 inches, for example between 0.018 inches and 0.035 inches. In some configurations, the distal portion of the pressure guidewire may be formed to an atraumatic curvature 250 as shown in FIG. 2B. In other configurations, the distal portion of the pressure guidewire may remain straight.

The connector tube may include an inner diameter that is less than one-third, or less than one-fourth an outer diameter of the connector tube. For example, the connector tube may include an outer diameter of up to 0.035 inches, for example between 0.018 inches and 0.035 inches, and an inner diameter of less than 0.01 inches, for example less than 0.007 inches. The connector tube may have a uniform outer diameter (see FIG. 5) or a non-uniform diameter (see FIG. 6). In the non-uniform configurations, a reduced diameter portion of the connector tube may have an outer diameter of less than or equal to about 0.027 inches. The connector tube may extend along a majority of or substantially the entire working length of the pressure guidewire. For example, the connector tube may extend at least eighty percent, or at least ninety percent, of the working length of the pressure guidewire.

The connector tube may be constructed of a conductive metal. For example, the connector tube may be a stainless steel tube. A proximal end of the connector tube may be exposed from the proximal end of the outer tube for connection to the monitor display and/or connection to a current generator. Thus, at least the proximal end of the connector tube may be uncoated.

The pressure guidewire may also include a core wire distal to the connector tube. In a venous or trans-apical aortic valve application, the portion with the core wire may be disposed in blood flow downstream of a portion with the connector tube. In an arterial or trans-apical mitral valve application, the portion with the core wire may be disposed in blood flow upstream of a portion with the connector tube. The core wire may include an outer diameter of up to 0.03 inches, for example between 0.018 inches and 0.03 inches. A reduced diameter portion of the core wire may include an outer diameter that is less than one-third, or less than one-fourth, of the outer diameter of the remainder of the core wire. For example, the reduced diameter portion of the core wire may include an outer diameter of less than 0.01 inches or less than 0.0075 inches. The core wire may extend along only a distal portion of the pressure guidewire, for example along less than twenty percent or less than ten percent or less than 5 percent of a working length of the pressure guidewire.

Figure 5:
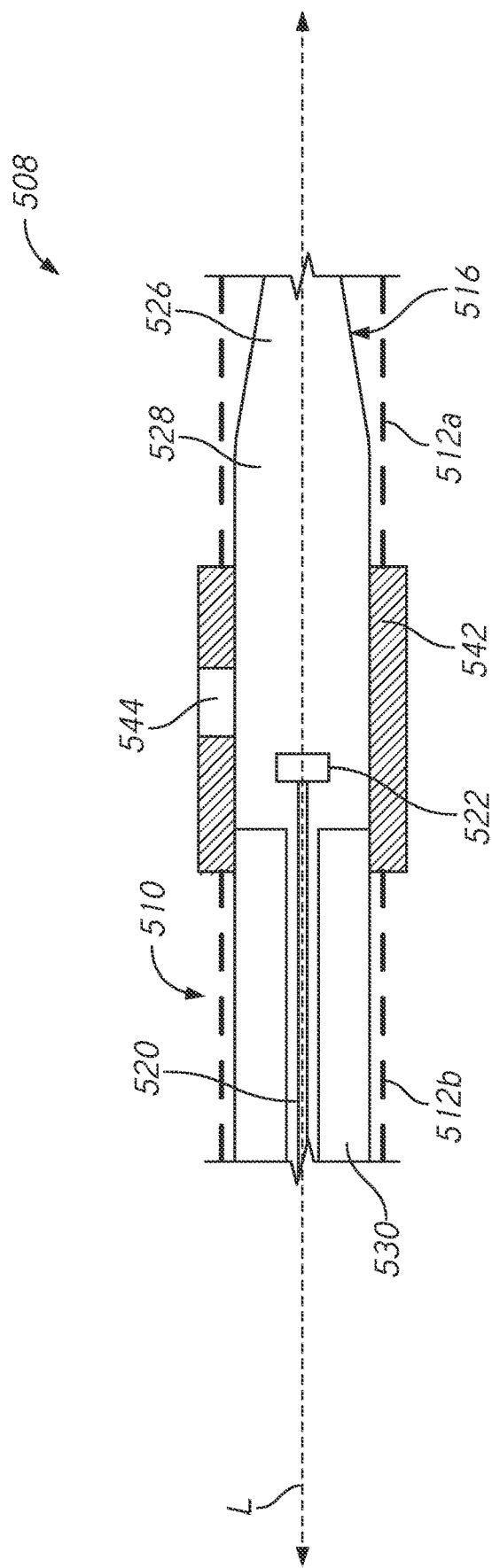
FIG. 5 is a schematic view of another one of the variations of the pressure sensing guidewire shown in FIG. 2B.

FIG. 5 is a schematic view another variation of the pressure sensing guidewire 508. As illustrated, at least a distal portion of the outer tube 510 may be coiled. For example, the coiled portion may be a flat ribbon coil or a round coil. As shown in FIG. 5, the coiled portion may include two coiled sections 512a, 512b separated from each other by a sensor housing 542. Together, the coil portions 512a, 512b may extend along a majority of the working length of the pressure guidewire 508 or along substantially the entire working length of the pressure guidewire 508. For example, together, the coiled portions 512a, 512b may extend at least eighty percent, or at least ninety percent, of the working length of the pressure guidewire 508. With a substantial length of the outer tube 510 being coiled, the coil portions 512a, 512b provides sufficient flexibility to navigate tortuous vasculature. The distal coil portion 512a also promotes safety in case of failure along a coiled portion, e.g., distal tip failure. When used for rapid pacing, the distal coil portion 512a may also ensures electrical contact with the inner walls of the patient's heart, e.g., with inner walls of the left ventricle.

As shown in FIG. 5, at least a proximal portion 528 of the core wire 516 may be concentric with the outer tube 510 and extend through at least a portion of the lumen of the outer tube 510. The diameter of the proximal portion 528 of the core wire 516 may be the same as the outermost diameter of the connector tube 530. At least a portion of the core wire 516 may include a reduced diameter portion 526 such as a tapered portion that is tapered toward the distal end of the pressure guidewire 508. The transition between the proximal portion 528 and the reduced diameter portion 526 of the core wire 516 may be positioned proximal of the atraumatic curvature 250 in the distal section of the pressure guidewire 508 to promote a flexible transition to the atraumatic curvature 250 of the pressure guidewire 508. This flexible transition acts as a force absorber and ensures no kink is formed in the proximal section of the atraumatic curvature 250 of the pressure guidewire 508. A kink could complicate a procedure, such as advancing another catheter over the guidewire 508 or removing the guidewire 308 from the patient without trauma. The core wire 516 may include a conductive material such as stainless steel to provide rapid pacing as described above.

The pressure sensor assembly 518 may include a pressure sensor 522 and one or more pressure wires leads 520 extending from the pressure sensor 522. For example, the pressure sensor 522 may be an optical or electrical sensor, membrane-based sensor, or otherwise. The pressure wire(s) lead(s) 520 may be an optical fiber or electrical wires. The pressure wire(s) lead(s) 520 may extend through the lumen of the connector tube 530. The connector tube 530 locates the pressure wire(s) lead(s) 520 along the central longitudinal axis L of the pressure guidewire 508. The pressure wire(s) lead(s) 520 may be secured to and in some cases also sealed to the connector tube 530, for example using adhesive. In some cases, the adhesive provides a seal to prevent fluid from flowing proximally through the connector tube 530. Adhesive may also be used in the proximal end of the connector tube 530 to secure the optical fiber 520 concentrically to the connector tube 530.

As shown in FIG. 5, the pressure sensor 522 may be disposed within the pressure sensor housing 542 of the outer tube 510. The sensor housing 542 protects the pressure sensor 522 but also provides a connection between the coil portions 512a, 512b. The pressure sensor 522 may be exposed to blood or other fluid through the at least one opening 544 in the sensor housing 542. As illustrated, the sensor housing 542 may be a metal tube joining the two coil portions 512a, 512b, but in other variations, the sensor housing 542 may be formed by welding several coils together to form a welded portion joining the coil portions 512a, 512b.

The sensor housing 542 and the pressure sensor 522 may be positioned proximal of the atraumatic curvature 250 shown in FIG. 2B, for example at location 206A. However, as explained above, the pressure sensor may also be positioned anywhere along the curvature 250 in the distal section of the pressure guidewire 508.

At least a portion of the pressure guidewire 508 may be covered by a lubricious insulator, for example a polymeric layer such as PTFE. When rapid pacing is induced through the connector tube 530 and/or the core wire 516, the insulator may also electrically isolate portions of the pressure guidewire 508. The insulator may replace the need for a separate catheter body to electrically isolate the pressure guidewire 508.

Figure 6:
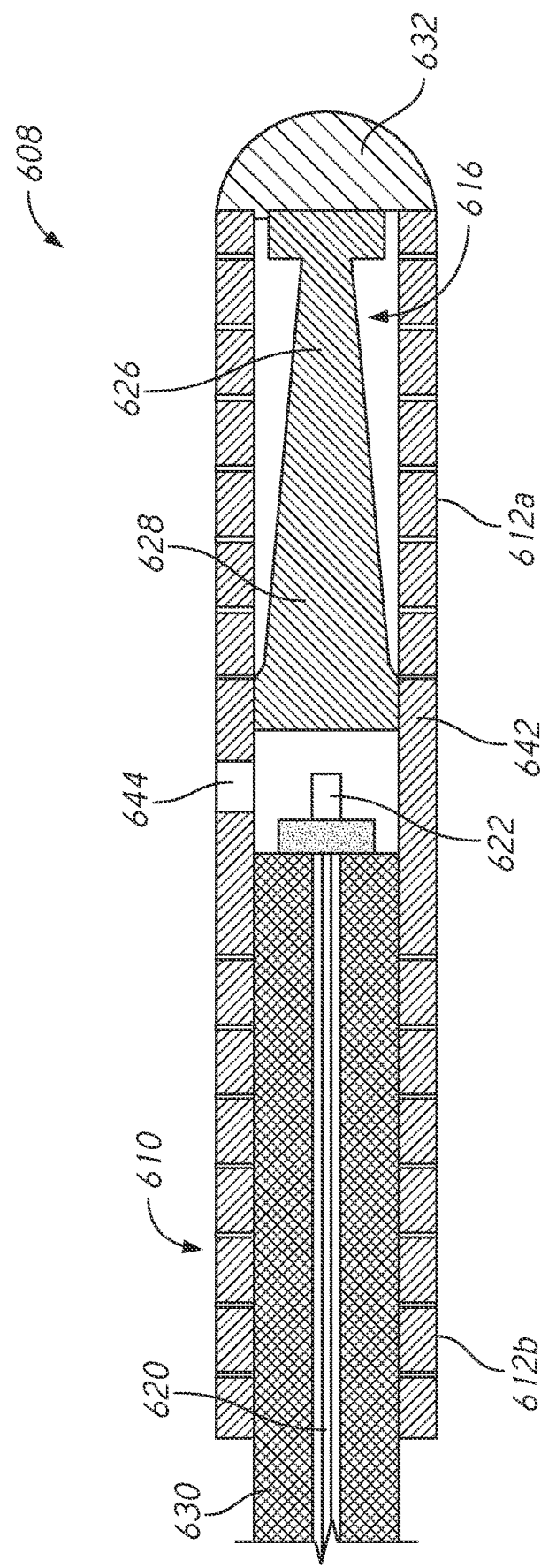
FIG. 6 is a cross-sectional view of another one of the variations of the pressure sensing guidewire shown in FIG. 2B.

FIG. 6 is a cross-sectional view of another variation of the pressure sensing guidewire 608. The pressure sensing guidewire 608 is similar to the pressure sensing guidewire 508 except as described differently below. The disclosure in connection with FIG. 6 can be seen to supplement that of FIG. 5. The pressure sensing guidewire 608 includes a distal tip 632. The distal tip 632 is similar to the distal tip 432 except as described differently below. The distal tip 632 provide for atraumatic interaction with blood vessels, valves and heart wall chambers. The tip 632 also may reduce or prevent ingress of foreign matter, e.g., components or fluid, through a distal end of the pressure guidewire 608. The distal tip 632 may have a hemispherical shape.

In some configurations, the distal tip 632 is a separate component adhered, welded, and/or otherwise joined to the coil portion 612a and/or the core wire 616. The distal tip 632 may be joined to an inner surface of the coil portion 612a and/or the distal most edge of the coil portion 612a. The core wire 616 may be bent up to 180 degrees within the outer tube 610 to strengthen the adhesive joint to the distal tip 632. In other configurations, the distal tip 632 may be an enlarged distal end of the core wire 616 that is distal of the reduced diameter portion 626. The distal end of the core wire 616 may be adhered, welded, and/or otherwise joined to an inner surface and/or distal most edge of the coil portion 612a. In any of these configurations, the atraumatic portion of the distal tip 632 may be formed from the core wire 616, such as by melting or otherwise re-forming an enlarged segment of the core wire 616 to create the desired shape.

Figure 7:
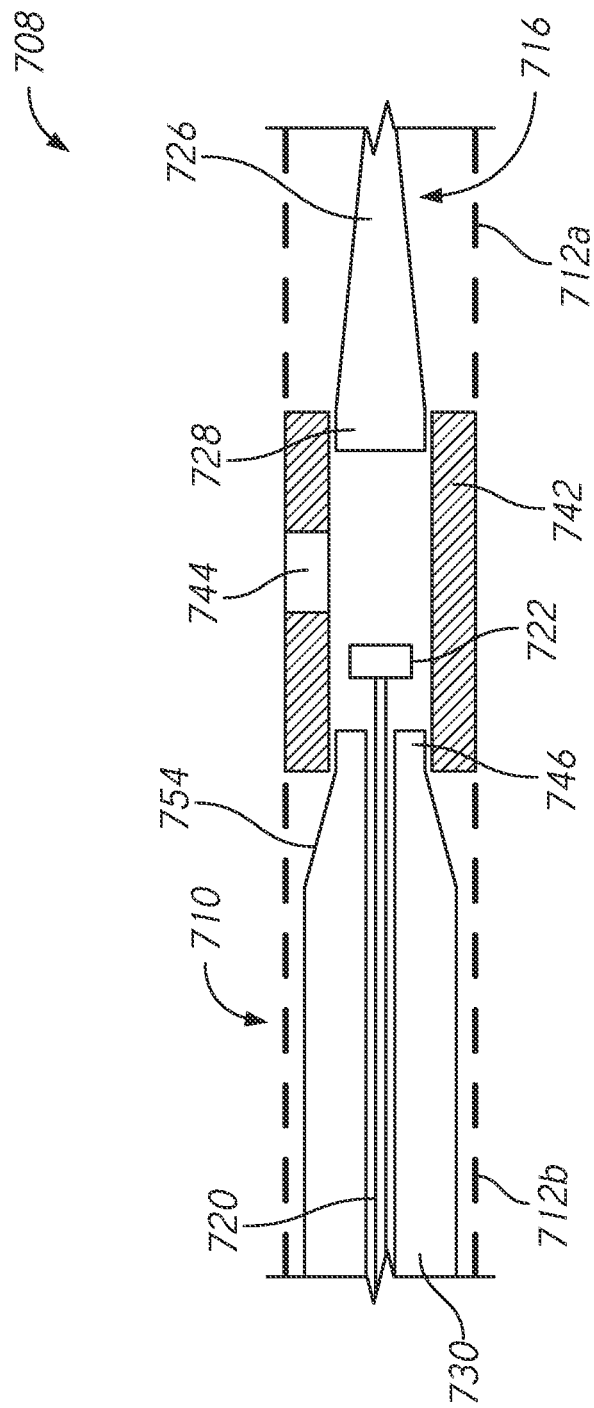
FIG. 7 is a schematic view of another one of the variations of the pressure sensing guidewire shown in FIG. 2B.

FIG. 7 is a schematic view of another variation of the pressure sensing guidewire 708. The pressure sensing guidewire 708 is similar to the pressure sensing guidewire 508 except that sensor housing 742 and pressure sensor 722 may be positioned more distally into the distal curvature 250 of the pressure guidewire 708, for example at locations 206B or 206C shown in FIG. 2B. However, as discussed above, it can be beneficial to reduce the diameter of the inner core wire to promote flexibility at the transition to the distal curvature 250. Thus, the sensor housing 742 and the pressure sensor 722 may be positioned in a region in which the connector tube 730 and/or core wire 716 have transitioned to a reduced diameter. For example, as shown in FIG. 7, the connector tube 730 may have a reduced diameter section 746 at the distal end of the connector tube 730. The connector tube 730 may be tapered toward the reduced diameter section 746 at tapered portion 754. A diameter of the proximal end of the core wire 716 may also be less than an outermost diameter of the connector tube 730, e.g. at a distal end or distal region thereof. In this configuration, an outer diameter of the sensor housing 742 may also be reduced compared to the sensor housing 542.

Figure 8:
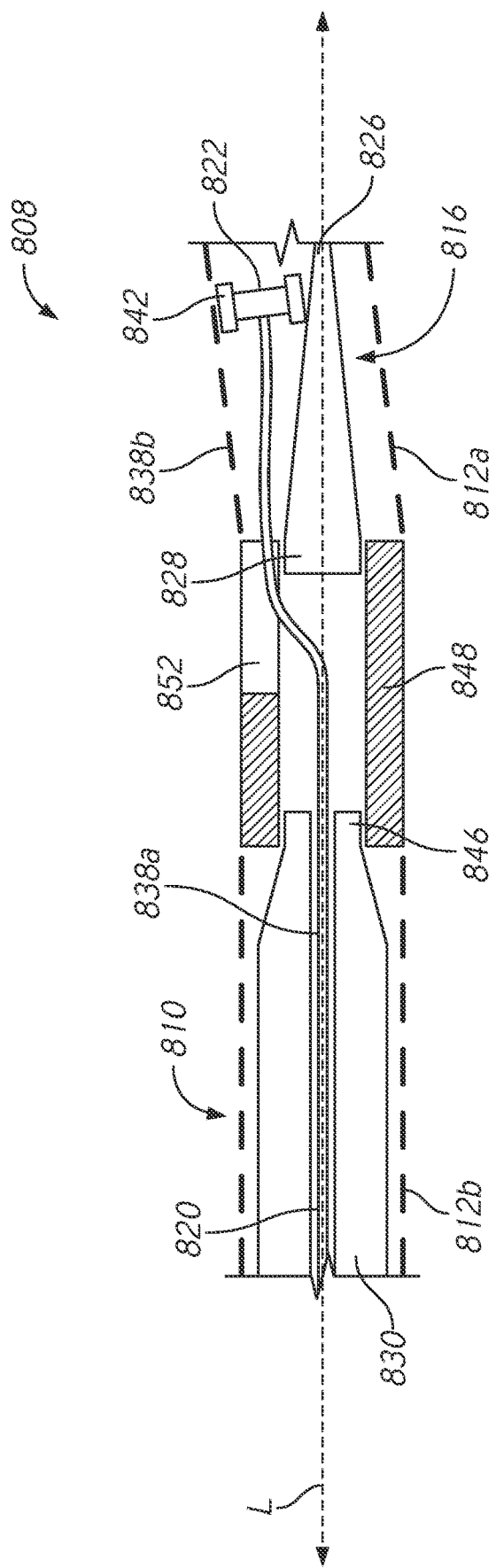
FIG. 8 is a schematic view of another one of the variations of the pressure sensing guidewire shown in FIG. 2B.

FIG. 8 is a schematic view of another variation of the pressure sensing guidewire 808. The pressure sensing guidewire 808 is similar to the pressure sensing guidewire 708 except that sensor housing 842 and pressure sensor 822 may be positioned more distally into the distal curvature 250 of the pressure guidewire 808, for example at location 206D shown in FIG. 2B. However, as discussed above, it can be beneficial to reduce the diameter of the inner core wire to promote flexibility at the transition to the distal curvature 250. Thus, in the region of 206D in the distal curvature 250, the reduced diameter portion 826 of the core wire 816 may have a sufficiently reduced diameter to permit the positioning of the sensor 822 radially between the distal coil portion 812a and the reduced diameter portion 826 of the core wire 816. As shown in FIG. 8, the sensor 822 may have a separate sensor housing 842 positioned around the sensor 822.

Instead of a sensor housing along the outer tube 810, the pressure guidewire 808 includes a connector 848 extending between the coil portions 812a, 812b. The connector 848 may include an opening 852 to permit at least one pressure wire lead 820 to transition from the first section 838a that is concentric with the outer tube 410 and within the connector tube 830 to the second section 838b that is off-axis relative to the longitudinal axis L of the outer tube 810. The opening 840 may be a partial thickness cut out or extend through the full thickness of the outer tube 810. If the opening 830 extends through the full thickness of the outer tube 810, the opening 840 may be sealed, for example with adhesive, to prevent fluid from flowing into the pressure guidewire through the opening 840.

Figure 9:
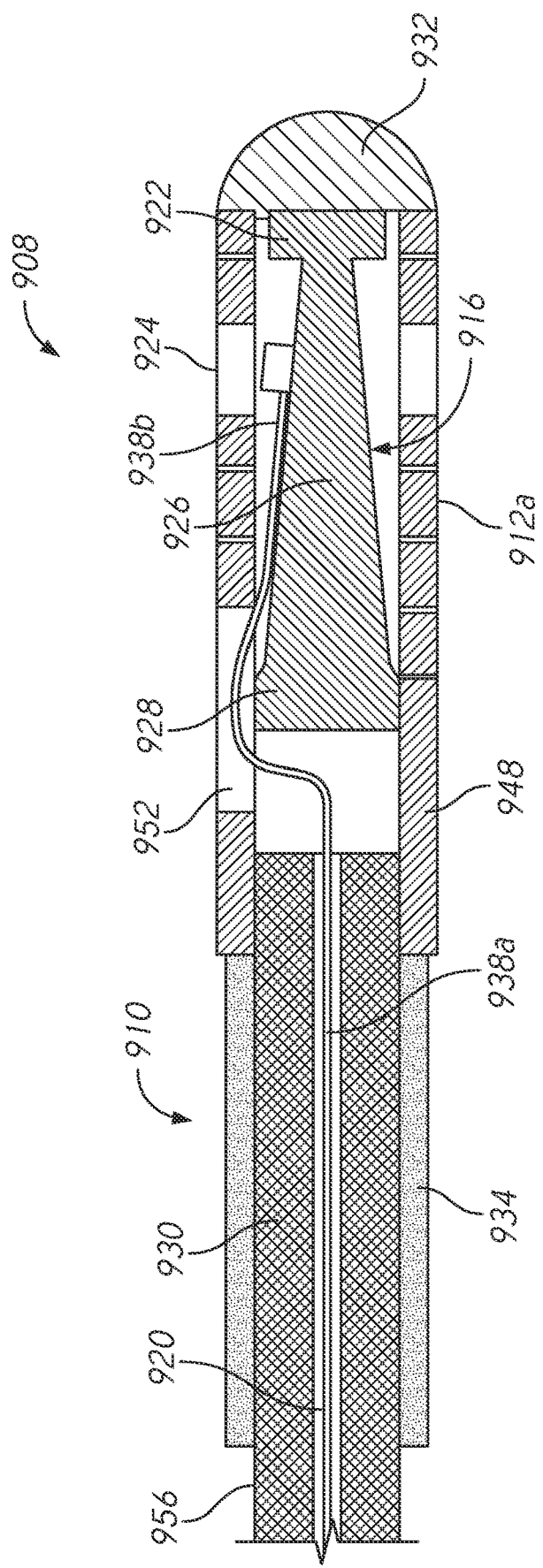
FIG. 9 is a cross-sectional view of another one of the variations of the pressure sensing guidewire shown in FIG. 2B.

FIG. 9 is a cross-sectional view of another variation of the pressure sensing guidewire 908. The pressure sensing guidewire 908 is similar to the pressure sensing guidewire 808 except that except that FIG. 9 includes distal tip 932. The distal tip 932 may include any of the features of the distal tip 632 shown in FIG. 6.

The outer tube 910 includes an insulator portion 934 and a coil portion 912 joined by the connector 948. The insulator portion 934 surrounds at least a portion of the connector tube 930. The insulator portion 934 may include a polymeric layer such as PTFE to electrically isolate the connector tube 930 from the patient during rapid pacing. A proximal end 956 of the connector tube 930 may be exposed from the proximal end of the insulator portion 934 for connection to the monitor display and/or connection to a current generator. Thus, at least the proximal end of the connector tube 930 may be uncoated.

As illustrated, the connector 948 may be a metal tube joining the insulator portion 934 and the coil portion 912, but in other variations, the connector 948 may be a welded portion joining the insulator portion 934 and the coil portion 912.

The one or more pressure wires leads 920 may be sealed to the inner lumen of the connector tube 930, for example using adhesive, to prevent fluid from flowing proximally and ensuring concentricity of the optical fiber for signal transmission.

The pressure sensor 922 may be exposed to blood or other fluid through the spacing or gaps in the coil portion 912. The outer tube 910 may also include sensor housing section 924. The sensor housing section may be stiffer than the remainder of the coil portion 912. For example, the sensor housing section 924 may be a metallic tube splitting the coil portion 912 into two sections. The sensor housing section 924 may be mounted to a distal portion of a first coil section of the coil portion 912 and to a proximal portion of a second coil section of the coil portion 912. The sensor housing section 924 may include one or more openings to expose the pressure sensor 922 to blood or other fluid. As another example, the coil portion 912 may include two coils welded together to create a stiffened section that serves as the sensor housing section 924.

III. Heart Valve Assessment User Interface Systems

Existing user interfaces may be incapable of or deficient at indicating a condition of a heart valve before, during, and/or immediately after the deployment of structural heart device. During a structural heart procedure, existing user interfaces may be unable to provide one or more pressure curves or indicators of a heart valve condition, such as a valve regurgitation index or a pressure gradient. Further, existing user interfaces for structural heart procedures may have limited the user interaction capabilities, such as a lack of options to allow a user to customize one or more user interfaces. Existing patient monitors and/or displays may have limited visual space to present indicators, such as heart valve conditions, diagnostics, physiological parameters, or other data.

Accordingly, the user interfaces of heart valve assessment systems disclosed herein can improve over existing user interfaces. During a structural heart procedure, one or more indicators of a heart valve condition can be provided to a clinician via a user interface. The user interface can be organized to provide information in an efficient manner. Specific graphical representations or indicators can be presented or selected by a user that allow a clinician to quickly assess a heart valve condition or issue. The systems and techniques described herein can enable clinicians to access data faster, perform analyses faster, and/or interact with one or more user interfaces faster than existing graphical user interface systems (such as by reducing the number of clicks or selections by a user). The user interfaces described herein can improve over existing user interfaces by providing more efficient use of limited visual space on small monitors or displays. For example, the visual indicators, graphical representations, and/or combinations thereof can provide information to users related to heart valve conditions in an efficient manner that is configured for monitors or displays with limited space. Thus, the systems and techniques described herein can improve over conventional user interfaces.

As used herein, in addition to its ordinary meaning, a "cardiovascular region" refers broadly to any area with or around the heart, such as the left or right ventricle, aorta, the left or right atrium, the vena cava, and/or a blood flow passage adjacent to a portion of the heart (such as a blood flow chamber, a blood vessel, a pulmonary artery).

The heart valve assessment systems described herein can advantageously provide indicators of a heart valve condition, such as a pressure gradient or a valve regurgitation index. As used herein, in addition to its ordinary meaning, a "pressure gradient" or "gradient" can refer to a severity or measurement of the narrowing (or stenosis) of a valve by the increase in pressure behind it. Example gradients are provided herein such as peak to peak gradient, an area gradient, or an instantaneous gradient. A peak to peak gradient can indicate a difference in pressure between a maximum or local maximum systolic pressure of a first cardiovascular region (such as the left ventricle LV) and a second cardiovascular region (such as the aorta Ao). An area gradient can indicate an area between two graphs such as pressure curves. An instantaneous gradient can indicate a maximum or local maximum pressure between a first cardiovascular region and a second cardiovascular region in a heartbeat cycle. As used herein, in addition to its ordinary meaning, "valve regurgitation index," "regurgitation index," or "regurgitation," can refer to a leakiness measurement of a valve. A regurgitation calculation can include a difference in pressure at the end of a diastolic cycle divided or normalized by a systolic pressure. An aortic regurgitation calculation can correspond to the following equation: aortic regurgitation index=(aortic diastolic blood pressure−left ventricular diastolic pressure)/aortic systolic blood pressure. Another heart valve condition can include rapid pacing of a heart. The systems, techniques, and/or graphical user interfaces described herein can provide clinicians additional data on which to base treatment/operation decisions. For example, the heart valve conditions and/or related user interfaces can provide additional information for a clinician to address a valve disease, modify a replacement valve during a procedure, and/or to make a recommendation following a valve procedure.

Regurgitation can occur when blood leaks back through the valve. Regurgitation may be caused by valve disease or in the case of prosthetic replacement it may be caused by malapposition of the replacement valve against the native valve.

a. Example User Interfaces

FIGS. 10A-10E, 11A-11C, and 12 depict example heart valve assessment user interfaces. A heart valve assessment system can be the same as, similar to, or can include similar components as the diagnostic system 200 described above in FIG. 2A. For convenience, the user interfaces will be described as being presented by the diagnostic system 200 or the monitor 204, although other computing systems may present the user interfaces. These user interfaces can be presented by the monitor 204 described above using, for example, data received from a pressure guidewire 208, a pressure sensing access catheter 20, or a pressure sensing pigtail catheter 10. Thus, each of the user interfaces shown may be output for presentation by electronic hardware as graphical user interfaces.

Each of the user interfaces shown includes one or more user interface elements or controls that can be selected by a user. The user interfaces can enable the receiving of user input. The user interface elements shown are merely illustrative examples and can be varied in other embodiments. For instance, aspects of the user interfaces may be rearranged from what is shown and described below, and/or particular aspects may or may not be included. Further, the user interfaces shown may be combined or divided into other user interfaces such that similar functionality or the same functionality may be provided. The user interfaces of FIGS. 10A-10E such as, the user interfaces 1000, 1020, 1040, 1060, and/or 1080 may have similar user interface elements and/or capabilities. Moreover, each of the user interface elements may be selected by a user using one or more input options, such as a mouse, touch screen input (e.g., finger or pen), or keyboard input, among other user interface input options.

Figure 10A:
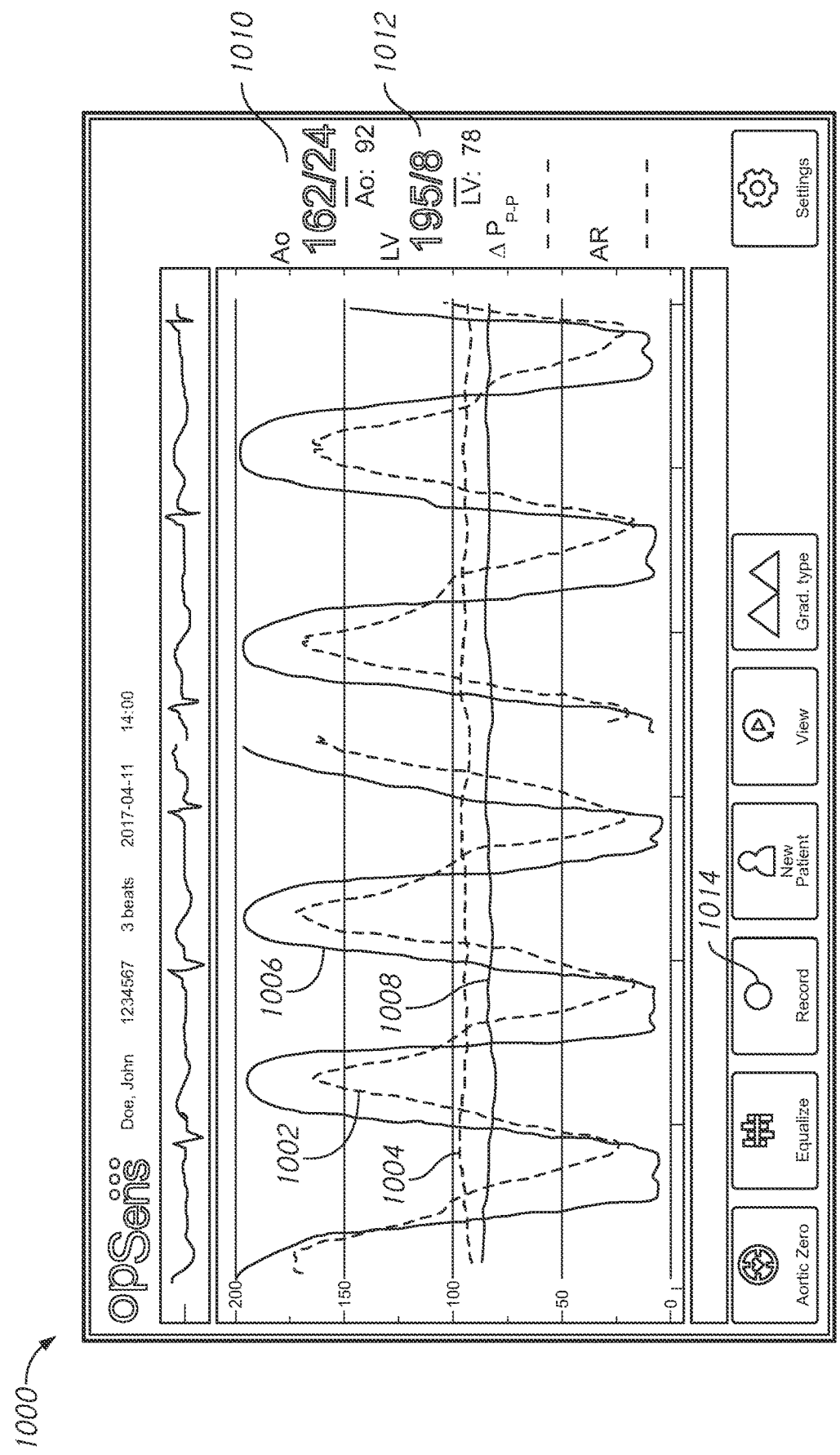
FIGS. 10A-10E are user interfaces for a heart valve assessment system.

FIGS. 10A-10E depict example user interfaces that may be presented by the monitor 204 described above. In FIG. 10A, the user interface 1000 can be presented before, during, and/or immediately after a heart procedure. The user interface 1000 can include one or more graphs 1002, 1004, 1006, 1008 and one or more physiological parameters 1010, 1012. The example graphs 1002, 1004, 1006, 1008 can include or be pressure waves. The graphs 1002, 1004, 1006, 1008 can represent pressure values that correspond to measurements from a cardiovascular region. The pressure values can include a series of numerical pressure values over time. A cardiovascular region can include a portion of a heart (such as a left ventricle LV, a right ventricle RV, or a mitral valve) and/or a blood flow passage adjacent to a portion of the heart (such as the aorta Ao, vena cava, or a pulmonary artery). The one or more graphs 1002, 1004, 1006, 1008 and/or the one or more physiological parameters 1010, 1012 can update in near or real time as pressure measurements are captured from a patient.

As shown, the user interface 1000 can include a first graph 1002 for a first cardiovascular region, such as the aorta Ao, and a second graph 1006 for a second cardiovascular region, such as the left ventricle LV. The additional graphs 1004, 1008 can correspond to a statistical measure of pressure values from a cardiovascular region such as a mean or average pressure value for the aorta Ao or the left ventricle LV. The statistical measure can be based on a configuration parameter, which can be user selected, that indicates the statistical measure period, such as a quantity of heartbeats or a period of time to calculate the statistical measure. In some embodiments, the one or more graphs 1002, 1004, 1006, 1008 can have indicators to indicate the corresponding cardiovascular region for the graph (for example, the aorta Ao graphs 1002, 1004 can be color-coded red and the left ventricle LV graphs 1006, 1008 can be color-coded blue).

As shown, the user interface 1000 can include first physiological parameters 1010 for a first cardiovascular region, such as the aorta Ao, and second physiological parameters 1012 for a second cardiovascular region, such as the left ventricle LV. The physiological parameters 1010, 1012 can include a systolic blood pressure, a diastolic blood pressure, and/or a statistical measure for blood pressure such as a mean or average systolic or diastolic blood pressure or some combination thereof for a particular cardiovascular region. The statistical measure physiological parameter can correspond to the additional graphs 1004, 1008.

The user interface 1000 can include one or more user interface options, such as the record option 1014. A clinician can select the record option 1014 to record the blood pressure values, other measurements, and/or other values associated with the procedure. The clinician can then playback the recorded data. In some embodiments, a heart valve condition such as, but not limited to, a gradient or a regurgitation index, may be presented to a user during the playback mode.

Figure 10B:
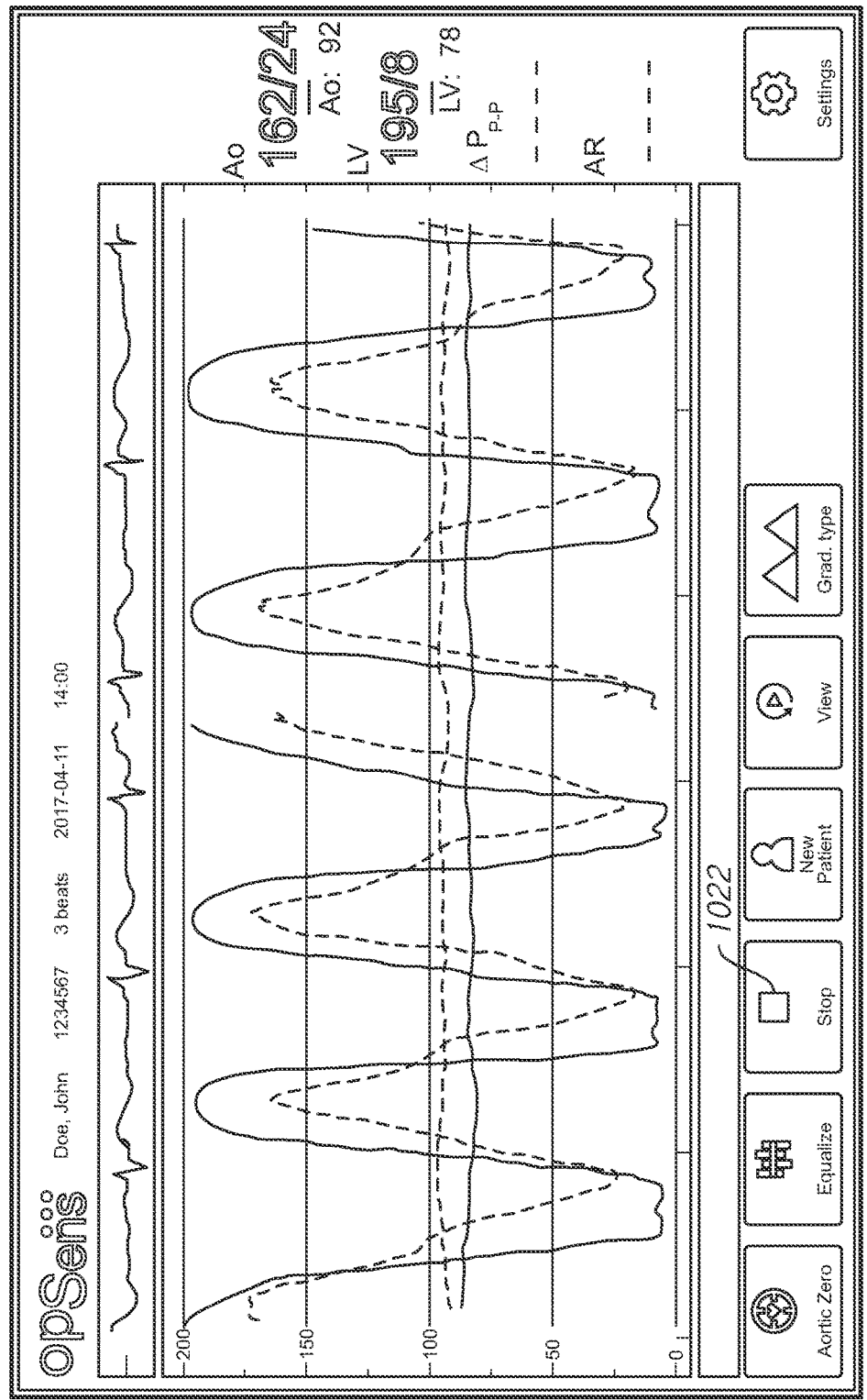

Turning to FIG. 10B, another user interface 1020 is depicted. The additional user interface 1020 can be similar to the user interface 1000 of FIG. 10A. However, the additional user interface 1020 can include a stop recording option 1022 that can enable a user to stop the recording of patient data. In some embodiments, once stopped, a user can enter a playback mode to view a heart valve condition such as, but not limited to, a gradient or a regurgitation index.

Figure 10C:
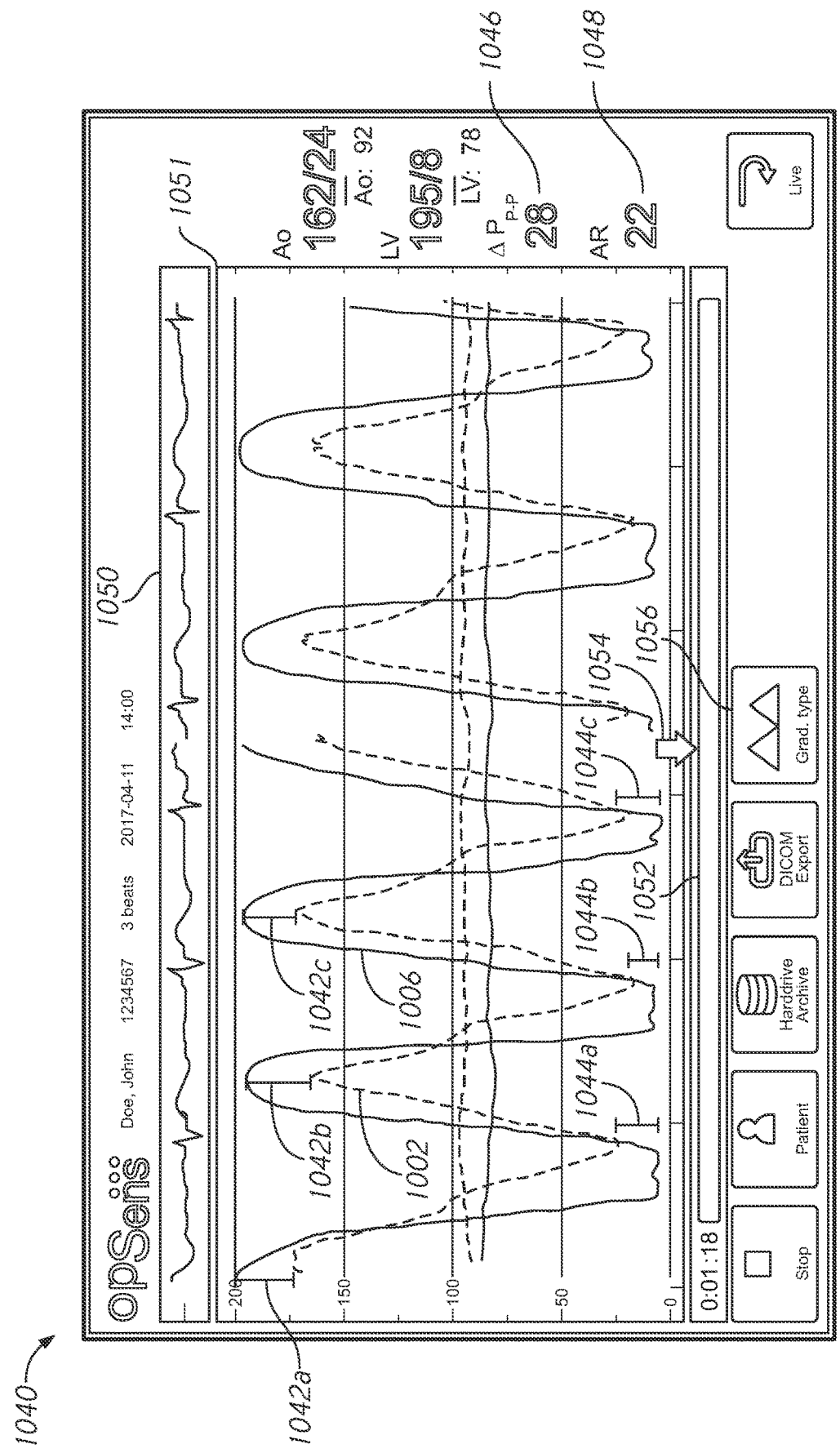

Turning to FIG. 10C, yet another user interface 1040 is depicted. The additional user interface 1040 can be similar to the user interface 1000 of FIG. 10A. The additional user interface 1040 can include a first graph 1002 and a second graph 1006 similar to the first and second graphs of FIG. 10A. However, the additional user interface 1040 can present one or more gradient representations 1042a, 1042b, 1042c that visually presents a gradient measurement between a first peak in the first graph 1002 and a second peak in the second graph 1006. The one or more gradient representations 1042a, 1042b, 1042c can correspond to a gradient type such as a peak to peak gradient type.

The use interface 1040 can include a first numerical value 1046 that corresponds to a gradient type such as a peak to peak gradient type. The first numerical value 1046 can correspond to a difference in pressure between a maximum or local maximum systolic pressure of a first cardiovascular region (such as the left ventricle LV) and a second cardiovascular region (such as the aorta Ao). In some embodiments, the first numerical value 1046 can include a statistical measure, such as an average or mean difference in pressure between a maximum or local maximum systolic pressure, for multiple heartbeat cycles. As shown, the first numerical value 1046 (here 28) can be a statistical measure of peak-to-peak measurements for multiple heartbeats that correspond to the three graphical peak-to-peak measurements 1042a, 1042b, 1042c.

The user interface 1040 can present one or more regurgitation representations 1044a, 1044b, 1044c. As shown, the one or more regurgitation representations 1044a, 1044b, 1044c can visually present a regurgitation measurement between a first point in the first graph 1002 and a second point in the second graph 1006. The one or more regurgitation representations 1044a, 1044b, 1044c can correspond to a calculation in a difference in pressure at the end of a diastolic cycle (here aortic A end-diastolic blood pressure minus left ventricular LV end-diastolic pressure) divided or normalized by a systolic pressure (here aortic systolic blood pressure).

The use interface 1040 can include a second numerical value 1048 that corresponds to a regurgitation index. The second numerical value 1048 can correspond to a difference in pressure at the end of a diastolic cycle divided or normalized by a systolic pressure. In some embodiments, the second numerical value 1048 can include a statistical measure, such as an average or mean regurgitation for multiple heartbeat cycles. As shown, the second numerical value 1048 (here 22) can be a statistical measure of regurgitation calculations for multiple heartbeats that correspond to the three regurgitation representations 1044a, 1044b, 1044c.

The use interface 1040 can include an electrocardiography graph 1050. The electrocardiography graph 1050 can be disabled or enabled by a user. Accordingly, the electrocardiography graph 1050 can be removed or omitted from the use interface 1040. While not illustrated, in some embodiments, if the electrocardiography graph 1050 is removed or omitted, the pressure graph display 1051 can expand in size in the user interface 1040.

The use interface 1040 can include a playback control 1052 and a gradient type selector 1056. As shown, the playback control 1052 can present a time (here 0:01:18) and a current playback position 1054. In some embodiments, a user can interact with the playback control 1052 to advance or rewind playback of one or more graphs and corresponding indicators of heart valve condition(s). A user can change the gradient type of the user interface 1040 by selecting the gradient type selector 1056, which can cause an updated user interface to be presented instead of the present use interface 1040.

Figure 10D:
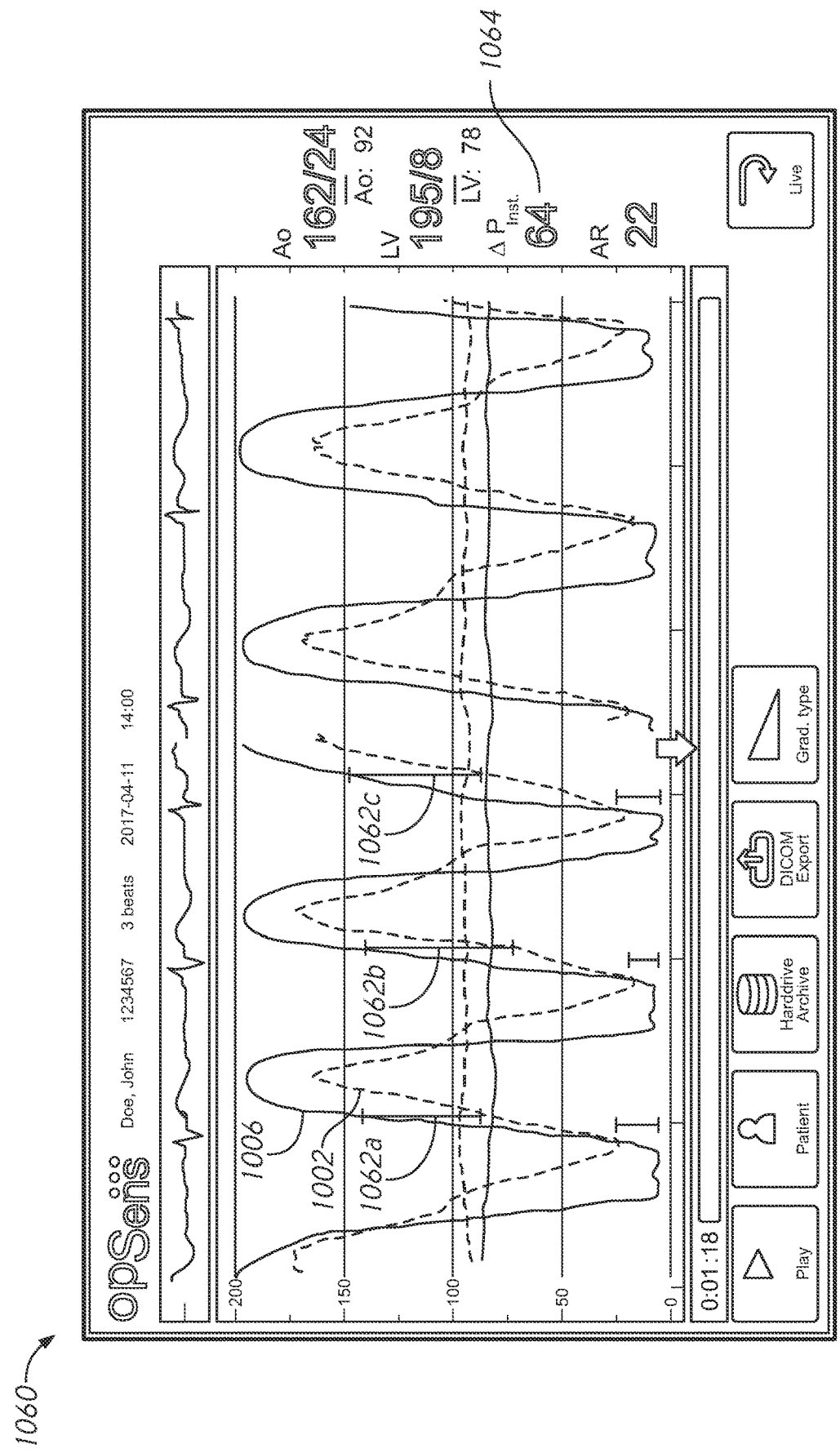

Turning to FIG. 10D, yet another user interface 1060 is depicted. The additional user interface 1060 can be similar to the user interface 1040 of FIG. 10C. The additional user interface 1040 can include a first graph 1002 and a second graph 1006 similar to the first and second graphs of FIG. 10C in addition to other similar user interface elements. However, the additional user interface 1060 can present one or more gradient representations 1062a, 1062b, 1062c that visually presents a gradient measurement between a first point in the first graph 1002 and a second point in the second graph 1006. The one or more gradient representations 1062a, 1062b, 1062c of the additional user interface 1060 can be presented in response to a user selection, such as a user selection of the gradient type selector 1056 of FIG. 10C.

The one or more gradient representations 1062a, 1062b, 1062c can correspond to a gradient type such as an instantaneous gradient type. The instantaneous gradient representations 1062a, 1062b, 1062c can indicate a maximum or local maximum pressure difference between a first cardiovascular region and a second cardiovascular region in a heartbeat cycle. The use interface 1060 can include a numerical value 1064 (here 64) that corresponds to a gradient type such as an instantaneous gradient type. The numerical value 1064 can indicate a maximum or local maximum pressure difference between a first cardiovascular region (such as the left ventricle LV) and a second cardiovascular region (such as the aorta Ao) in a heartbeat cycle. In some embodiments, the numerical value 1064 can include a statistical measure, such as an average or mean maximum or local maximum pressure difference for multiple heartbeat cycles. As shown, the numerical value 1064 can be a statistical measure of instantaneous gradient measurements for multiple heartbeats that correspond to the three graphical instantaneous measurements 1062a, 1062b, 1062c.

Figure 10E:
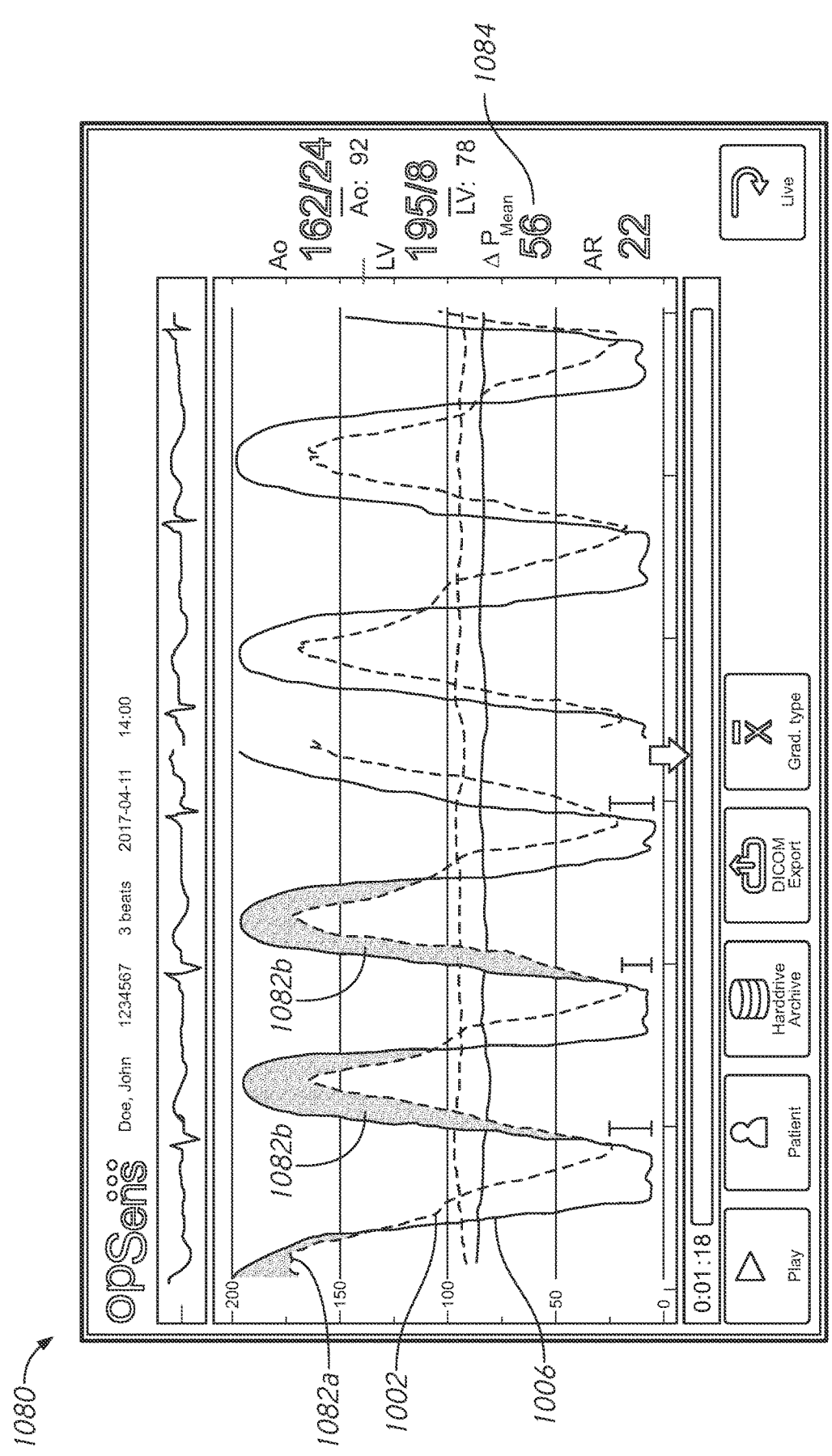

Turning to FIG. 10E, yet another user interface 1080 is depicted. The additional user interface 1080 can be similar to the user interface 1040 of FIG. 10C. The additional user interface 1080 can include a first graph 1002 and a second graph 1006 similar to the first and second graphs of FIG. 10C in addition to other similar user interface elements. However, the additional user interface 1080 can present one or more gradient representations 1082a, 1082b, 1082c that visually presents an area between the first graph 1002 and the second graph 1006. The one or more gradient representations 1082a, 1082b, 1082c of the additional user interface 1060 can be presented in response to a user selection, such as one or more user selections of the gradient type selector 1056 of FIG. 10C.

The one or more gradient representations 1082a, 1082b, 1082c can correspond to a gradient type such as an area gradient type. The area gradient representations 1082a, 1082b, 1082c can indicate a difference in pressure between a first cardiovascular region and a second cardiovascular region. The use interface 1080 can include a numerical value 1084 (here 56) that corresponds to a gradient type such as an area gradient type. The numerical value 1084 can indicate an area between two graphs corresponding to a first cardiovascular region (such as the left ventricle LV) and a second cardiovascular region (such as the aorta Ao). In some embodiments, the numerical value 1084 can include a statistical measure, such as an average or mean area between two graphs or pressure curves for multiple heartbeat cycles. As shown, the numerical value 1084 can be a statistical measure of area gradient measurements for multiple heartbeats that correspond to the three graphical instantaneous measurements 1082a, 1082b, 1082c.

Figure 11A:
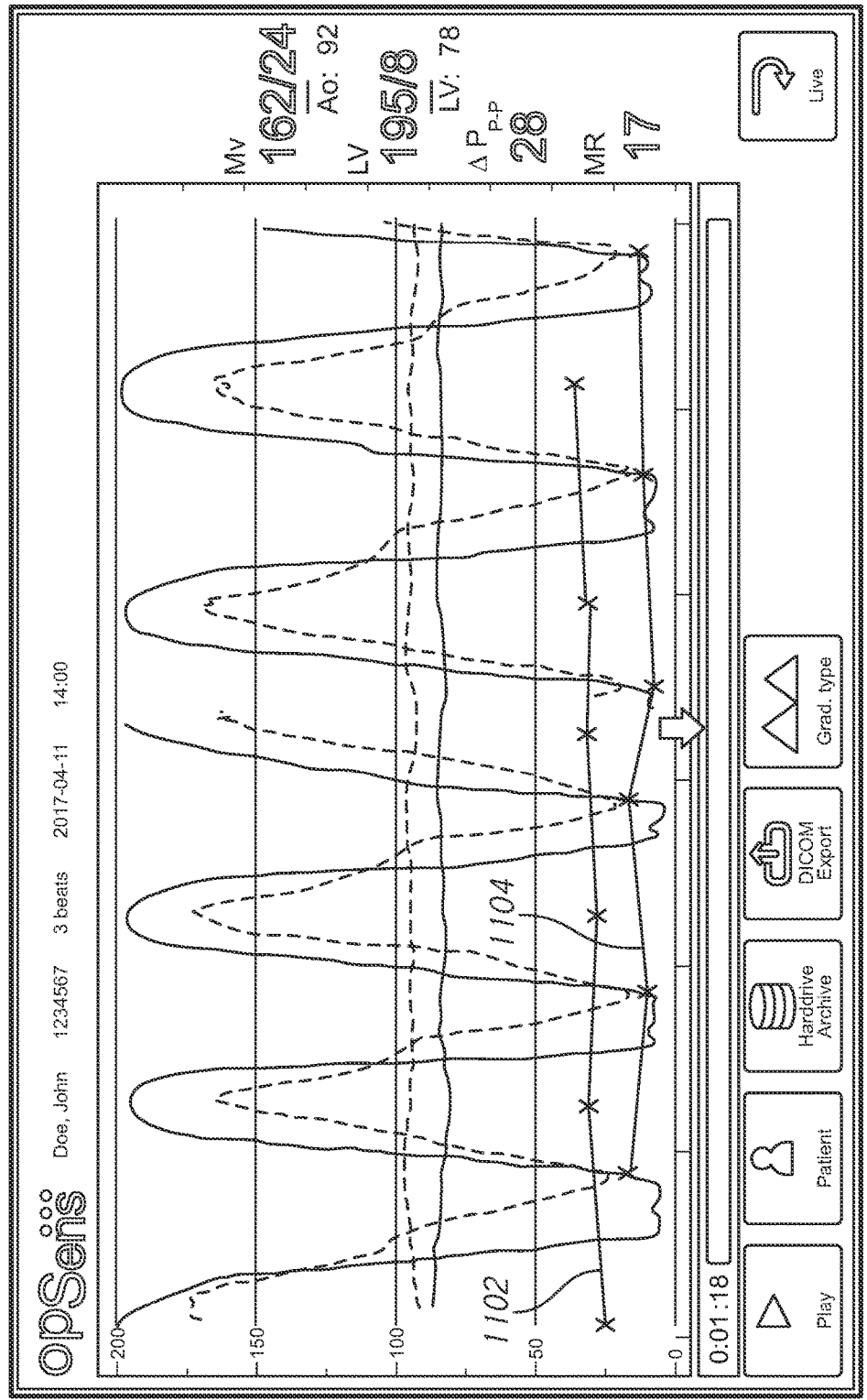
FIGS. 11A-11C are additional user interfaces for a heart valve assessment system.
Figure 11B:
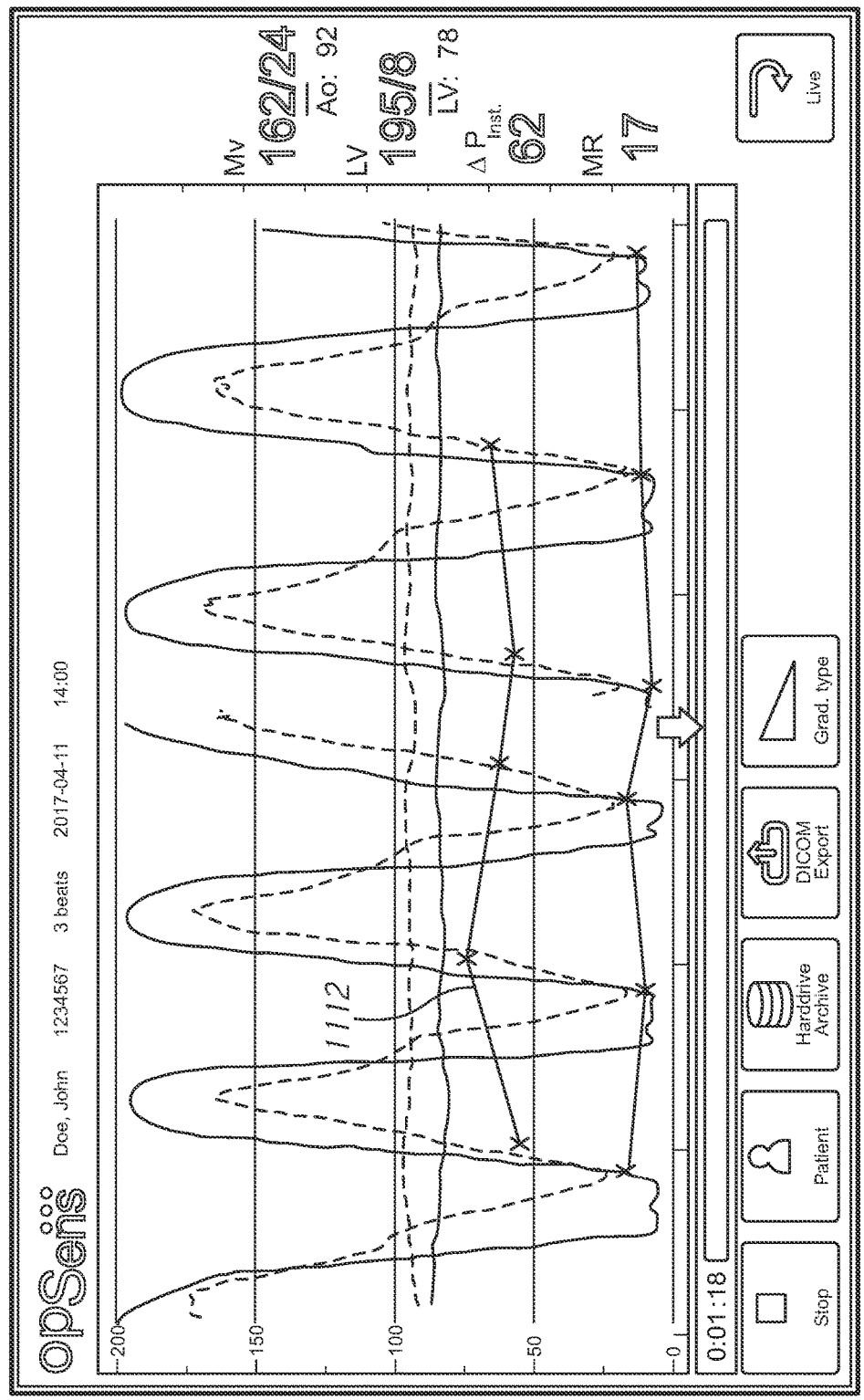
Figure 11C:
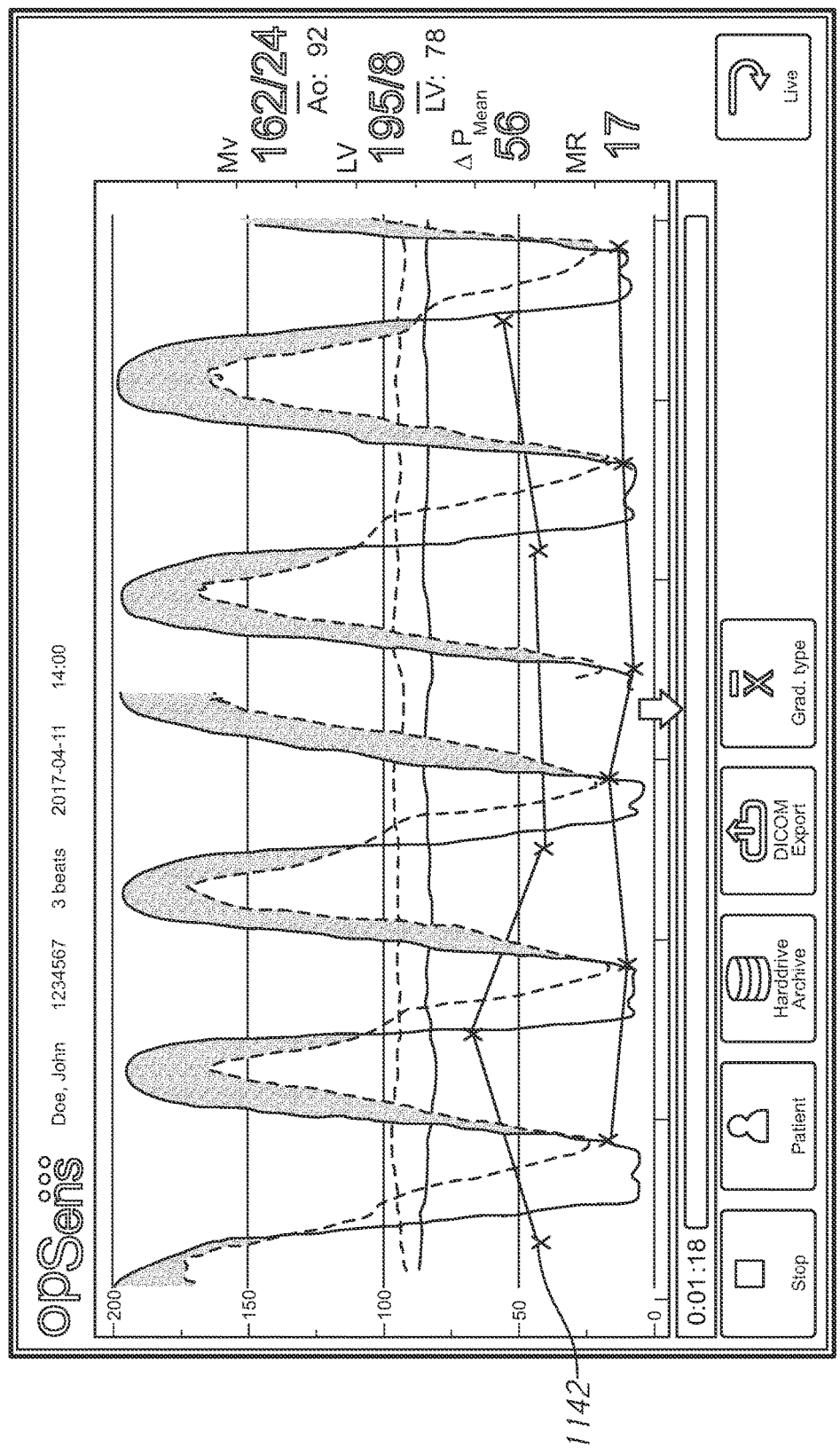

FIGS. 11A-11C depict additional example user interfaces that may be presented by the monitor 204 described above. The user interfaces 1100, 1120, 1140 of FIGS. 11A, 11B, 11C may be similar to the user interfaces 1040, 1060, 1080 of FIGS. 10C, 10D, 10E, respectively. In particular, the user interfaces 1100, 1120, 1140 of FIGS. 11A, 11B, 11C may present alternative gradient representations than the gradient representations of the user interfaces 1040, 1060, 1080 of FIGS. 10C, 10D, 10E, respectively. Further, the user interfaces 1100, 1120, 1140 of FIGS. 11A, 11B, 11C can depict user interfaces that present a heart valve condition(s) for a mitral valve.

In FIG. 11A, the user interface 1100 can include a gradient representation 1102. The gradient representation 1102 can be for a peak to peak gradient type, which can be similar to the peak to peak gradient type of FIG. 10C. However, instead of a measurement visualization between two peaks, the gradient representation 1102 can depict one or more pressure values corresponding to peak to peak gradients in a graph format. An advantage of the gradient representation 1102 of FIG. 11A is that it can enable a clinician to quickly review relative peak-top-peak pressure changes over time that can include past and present measurements.

The regurgitation representation 1104 of FIG. 11A can be similar to the regurgitation representations 1044a, 1044b, 1044c of FIG. 10C. However, similar to the gradient representation 1102, the regurgitation representation 1104 can depict one or more pressure values corresponding to valve regurgitation in a graph format instead of a measurement visualization between two points.

Turning to FIG. 11B, the user interface 1120 can include another gradient representation 1122. The gradient representation 1122 can be for an instantaneous gradient type, which can be similar to the instantaneous gradient type of FIG. 10D. However, instead of a measurement visualization between two points, the gradient representation 1122 can depict one or more pressure values corresponding to peak to peak gradients in a graph format. Similar to the gradient representation 1102 of FIG. 11A, an advantage of the gradient representation 1122 of FIG. 11B is that it can enable a clinician to quickly review relative instantaneous pressure changes over time that can include past and present measurements.

Turning to FIG. 11C, the user interface 1140 can include another gradient representation 1142. The gradient representation 1142 can be for an area gradient type, which can be similar to the area gradient type of FIG. 10E. However, instead of or in addition to depicting an area between two graphs as the exclusive visualization, the gradient representation 1142 can depict one or more pressure values corresponding to area gradients in a graph format. Similar to the gradient representation 1102 of FIG. 11A, an advantage of the gradient representation 1142 of FIG. 11C is that it can enable a clinician to quickly review relative pressure changes over time that can include past and present measurements.

Figure 12:
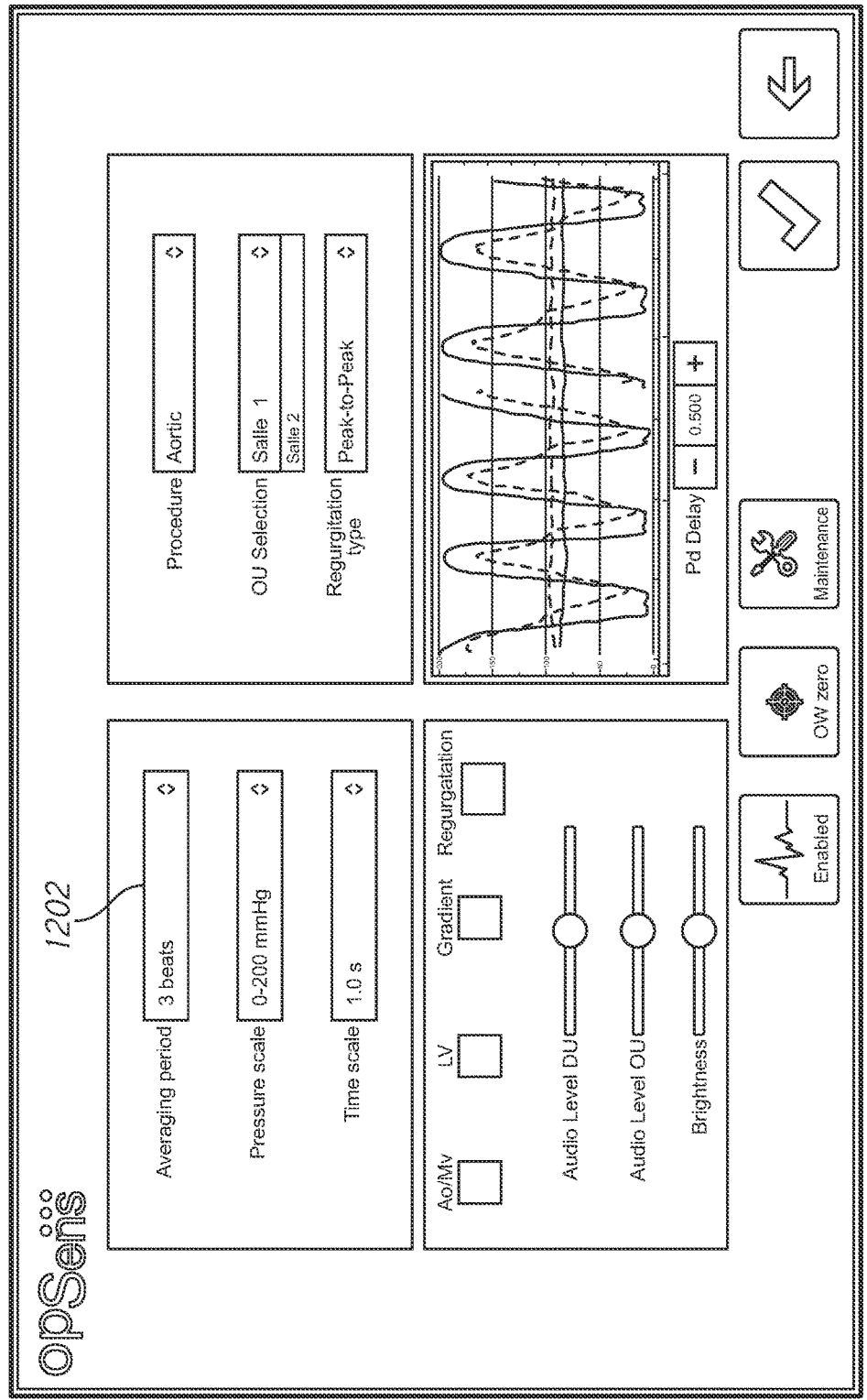
FIG. 12 is a configuration user interface for a heart valve assessment system.

FIG. 12 depicts a configuration user interface 1200 for a heart valve assessment system. A clinician can use the configuration user interface 1200 to configured one or more user interfaces. The configuration user interface 1200 can enable a clinician to select a procedure type, a default regurgitation type, a time scale, a pressure scale, and/or other customizable user interface options. The configuration user interface 1200 can include a statistical measure period selector 1202 that can allow a user to select a quantity of heartbeats for a statistical measure calculation.

b. User Interface Generation Processes

Figure 13:
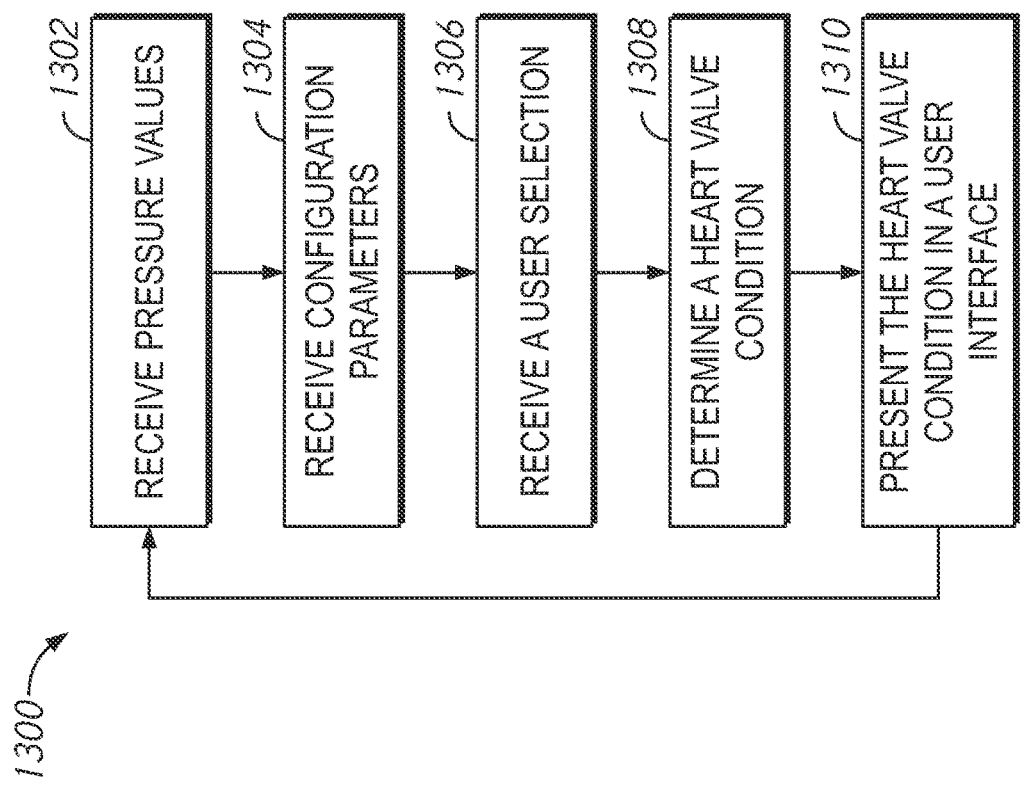
FIG. 13 is a flowchart of a user interface generation process.

Turning to FIG. 13, an example user interface generation process 1300 is shown. Although the process 1300 is described in conjunction with a heart valve assessment system, such as the system 200 of FIG. 2A or the system 1400 of FIG. 14 described below, any system configured to perform the process, in any order, is within the scope of this disclosure. The process 1300 may be performed by the various components of the system of FIG. 2A as discussed herein, including the monitor 204, or the system 1400 of FIG. 14 described below. Depending on the embodiment, the process 1300 may include fewer or additional blocks and/or the blocks may be performed in an order different than is illustrated. Other embodiments of the process 1300 may include less blocks than illustrated or the blocks may be performed in a different order than as illustrated.

Beginning at block 1302, pressure values can be received. In particular, the monitor 204 can receive pressure values. The monitor 204 can receive a first set of pressure values and a second set of pressure values. Each pressure value from the first set pressure values can correspond to a first signal received from a first pressure sensor measuring a first cardiovascular region, such as a first portion of a heart. Each pressure value from the second set of pressure values can correspond to a second signal received from a second pressure sensor measuring a second cardiovascular region, such as a blood flow passage adjacent to the first portion of the heart. Thus, the monitor 204 can determine first and second sets of pressure values from first and second sensors, respectively. As described above in Sections I and/or II, the pressure sensors can be included within a pressure guidewire, an access catheter, a pigtail catheter, or a therapy device such as a heart valve dilation balloon, a heart valve delivery device adapted to sense pressure, or other pressure sensing devices. Additional details regarding receiving pressure values can be described in further detail below with respect to process 1500 of FIG. 15, such as with respect to blocks 1502 and/or 1504 of the process 1500.

At block 1304, configuration parameters can be received. In particular, the monitor 204 can receive configuration parameters. Example configuration parameters can include a quantity of heartbeats or a default gradient type to present in a user interface. Additional details regarding configuration parameters are described above in further detail with respect to FIG. 12.

At block 1306, a user selection can be received. An example user selection can include a change in gradient type. A user can select the gradient type selector 1056 of FIG. 10C to change between gradient types, such as the instantaneous gradient type of FIG. 10D or the area gradient type of FIG. 10E. Additional user selections can include changes to configuration parameters of the configuration user interface 1200 describe above in FIG. 12. For example, a user selection can include a user heartbeat selection. The user heartbeat selection can specify a quantity of heartbeats to be used for a statistical measure (such as 2, 3, or 4 heartbeats, for example). The user heartbeat selection can also include a selection of one or more particular heartbeats. For example, a user can interact with a user interface described herein to select a portion of a graph corresponding to a particular heartbeat and/or can select identifier(s) for a particular heartbeat(s).

At block 1308, a heart valve condition can be determined. As described herein, example heart valve conditions can include a regurgitation index or a gradient pressure. The monitor 204 can determine the heart valve condition based on the data of the previous blocks 1302, 1304, 1306. For example, the monitor 204 can calculate specific heart valve conditions from the received pressure values according to the configuration parameters or the user selections that can specify a particular gradient type, number of heartbeats for a calculation, and/or specific heartbeats to use or to exclude. As described herein, a quantity of heartbeats can be used to calculate a statistical measure for a particular heart valve condition, such as a regurgitation index or a gradient. The monitor 204 can detect rapid pacing from one of the first set pressure values or the second set of pressure values, such as by detecting that a number of beats have exceeded a threshold period of time. Additional details regarding determining a heart valve condition are described below in Section IV, such as with respect to the process 1500 of FIG. 15. Some of the blocks of the process 1500 of FIG. 15 can further describe determining a heart valve condition, such as the blocks 1504, 1506, 1508, 1510.

At block 1310, a user interface can be presented. The monitor 204 can present the user interface. Example use interfaces are described above with respect to FIGS. 10A-10E and 11A-11C. A first presented user interface can include a first graph based at least in part on the first set of pressure values and a second graph based at least in part on the second set of pressure values. The first presented user interface can correspond to any of the user interfaces 1040, 1060, 1080, 1100, 1120, 1140 of FIGS. 10C, 10D, 10E, 11A, 11B, 11C, respectively. The first presented user interface can also include a gradient representation that indicates a gradient of a valve, such as a peak to peak gradient, an instantaneous gradient, and/or an area gradient. For example, a first gradient representation can visually depict an area between the first graph and the second graph (such as the gradient representations 1082a, 1082b, 1082c of FIG. 10E). The presented area can indicate a difference in pressure between the first cardiovascular region and the second cardiovascular region. The first user interface can also include a numerical value indicating an amount of regurgitation of the valve (such as the second numerical value 1048 of FIG. 10C). The first user interface can also include a regurgitation representation that visually presents a regurgitation measurement between a first point in the first graph and a second point in the second graph (such as the regurgitation representations 1044a, 1044b, 1044c of FIG. 10C). Accordingly, the regurgitation measurement can indicate an amount regurgitation of the valve. The first user interface can also include a numerical value for the first gradient of the valve according to a statistical measure (such as the first numerical value 1084 of FIG. 10E that can be a mean or average gradient value). The first user interface can also include an electrocardiography graph, which is described in further detail above with respect to FIG. 10C. In some embodiments, the first user interface can present a warning of rapid pacing if rapid pacing is detected.

In some embodiments, the first user interface can include multiple numerical values for different gradient types but on the same graph display. For example, two or more numerical values can be selected from: a peak to peak gradient numerical value, an instantaneous gradient numerical value, and/or an area gradient numerical value, and can be presented on the same graph display at the same time.

As shown, after the presentation block 1310 executes, the previous blocks can be revisited to receive additional pressure value data, user selections, and/or updates to configuration parameters that causes one or more user interfaces to update. For example, the monitor 204 can receive, via the first user interface, a user selection of a second gradient type (such as a peak to peak gradient type). Accordingly, the monitor 204 can present, instead of the first user interface, a second user interface for the second gradient type (such as a peak to peak gradient type). The second user interface can include the first graph and the second graph and a second gradient representation that visually presents a gradient measurement between a first peak in the first graph and a second peak in the second graph (such as the gradient representations 1042a, 1042b, 1042c of FIG. 10C).

A user can make any number of changes to the user interfaces. For example, another user interface selection can be received for a third gradient type (such as an instantaneous gradient type). Accordingly, the monitor 204 can present, instead of the second user interface, a third user interface for the third gradient type (such as the instantaneous gradient type). The third user interface can include the first graph and the second graph and a third gradient representation that visually presents a second gradient measurement between a first point in the first graph and a second point in the second graph (such as the gradient representations 1062a, 1062b, 1062c of FIG. 10D). While particular orders of gradient type changes have been described herein any order of gradient type changes can be accepted by the heart valve assessment system.

IV. Heart Valve Assessment Systems and Methods

The systems and methods described herein can assess a heart valve. Pressure values can be used to assess a valve. A valve can be diagnosed by way of various signal processing methods that involve the pressure gradient across the valve. The pressure gradient across a valve during a systolic phase can be indicative of a pressure loss caused by the blood flowing through the valve, which can be indicative of a limitation in blood flow. A pressure gradient at the end of diastole, e.g., after the valve has closed, can be indicative of the amount of blood leaking through the valve while being closed. As described herein, normalizing or dividing this gradient with the systolic pressure from a cardiovascular region such as the aorta can be called regurgitation. Various techniques described herein can be used to improve the accuracy of valve assessment or diagnostic methods, such as, but not limited to, pressure sensor calibration, waveform adjustment, feature detection, and/or valve condition generation.

a. Heart Valve Assessment System and Method Overview

Figure 14:
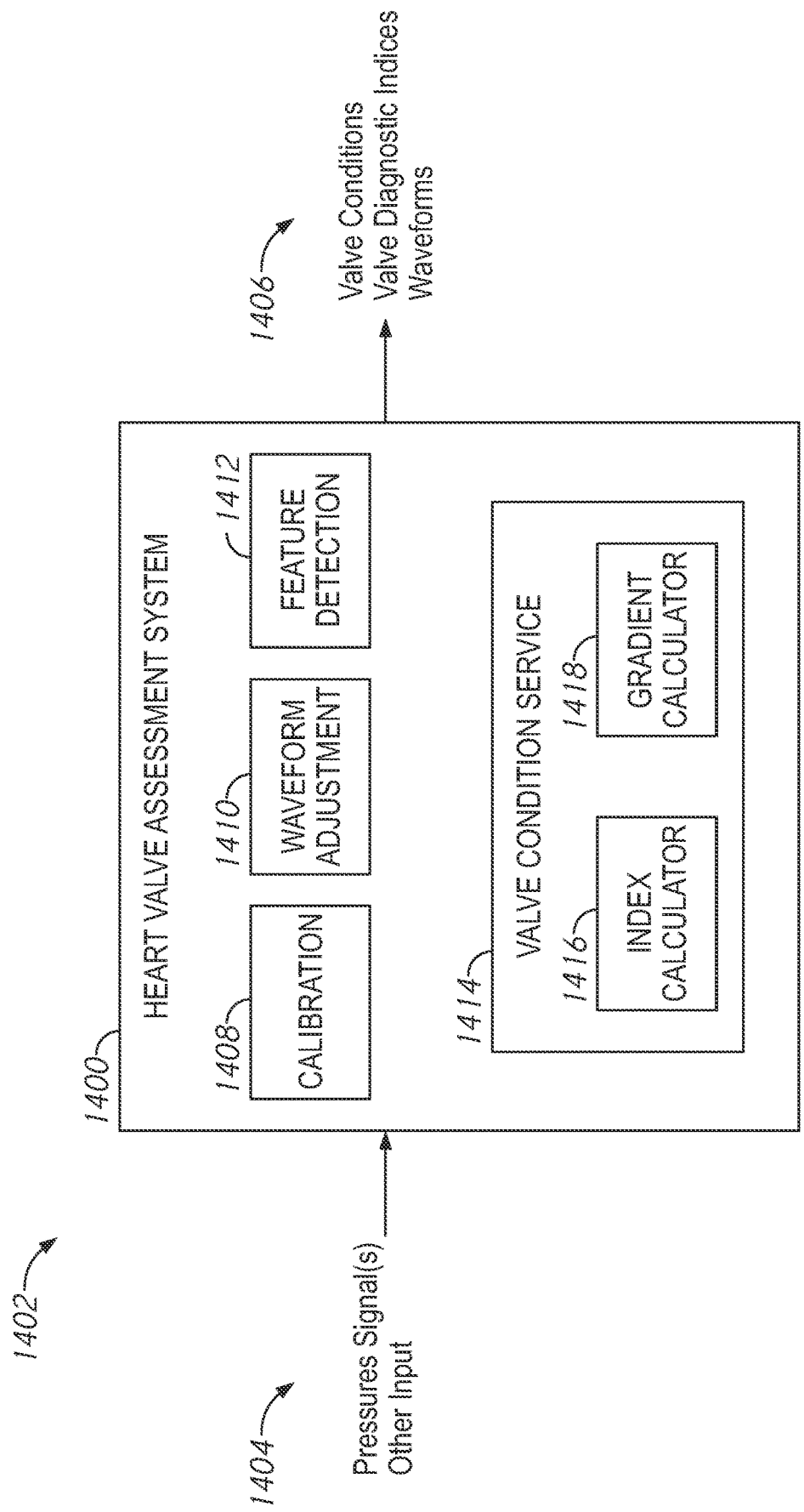
FIG. 14 is a diagram of a heart valve assessment system.

Turning to FIG. 14, a block diagram of a heart valve system 1400 is depicted. In FIG. 14, the heart valve assessment environment 1402 includes input 1404 such as pressure signal(s), a heart valve assessment system 1400, and output 1406, such as valve conditions, valve diagnostic indices, and/or waveforms. Example waveforms can include time series data, such as a series of respective pressure and timestamp pair values. The heart valve assessment system 1400 can be similar to or can be embodied in the monitor 204 and/or components of the heart valve assessment system 1400 can be embodied in the monitor 204. The pressure signal(s) 1406 can be received from one or more pressure sensors described herein, such as a pressure guidewire 208, a pressure sensing access catheter 20, or a pressure sensing pigtail catheter 10.

The heart valve assessment system 1400 can include a calibration service 1408, a waveform adjustment service 1410, a feature detection service 1412, and/or valve condition determination service 1414. The calibration service 1408 can calibrate one pressure sensor against another pressure sensor. The waveform adjustment service 1410 can adjust one or more pressure waveforms, such that two or more pressure waveforms can generally be synchronized. The feature detection service 1412 can detect one or more features from pressure waveforms, such as detection of a systolic phase, a diastolic phase, a dicrotic notch, the end of diastole, and/or the beginning of systole. The valve condition determination service 1414 can determine one or more valve conditions. The valve condition determination service 1414 can include an index calculator 1416 and/or a gradient calculator 1418. The index calculator 1416 can generate indices such as a valve regurgitation index. The gradient calculator 1418 can generate a pressure gradient and/or a statistical measure of a pressure gradient. The generated output data 1406, such as valve conditions, valve diagnostic indices, and/or waveforms, can be provided in a user interface as described herein or can be provided to another device or system.

Figure 15:
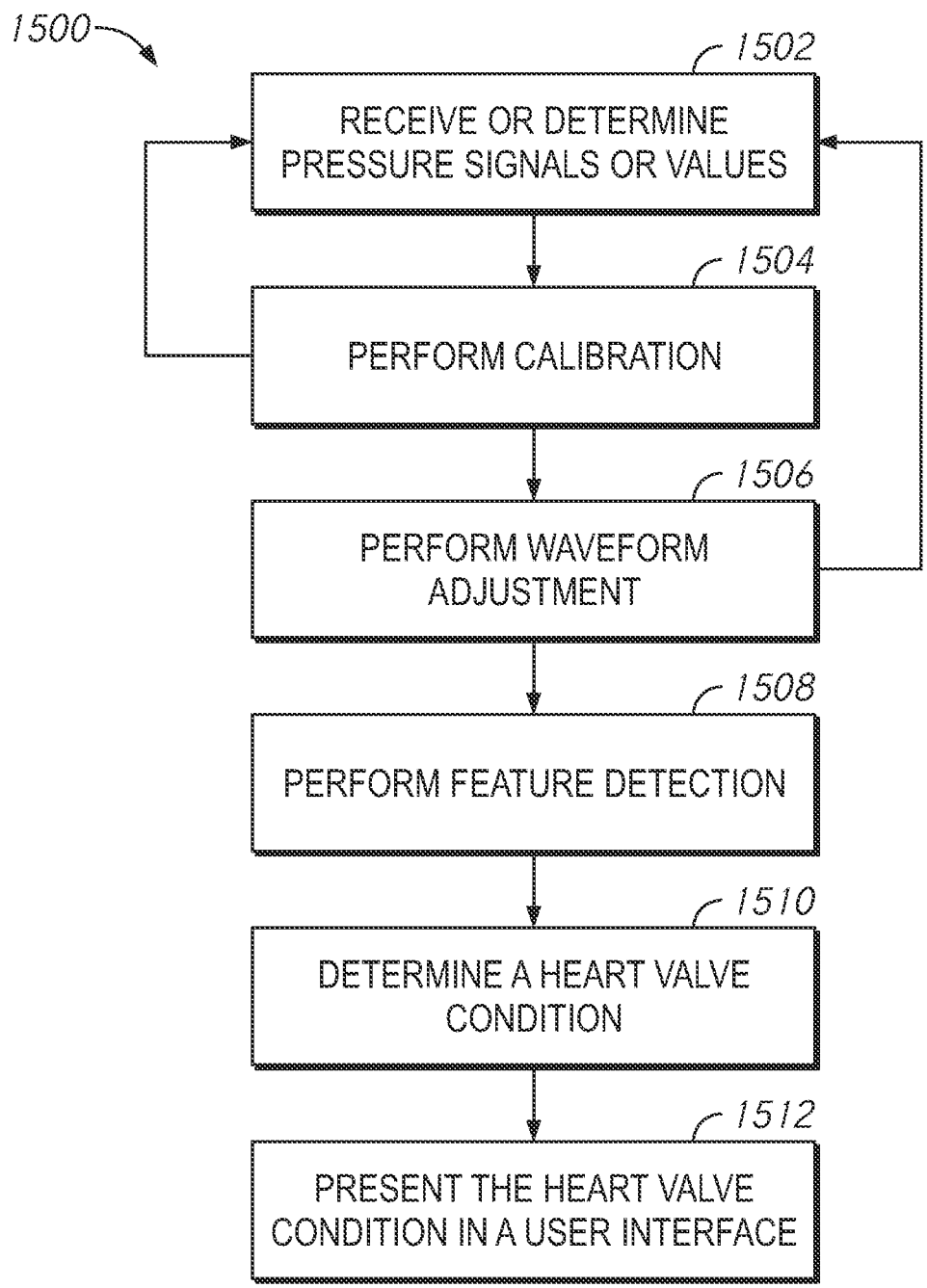
FIG. 15 is a flowchart of a heart valve assessment process.

Turning to FIG. 15, an example valve assessment process 1500 is shown. Although the process 1500 is described in conjunction with a heart valve assessment system, such as the system 200 of FIG. 2A or the system 1400 of FIG. 14, any system configured to perform the process, in any order, is within the scope of this disclosure. The process 1500 may be performed by the various components of the system of FIG. 2A as discussed herein, including the monitor 204, or the system 1400 of FIG. 14. Depending on the embodiment, the process 1500 may include fewer or additional blocks and/or the blocks may be performed in an order different than is illustrated. Other embodiments of the process 1500 may include less blocks than illustrated or the blocks may be performed in a different order than as illustrated.

Beginning at block 1502, pressure values or signals can be received or determined. In particular, the heart valve assessment system 1400 can receive pressure signals from a pressure sensor, such as a pressure guidewire 208, a pressure sensing access catheter 20, or a pressure sensing pigtail catheter 10. The heart valve assessment system 1400 can determine a first set of pressure values and a second set of pressure values from received pressure signals. Each pressure value from the first set pressure values can correspond to a first signal received from a first pressure sensor measuring a first cardiovascular region. Each pressure value from the second set of pressure values can correspond to a second signal received from a second pressure sensor measuring a second cardiovascular region that can be the same as or different from the first cardiovascular region. The heart valve assessment system 1400 can determine first and second sets of pressure values from first and second sensors, respectively. As described above in Sections I and/or II, the pressure sensors can be included within a pressure guidewire or other pressure sensing devices. In some embodiments, such as where calibration is performed, the first pressure sensor and the second pressure sensor can be located at a same or different cardiovascular region. In such a case, the process can proceed to block 1504.

At block 1504, calibration can be performed. The calibration service 1408 can perform the calibration. A second sensor can be calibrated against a first sensor to determine more accurate pressure measurements. Similarly, a first sensor can be calibrated against a second sensor to determine more accurate pressure measurements. In some embodiments, each of a first sensor and second sensor can both be calibrated together. Pressure values determined from the second sensor can be adjusted based on the calibrating. Calibration of a first sensor and a second sensor can result in the generation of one or more calibration parameters. The one or more calibration parameters can be used to adjust one or more pressure values determined from a calibrated pressure sensor. Additional details regarding calibration are described in further detail below with respect to the process 1600 of FIG. 16 and/or the process 2700 of FIG. 27. As used herein, the terms "calibration" and "equalization" can be used interchangeably.

The process can return to block 1502. Once calibration has been finished, one or more pressure sensors can be moved to a different cardiovascular region, and additional pressure signals can be received at block 1502. Pressure signals can be received from two or more pressure sensors that are located in different cardiovascular regions. Examples of different cardiovascular regions can include adjacent blood passages, such as, but not limited to, opposite sides of a heart valve, such the left ventricle and the aorta, the left ventricle and the left atrium, the right ventricle and the pulmonary artery, the right atrium and the right ventricle, the vena cava and the right atrium, etc. The heart valve assessment system 1400 can determine first and second sets of pressure values from the pressure signals, such as by applying the determined calibration parameter.

At block 1506, waveform adjustment can be performed. Since some valve conditions (such as diagnostics) can be based on intra-beat waveform analysis where specific portions within the heartbeat cycle can be used, it can be important to adjust one or more pressure waveforms to have two or more pressure waveforms to be generally synchronized or aligned. The adjustment of the waveforms can correspond to a time shift of one or more of the waveforms such that corresponding features thereof are aligned. In some embodiments, the waveform adjustment service 1410 can automatically adjust one or more waveforms. In other embodiments, some aspects of the waveform adjustment can include receiving user input, such as an operator manually adjusting one or more waveforms.

The waveform adjustment service 1410 can adjust the phase between one or both pressure waveforms by adding a delay to one or both of the pressure waveforms during installation, maintenance, or use with a specific patient. This technique can assume that the set-up process during installation or maintenance is representative of the set-up process during a procedure such as TAVI. For example, the aortic pressure signal time delay can be representative of the aortic pressure line time delay induced in a TAVI procedure. The waveform adjustment service 1410 can adjust the phase for each specific patient.

The waveform adjustment service 1410 can include or communicate with automatic phase delay recognition system that may advise the operator to verify and adjust the phase delay between both pressure signals. The waveform adjustment service 1410 can verify such time delay while equalization is requested or occurs, such as when both pressure signals have the same origin (e.g., are positioned at the same location such that they should experience similar pressure) or when the pressure signals are from different locations.

The waveform adjustment service 1410 can detect phase delay based on time delay between one or more pressure waveforms features. Pressure waveform features can include one or more of the systolic pressure relative position, dicrotic notch relative position, or end of diastole relative position. The waveform adjustment service 1410 can use the feature of the relative position of the maximum slope of systolic raising edges, which can be a reliable feature.

Additionally or alternatively, the waveform adjustment service 1410 can systematically adjust the time delay when pressure equalization is requested. Similar to the technique for detecting the phase delay, time adjustment can be measured by comparing the relative position of specific pressure waveform features. For example, the waveform adjustment service 1410 can delay the timing of pressure sampling during equalization based on the recognition of pressure waveform features. The waveform adjustment service 1410 can use the cross-correlation between both signals, i.e., such as by calculating the correlation between one signal against the other while being shifted in time. The time shift can result in an enhanced or even the maximal correlation value between both signals that can correspond to the time shift that can be added to one pressure signal or the other.

At block 1508, feature detection can be performed. The feature detection service 1412 can perform feature detection. Example features that can be detected from a pressure waveform can include a systolic phase, a diastolic phase, a dicrotic notch, the end of diastole, and/or the beginning of systole. Additional details regarding feature detection are described in further detail below with respect to process 1900 of FIG. 19.

At block 1510, a heart valve condition can be determined. The valve condition determination service 1414 can determine a valve condition. In particular, the index calculator 1416 can generate indices, such as a valve regurgitation index, and the gradient calculator 1418 can generate a pressure gradient and/or a statistical measure of a pressure gradient. The index calculator 1416 and/or the gradient calculator 1418 can use the calibrated or adjusted waveforms or the detected features of the previous blocks to generate a valve condition. The index calculator 1416 can calculate a regurgitation index based at least in part on a first subset of the first set of pressure values according to a systolic phase or diastolic phase and a second subset of adjusted pressure values according to a systolic phase or diastolic phase. For example, the index calculator 1416 can calculate a regurgitation index with the following equation: aortic regurgitation index=(aortic diastolic blood pressure− left ventricular diastolic pressure)/aortic systolic blood pressure. The gradient calculator 1418 can calculate a gradient value based at least in part on a difference between a first subset of pressure values during a systolic phase and a second subset of adjusted pressure values during a systolic phase (such as an area gradient value, a peak to peak gradient value, and/or an instantaneous gradient value, which are described in further detail above in Section III). Additional details regarding determination of a valve condition are described in further detail above in Section III.

At block 1512, the heart valve condition can be presented in a user interface. The heart valve assessment system 1400 and/or a monitor 204 can present the heart valve condition. Additional details regarding presentation of a valve condition are described in further detail above with respect to block 1310 of FIG. 13 and the user interfaces of FIGS. 10A-10E and 11A-11C.

b. Pressure Sensor Calibration

As described herein, a first sensor can be calibrated against a second sensor to determine more accurate pressure measurements, which can also be referred to as equalization. For example, a pressure guidewire can be at or nearby valve location along with another pressure instrument. The other pressure instrument can be a catheter, a pigtail or other instrument used to deliver the valve and comprising a lumen connected to a pressure transducer. The pressure instrument may be another pressure guidewire or a catheter comprising a tip pressure sensor. The pressure guidewire and the pressure instrument are positioned to measure the same pressure.

The pressure sensors can be positioned in the same cardiovascular region, such as the aorta, in the ventricle, atrium, or some other location. Although it can be understood that the pressure sensors at the same location should display the same pressure, there can be a difference between the first and second pressures (such as the aortic pressure Pa and the distal pressure Pd). Accordingly, once at the same position, one pressure sensor can be calibrated against the other.

The systems and methods described herein for pressure sensor calibration can improve the accuracy of pressure instruments. For example, as mentioned above, even if two pressure instruments are located in the same cardiovascular region there can be differences in pressure based on the proximal or distal location of each pressure instrument. Moreover, differences in pressure can arise from other factors, such as different device types among the multiple pressure instruments. Therefore, the systems and methods described herein for calibration can improve pressure instrument technology by being able to provide more accurate pressure readings.

Figure 16:
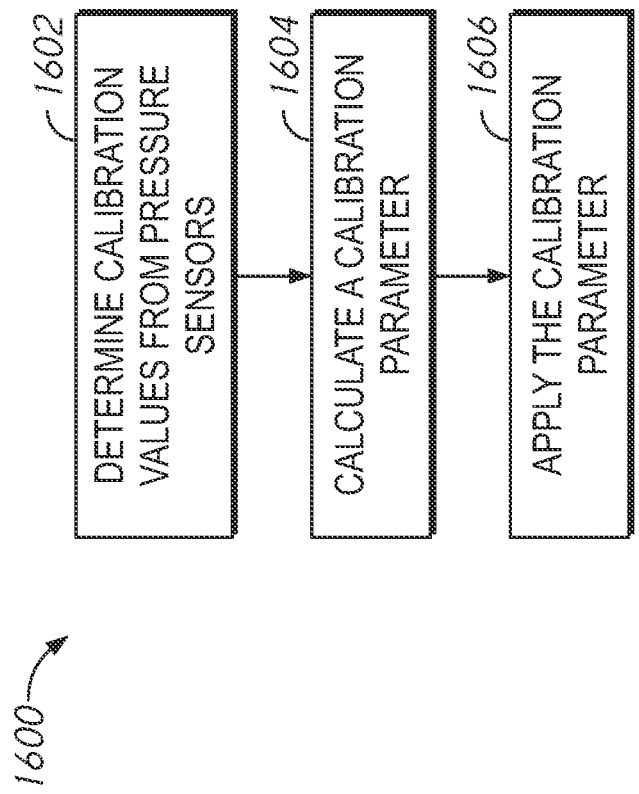
FIG. 16 is a flowchart of a calibration process.

Turning to FIG. 16, an example calibration process 1600 is shown. Although the process 1600 is described in conjunction with a heart valve assessment system, such as the system 200 of FIG. 2A or the system 1400 of FIG. 14, any system configured to perform the process, in any order, is within the scope of this disclosure. The process 1600 may be performed by the various components of the system of FIG. 2A as discussed herein, including the monitor 204, or the system 1400 of FIG. 14. Depending on the embodiment, the process 1600 may include fewer or additional blocks and/or the blocks may be performed in an order different than is illustrated. Other embodiments of the process 1600 may include less blocks than illustrated or the blocks may be performed in a different order than as illustrated.

Beginning at block 1602, one or more calibration pressure values can be determined from one or more pressure sensors. The calibration service 1600 can determine one or more calibration pressure values from one or more pressure sensors. The calibration service 1600 can receive a first calibration pressure value corresponding to a first calibration signal received from a first pressure sensor measuring a cardiovascular region and a second calibration pressure value corresponding to a second calibration signal received from the second pressure sensor measuring the same cardiovascular region. The calibration service 1600 can receive a first set of calibration pressure values determined from a first pressure sensor and a second set of calibration pressure values determined from a second pressure sensor.

At block 1604, a calibration parameter can be calculated. The calibration service 1600 can calculate one or more calibration parameters. The calibration service 1600 can use one or more techniques to calculate the calibration parameters, such as an offset or gain (G). The calibration service 1600 can determine an offset or gain (G). The calibration service 1600 can use the following offset equation to calculate an offset: $P_1=P_2+offset$, where $P_1$ can be Pd and $P_2$ can be Pa. The offset can be used by the calibration service 1600 to determine that pressure is equal between two pressure sensors (such as a mean pressure). Additionally or alternatively, the calibration service 1600 can adjust the gain (G) of one pressure sensor such that the pressure (such as a mean pressure) between the two sensors becomes equal. The calibration service 1600 can use the following gain equation to calculate gain (G): $P_1=G*P_2$, where $P_1$ can be Pd and $P_2$ can be Pa.

The calibration service 1600 can use a linear fit to determine calibration parameters. The first set and the second set of pressure values can be or can include a first vector or a second vector, respectively. The calibration service 1600 can determine a linear fit between the first vector and the second vector. The first vector can correspond to $[P_1]$ (such as [Pd]) and the second vector can correspond to $[P_2]$ (such as [Pa]). The calibration service 1600 can use the following offset equation to calculate an offset: $[P_1]=*[P_2]+b$. The calibration service 1600 can apply a linear fit between multiple pressure measurements of one pressure sensor against another to determine the calibration parameters K and b. A linear fit calibration can be desirable when equalizing both pressure measurements when positioned in a heart chamber, e.g., the ventricle. As opposed to the aortic pressure, ventricular pressure (and atrial pressure) changes over an extended range of pressure, from nearly venous pressure to aortic systolic pressure (and even to higher pressures in view of the pressure loss across the aortic valve) and, therefore, the risk of getting a linear fit with a significant offset (b) is minimized $[P_1]$ can correspond to a vector including multiple $P_1$ pressure values (such as Pd) and $[P_2]$ can correspond to a vector including multiple $P_2$ pressure values (such as Pa). The pressure measurements that calibration service 1600 can use to calculate the linear fit can be a subset of pressure measurements, for example, it may include systolic pressure measurements only, diastolic pressure measurements, or other portion of the heartbeat cycle.

At block 1604, the calibration parameter can be applied. The calibration service 1600 can apply one or more calibration parameters to a pressure value. The calibration service 1600 can apply an offset, a gain (G), or linear fit parameters (K and b) to one or more pressure values to determine one or more adjusted pressure values.

c. Feature Detection

The heart valve assessment system 1400 may rely on a determination of the phases of a heartbeat cycle to determine a valve condition, such as a regurgitation index. Thus, the heart valve assessment system 1400 can detect one or more features, such as, but not limited to, a systolic phase, a diastolic phase, a dicrotic notch, the end of diastole, and/or the beginning of systole. A dicrotic notch is a feature that can be indicative of a phase change from a diastolic phase to a systolic phase. The end of diastole or the beginning of systole is another feature that can be detected. The end of the diastole can be identified by way of an electrocardiogram (ECG). In some embodiments, it may be desirable to identify the end of diastole using pressure because ECG signals may not be available or ECG signals may often not be clean enough. The transition from diastole to systole is often not clearly distinguishable as it may be quite rounded and/or the transition may also include various pressure features that may lead to inadequate localization. The heart valve assessment system 1400 may rely on a feature such as the systolic pressure rising region. The heart valve assessment system 1400 can identify the position of the maximum or local maximum slope of the systolic pressure rising portion, which can be more reliable than other features. In particular, the heart valve assessment system 1400 can identify the position of the maximum slope of a conditioned pressure signal.

Figure 17:
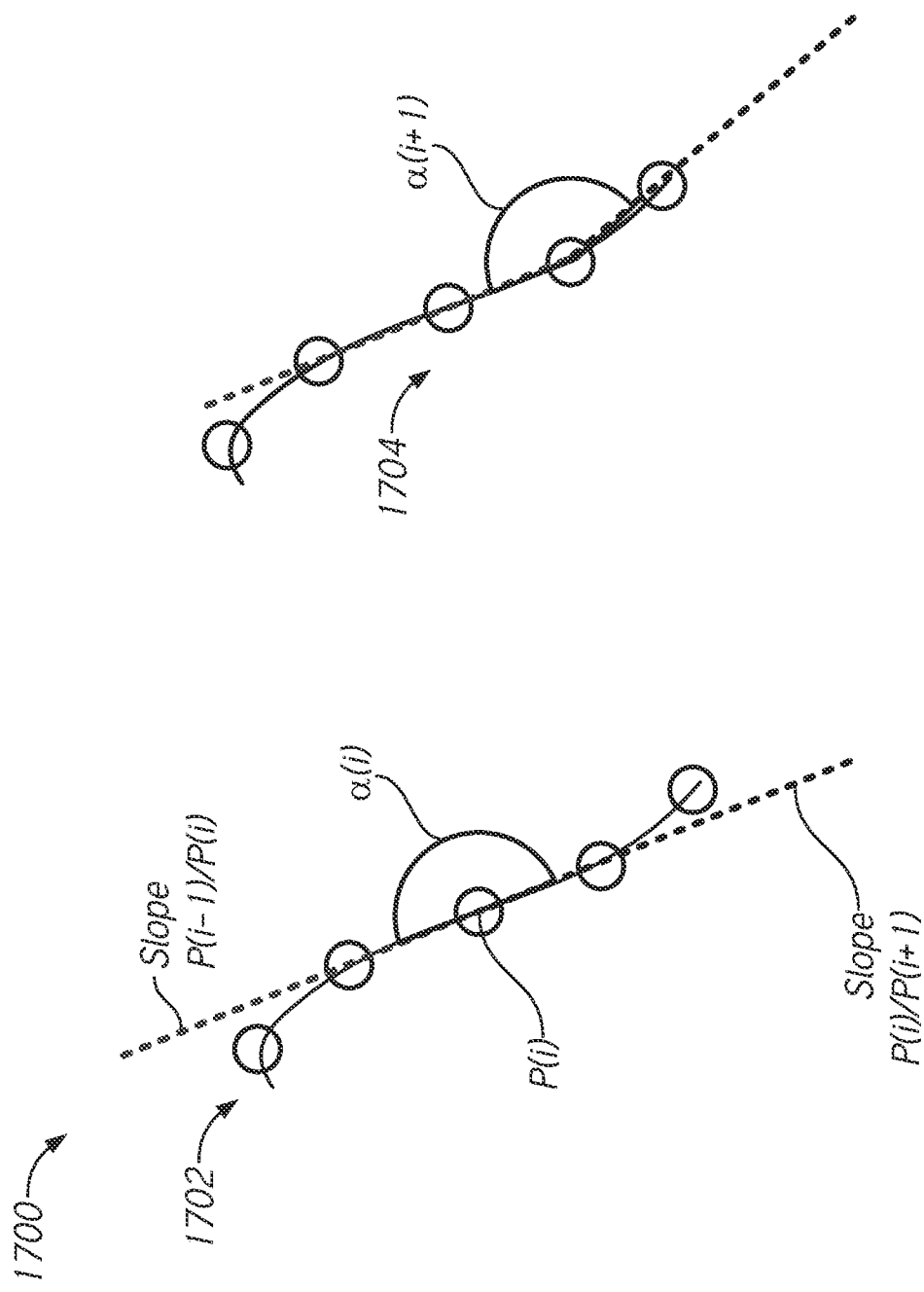
FIG. 17 is a diagram of example waveform analyses.

Turning to FIG. 17, a waveform analyses environment 1700 is depicted. The waveform analyses environment 1700 includes a first set of a pressure data points 1702 and a second set of pressure data points 1704. The heart valve analysis system 1400 can analyze the data points in the environment 1700 to detect a dicrotic notch feature. The heart valve analysis system 1400 can detect a dicrotic notch feature by calculating and identifying a data point with a smallest angle formed with nearby data points. An example of angular calculation is shown in FIG. 17. With respect to the first set of data points 1702, the heart valve analysis system 1400 can obtain the angle α(i) by calculating the angle formed by a first line that extends from a central point P(i) and the preceding point P(i−1), and a second line that extends from the same central point P(i) and the following point P(i+1). With respect to the first and second set of data points 1702, 1704, the angle α(i+1) around point P(i+1) can be smaller than the angle α(i) around P(i). Therefore, the heart valve analysis system 1400 can identify the dicrotic notch feature at the point P(i+1). In this example, although the angle is calculated using adjacent points, this technique can include using points that are not adjacent. In some embodiments, the technique can include the use of n more data points (such as 2 or 3 more data points) for the calculation of the line forming on part of the angle. Depending on the embodiment, the signal for the data points may or may not be pre-conditioned.

Figure 18:
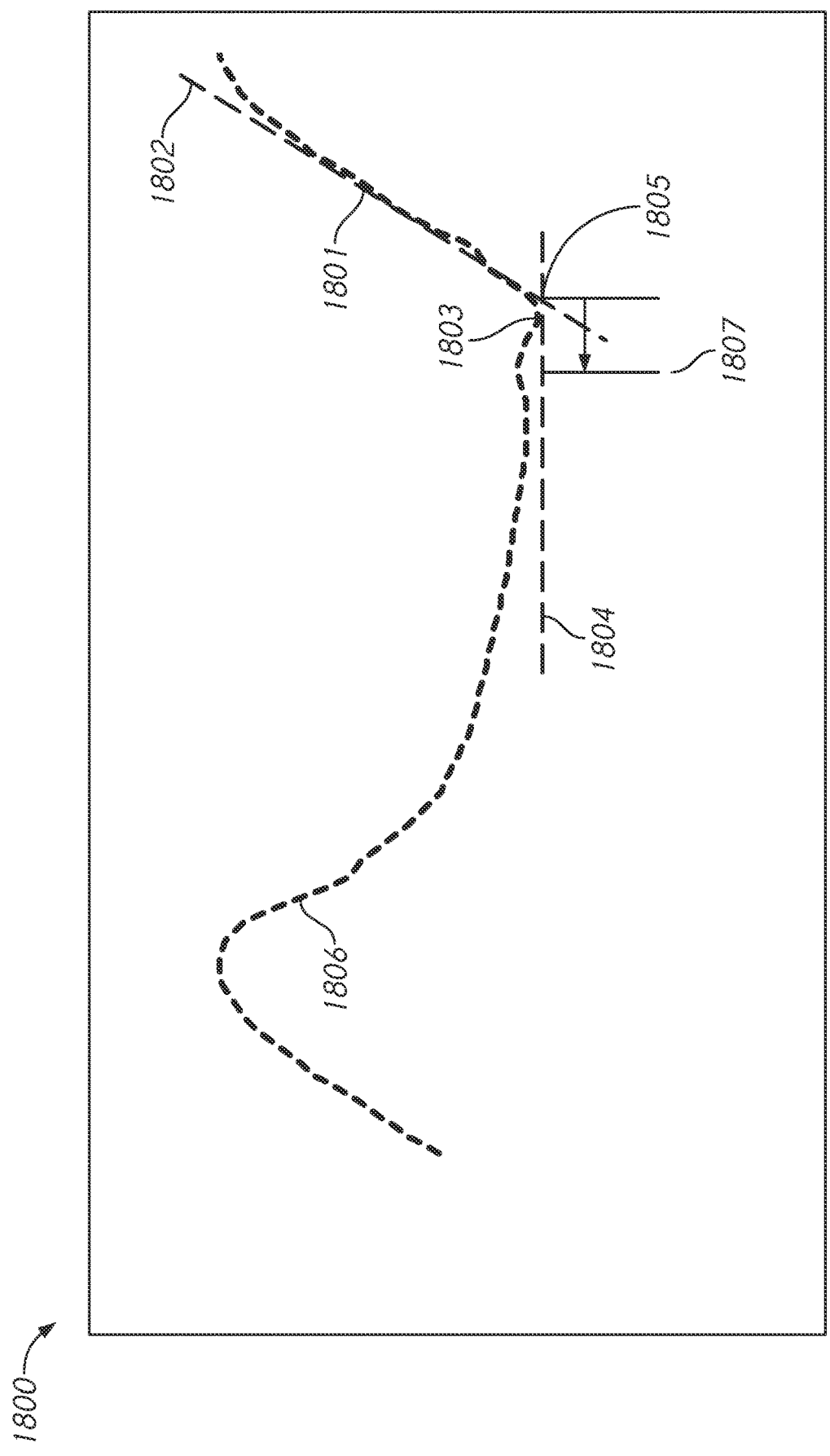
FIG. 18 is a diagram of additional example waveform analyses.

Turning to FIG. 18, another waveform analyses environment 1800 is depicted. The heart valve analysis system 1400 can analyze the data points in the environment 1800 to detect an end of diastole and/or a beginning of systole. The environment 1800 can include a waveform 1806. The slope 1802 extending from the position of a maximum or local maximum slope of the rising portion of systole 1801 is illustrated in FIG. 18. The heart valve analysis system 1400 can trace a horizontal line 1804 that intersects with a minimum or local minimum pressure value 1803. The intersection 1805 between the slope 1802 and the horizontal line 1804 may provide a reliable position for an intermediate position of the transition from the end of diastole to the beginning of systole. In some embodiments, when using the aortic pressure to identify the end of diastole or the beginning of systole, a more accurate positioning of the end of diastole can be obtained by moving the position by a time period 1807, which can be pre-determined. The end of diastole 1807 can be obtained by moving about 40 to 100 ms from the intersection 1805. In some embodiments, moving the position of 60 ms can provide a good estimation of the end of diastole. The heart valve analysis system 1400 can use other techniques such as moving the intersect of a percentage of the heartbeat period, such as between 8% to 12%, or 5% to 8%.

The technique(s) described herein can be adapted for identifying the end of diastole when using the aortic pressure. This technique can be adapted in case the pressure being processed is the ventricular pressure. Ventricular pressure can result in a more accurate determination of the end of diastole as there is no need to move the position of the intersect 1805. Once the position of a first intersection 1805 is determined, a more accurate determination of the end of diastole may include changing the slope extending from the position of maximum slope to a new slope extending from a position located between the position of maximum slope and the first intersection 1805. In particular, the determination of the end of diastole may include changing the slope extending from the position of maximum slope to a new slope extending from a position closer to the first intersect 1805. The new slope extending from the position closer to the first intersect 1805 can thereafter be extended to intersect with the horizontal line. A new intersect can be found and used as the end of diastole.

Figure 19:
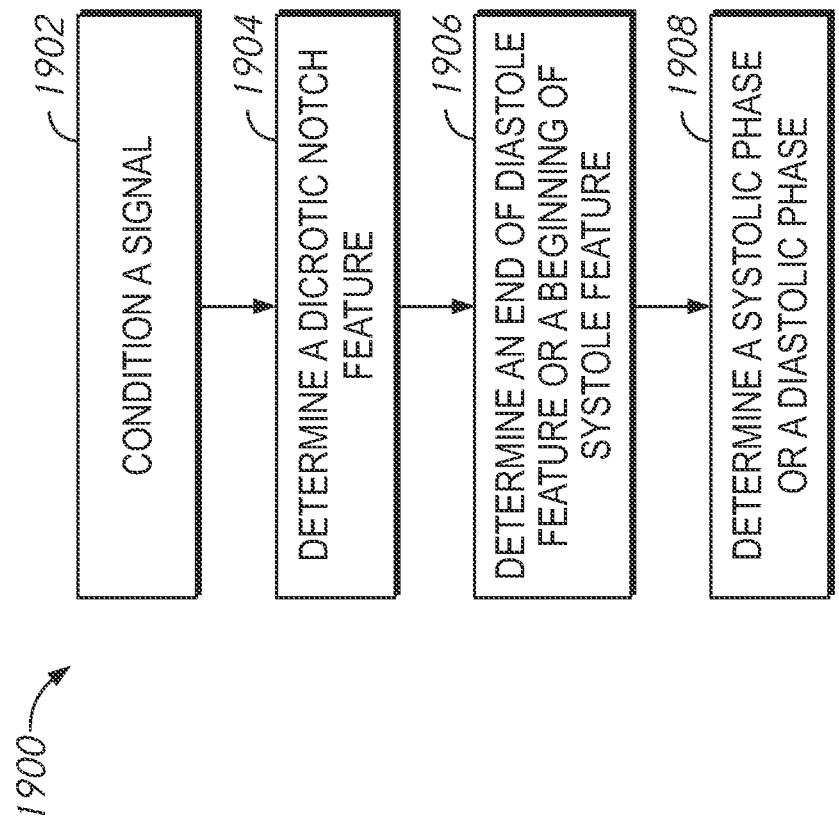
FIG. 19 is a flowchart of a calibration process.

Turning to FIG. 19, a feature detection process 1900 is shown. Although the process 1900 is described in conjunction with a heart valve assessment system, such as the system 200 of FIG. 2A or the system 1400 of FIG. 14, any system configured to perform the process, in any order, is within the scope of this disclosure. The process 1900 may be performed by the various components of the system of FIG. 2A as discussed herein, including the monitor 204, or the system 1400 of FIG. 14. Depending on the embodiment, the process 1900 may include fewer or additional blocks and/or the blocks may be performed in an order different than is illustrated. Other embodiments of the process 1900 may include less blocks than illustrated or the blocks may be performed in a different order than as illustrated.

Beginning at block 1902, a signal can be conditioned. The heart valve analysis system 1400 can condition a signal. The heart valve analysis system 1400 can filter the pressure signal, such as by convoluting the signal with a window. The window can be a square or other forms and the duration may be two samples or more. Conditioning a signal may be preferred in certain situations, such as finding the position of the maximum slope, because there may be oscillatory features caused by air bubbles or other factors.

At block 1904, a dicrotic notch feature can be detected. The feature detection service 1412 can detect a dicrotic notch feature. Various techniques can be used to determine a dicrotic notch feature. The feature detection service 1412 can calculate the second derivative of one of the pressure signals and can identify the position of zero crossing. More specifically, the feature detection service 1412 can calculate second derivative values from a first set of pressure values and can identify a point of zero crossing based at least in part on the second derivative values, where the point of zero crossing corresponds to the first dicrotic notch feature. These techniques can allow for the localization of the dicrotic notch feature in the absence of a clear notch, i.e., a notch that is visible on a graphical representation of the pressure waveform itself. When a clear notch is present, i.e., when the notch includes a short pressure signal feature going back up that is visible in a graphical representation of the pressure waveform, the feature detection service 1412 may search for a nearby first derivative zero crossing. These techniques may be performed on non-conditioned pressure signal, but it may also be performed on a conditioned pressure signal.

The feature detection service 1412 can detect a dicrotic notch feature by calculating and identifying the data point with the smallest angle formed with nearby data points. The feature detection service 1412 can calculate, from a set of pressure values, a first angle for a first point based at least in part on a first preceding point and a first following point. The feature detection service 1412 can calculate, from the first set of pressure values, a second angle for a second point based at least in part on a second preceding point and a second following point. The feature detection service 1412 can determine that the second angle is less than the first angle and can identify the second point as the first dicrotic notch feature. Additional details regarding detecting a dicrotic notch feature are described above with respect to FIG. 17.

At block 1906 an end of diastole feature or a beginning of systole feature can be detected. The feature detection service 1412 can detect the end of diastole feature or the beginning of systole feature. The feature detection service 1412 can identify a first subset of rising pressure values from a first set of pressure values. The feature detection service 1412 can identify a local minimum pressure value from the first plurality of pressure values. The feature detection service 1412 can determine a tangent from the first subset. The feature detection service 1412 can then identify a horizontal line intersecting the local minimum pressure value and identify a first intersection between the tangent and the horizontal line. The feature detection service 1412 can identify a first point from the first set of pressure values as an end of the first diastolic phase or the beginning of the first systolic phase based at least in part on the first intersection. Identifying the first point can further include adjusting the first intersection by a predetermined time period. The predetermined time period can be or can include approximately 60 milliseconds. The predetermined time period can include between approximately 40 milliseconds and approximately 100 milliseconds. Identifying the first point can further include adjusting the first intersection by a percentage of a heartbeat period. The percentage can include or can be between approximately 8 percent and 12 percent of the heartbeat period. The percentage can include or can be 5 percent and 8 percent of the heartbeat period. Additional details regarding detecting an end of diastole feature or a beginning of systole are described above with respect to FIG. 18.

At block 1908, a systolic or a diastolic phase can be determined. The feature detection service 1412 can detect a diastolic phase feature or a systolic phase feature. The feature detection service 1412 can use the dicrotic notch feature to identify a phase change from a diastolic phase to a systolic phase. The end of diastole or the beginning of systole is another feature that can be detected.

d. Additional Valve Conditions

The heart valve assessment system 1400 can determine additional valve conditions. Additional example valve conditions can include, but are not limited to, transvalvular dysfunction diagnostics, valve stenosis severity indices, aortic regurgitation indices, and/or corrected aortic regurgitation indices.

i. Valve Stensis Severity Indices

Figure 20:
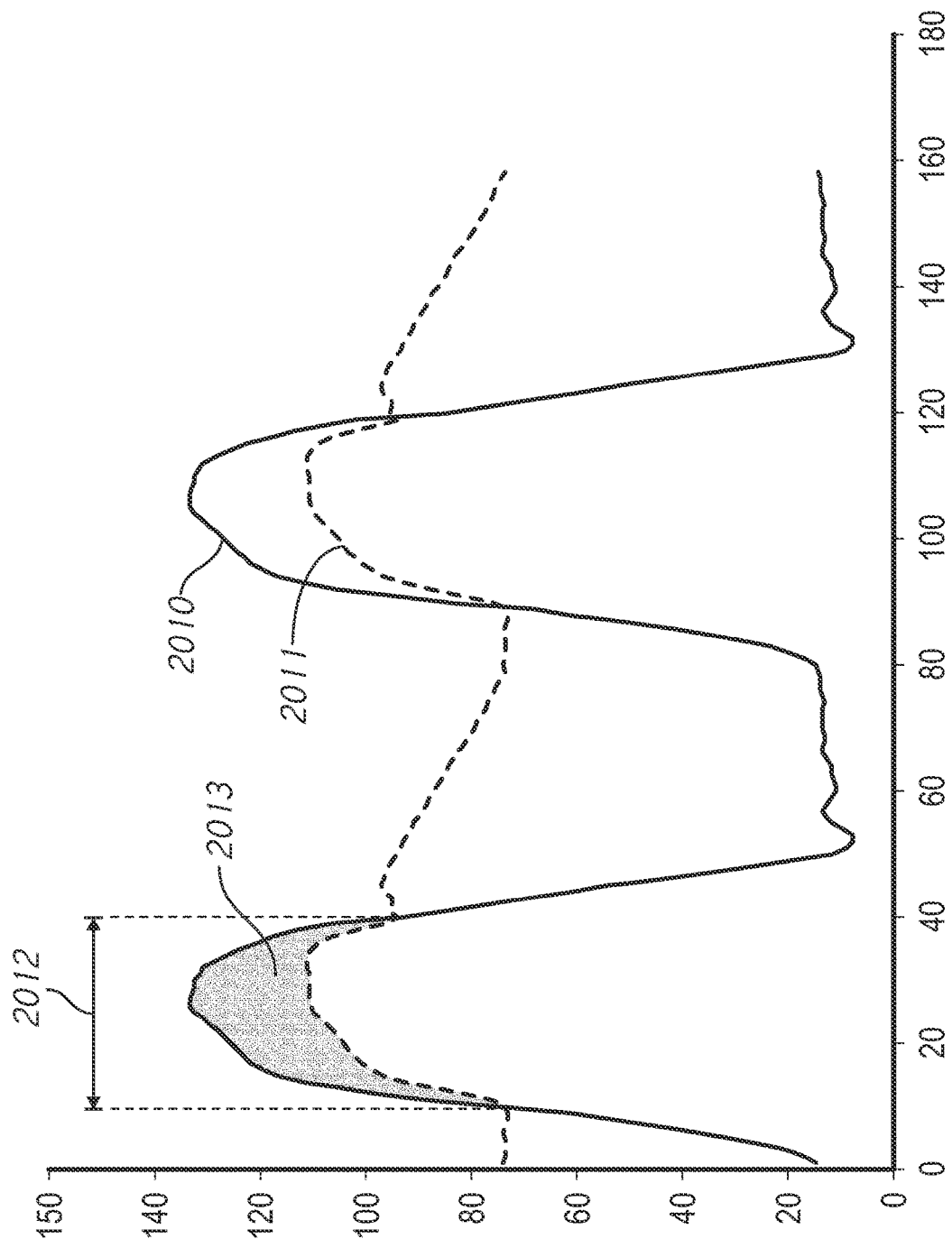
FIGS. 20-26 are diagrams of additional example waveform analyses.

While the aortic valve is used to describe certain embodiments, it will be understood that the techniques described herein can apply to other valves such as the mitral, pulmonary, and tricuspid valves. Turning to FIG. 20, a left ventricular pressure waveform (LVEP) 2010 and aortic pressure waveform (AOP) 2011 are depicted. In the example of FIG. 20, aortic stenosis may be present. Aortic stenosis can obstruct the blood from crossing through the valve, which in turn can cause a pressure loss or drop. The pressure loss can occur during systole. In particular, the pressure loss can occur during the period when the blood is ejected from the left ventricle to the aorta (the ejection period). The ejection period 2012 is defined as the period delimited by the points where the left ventricular pressure crosses the aortic pressure.

In a normal healthy subject, the left ventricular and aortic pressure should be equal during the ejection period. However, in presence of aortic stenosis, the left ventricular pressure can be higher than the aortic pressure. The pressure loss can increase with the severity of the aortic stenosis. A technique to assess the severity of aortic stenosis (AS) can include calculating the pressure gradient between the LVP and AOP during the whole ejection period. In particular, the severity of aortic stenosis (AS) can be determined based on the gradient between mean LVP and mean AOP during the ejection period (⟨LVSP⟩-⟨ASP⟩), as illustrated by the area 2013. As mentioned below, ⟨LVSP⟩ can be the mean left ventricular systolic pressure during the ejection period and ⟨ASP⟩ can be the mean aortic systolic pressure during the ejection period. An improved technique can include eliminating the edge portions of the ejection period, calculating the pressure gradient in the region where the instantaneous pressure gradient is more constant. This can be done by calculating the gradient of mean pressures of the central 50% of the ejection period, hence rejecting 25% of the period on both edges. Other percentages of central portions are also possible such as 30%, 40%, 60%, 70%, or 80%.

However, this technique may be sensitive to the pressure amplitude. Another technique consists normalizing the aortic stenosis index (AS) by dividing the gradient of mean pressures by the mean LVEP, as indicated by the below equation.

$$\overline{AS} = \frac{\langle LVSP \rangle - \langle ASP \rangle}{\langle LVSP \rangle} = 1 - \frac{\langle ASP \rangle}{\langle LVSP \rangle}$$

⟨LVSP⟩ can be the mean left ventricular systolic pressure during the ejection period and ⟨ASP⟩ can be the mean aortic systolic pressure during the ejection period.

At rest, it can be assumed that the total amount of blood supply is adequate, i.e., the aortic pressure during the ejection period allows adequate total perfusion. In the absence of aortic stenosis, it can be reasonable to assume that the left ventricular pressure during the ejection period might be equal to the aortic pressure in presence of the aortic stenosis. The total vascular resistance either in the presence or the absence of aortic stenosis may not change. A value of $\overline{AS}$=0.2=20% corresponds to the loss of available perfusion caused by the presence of the aortic stenosis. In a normal healthy subject without aortic stenosis, $\overline{AS}$ would be equal to 0. An equivalent to fractional flow reserve (FFR) would be to modify $\overline{AS}$ index as follow $\overline{AS}^*=1-\overline{AS}$, in which case $\overline{AS}^*$ can express the percentage of available perfusion of the stenotic valve relative to the normal valve. $\overline{AS}$ and $\overline{AS}^*$ can be calculated by taking the mean pressures over the whole ejection period, or pressures can be calculated by taking a portion of the ejection period. Another index consists in taking the maximum instantaneous gradient between LVSP and ASP within the ejection period.

ii. Aortic Regugitation Indices

Regurgitation can occur when blood leaks back through the valve. Regurgitation may be caused by valve disease or in the case of prosthetic replacement it may be caused by malapposition of the replacement valve against the native valve. The post-procedural outcome for a patient following a valve replacement can be negatively affected by valve regurgitation. Therefore, it can be important to diagnose post-TAVI valve regurgitation, and possibly pre-TAVI regurgitation for valve adjustment.

Figure 21:
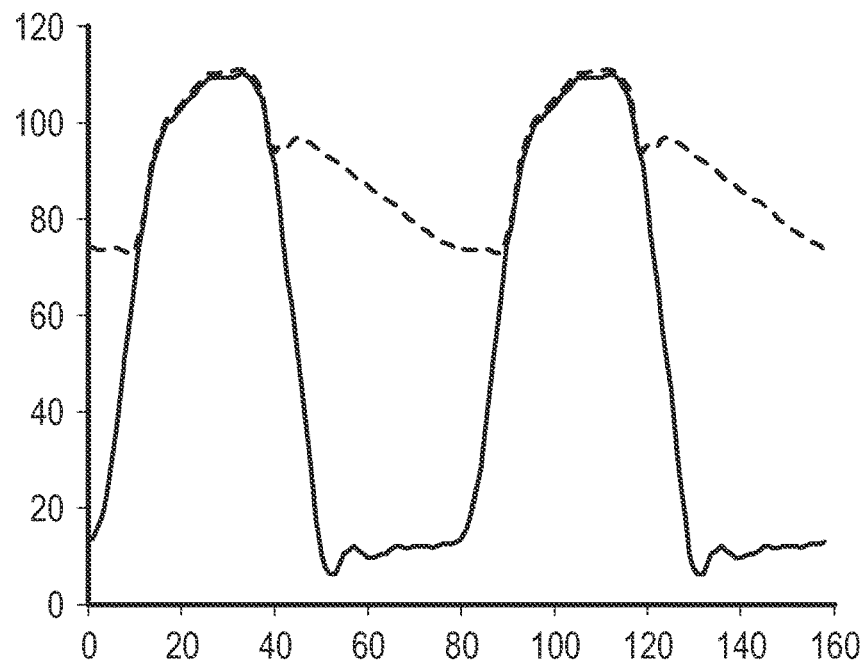
Figure 22:
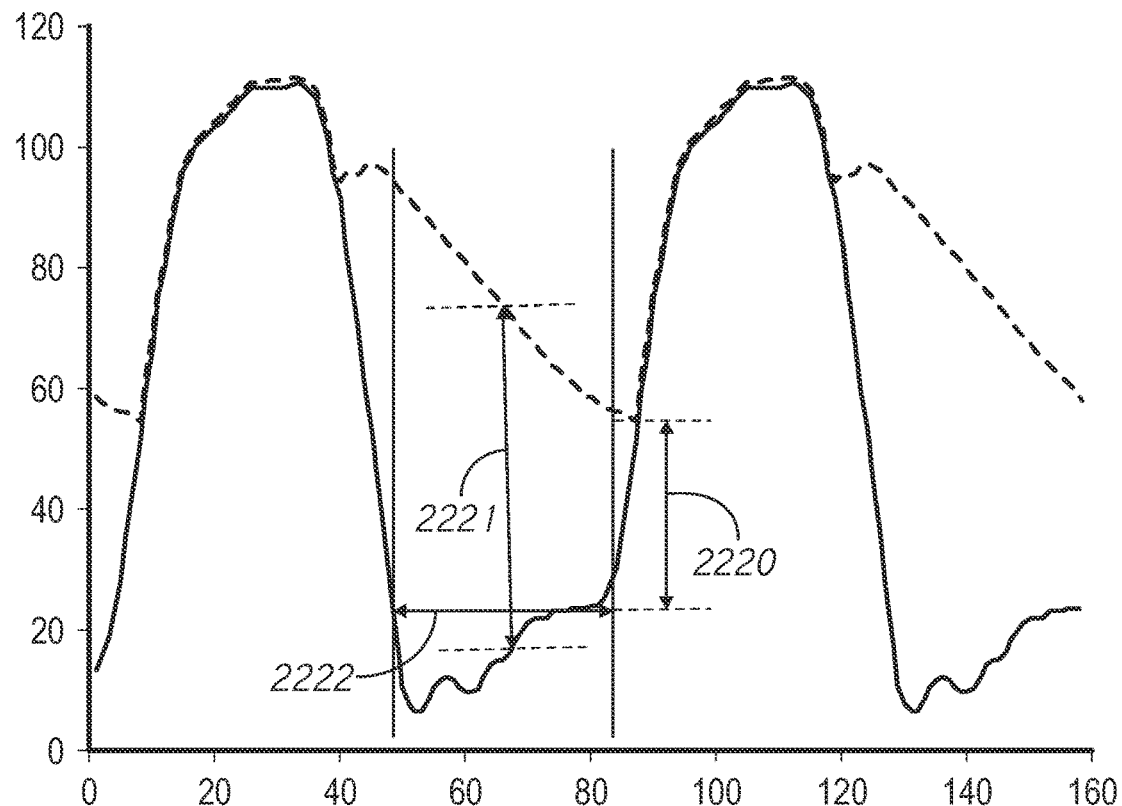

FIG. 21 illustrates the pressure waveforms of a normal healthy subject. FIG. 22 illustrates similar pressure waveforms but with aortic valve regurgitation. The blood flowing though the valve and back within the left ventricle can cause the left ventricular diastolic pressure to increase. It also can cause the aortic diastolic pressure to drop as a result of blood volume lost through the closed aortic valve. The systolic pressure can increase to compensate for the loss of available blood perfusion.

The aortic regurgitation index (AR) can consist of calculating the gradient between the end of diastolic ventricular pressure (LVEDP) and the end of diastolic aortic pressure (AEDP) 2220, normalized with the aortic systolic pressure (ASP), which is shown in the below equation.

$$AR = \frac{(LVEDP - AEDP)}{ASP}$$

Another index that may provide better stability and reproducibility consists in calculating the gradient of mean left ventricular diastolic pressure (LVDP) and mean aortic diastolic pressure (ADP) 2221, divided by the aortic systolic pressure (ASP). Another index consists of calculating the same gradient over a portion of the diastolic, for example, calculating the gradient over the period where the left ventricular pressure is below a certain value 2222, more specifically in the region where the LVDP is relatively flat. A pre-determined portion of the diastole can also be used to calculate the regurgitation index, such as for example taking 75% of the left portion of the diastole.

iii. Corrected Aortic Regurgitation Index

Figure 23:
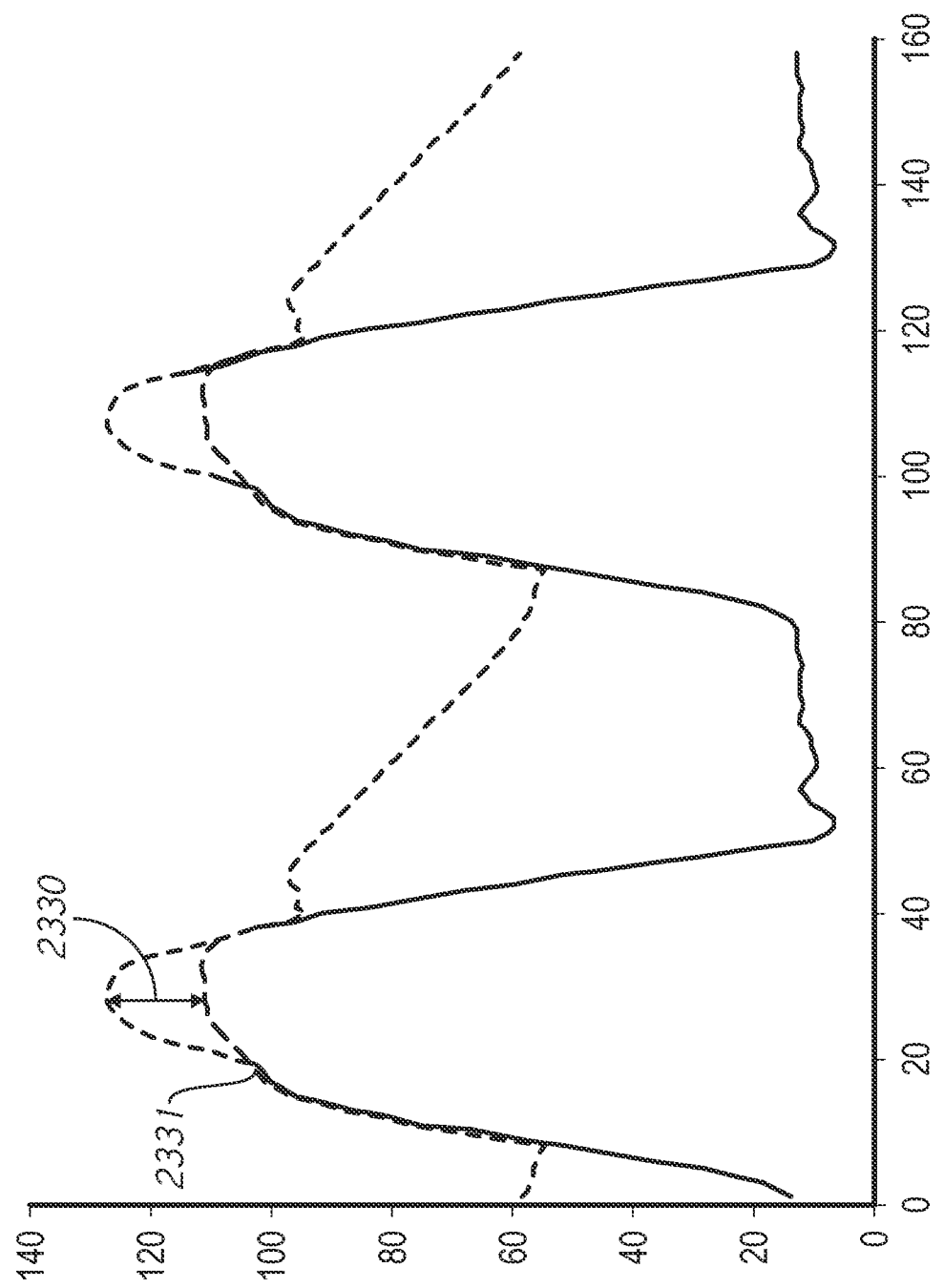

Arterial stiffness, which can be common for patients with a valve replacement, affects the pressure waveforms in a way similar to aortic regurgitation. In these cases, the above aortic regurgitation index may lead to a false determination of positive regurgitation, which in turn may lead to unnecessary valve adjustment. More specifically, arterial stiffness has the effect of increasing the systolic pressure. In FIG. 23, this pressure augmentation 2330 can be caused by reflected pressure waves from a stiffened vascular system that occurs earlier than in a normal vascular system. In a normal vascular system, reflected waves occur later, during diastole, and, therefore, there can be an increase in the early stage of diastolic pressure.

The pressure during the diastole can be sustained by the compliance of the vascular system. The extensibility of the arteries, predominantly the aorta, keeps exerting a pressure within the vascular system by retracting back toward an unsolicited state. Stiffened arteries do not have the same degree of compliance and, therefore, the arteries do not have the ability to sustain extended pressure during diastole. As the diastolic pressure drops more rapidly, so does the aortic end of diastolic pressure (AEDP) and, therefore, the aortic regurgitation is lower.

Diastolic pressure may be represented by a 2-element model that includes the vascular system compliance (C) and the total vascular resistance (R). Diastolic pressure relaxes as expressed by the below Diastolic Equation.

$$dP/dt = \left(-\frac{1}{RC}\right) \cdot P \text{ during diastole}$$

If compliance is known, the equation would allow calculating the total vascular resistance (R). Aortic end of diastolic pressure could be recalculated using a generic normal compliance along with the previously calculated total vascular resistance.

Compliance can refer to the gain in arterial volume caused by a given pressure change, as indicated by the below equation.

$$C = \frac{\Delta V}{\Delta P}$$

$\Delta V$ can be obtained by measuring the relative change in artery diameter. It can more easily be measured by measuring the left ventricular stroke volume obtained from angiographic left ventricular contour measurement difference between systole and diastole. $\Delta P$ is the aortic systolic to diastolic gradient.

Arterial stiffness can be well correlated with the augmentation pressure (AP) 2330 or inversely, compliance is well correlated with the inverse of augmentation pressure. Because augmentation pressure may be easier to implement in a clinical set-up, it may be preferred to correct the aortic regurgitation by way of the augmentation pressure. Augmentation pressure can be accompanied by a visible change in the raising portion of systole 2331, allowing the estimation of the augmentation pressure. Another method may consist in injecting nitroglycerine to the patient as it relaxes the arterial system, causing the augmentation pressure to drop. Aortic systolic pressure change caused by the nitroglycerine can give the augmentation pressure. Compliance can be estimated with relation of the form of the below Compliance Equation, or any relation f(AP) adjusting an assumed generic normal compliance $C_n$, using the augmentation pressure.

$$C = f(AP) = C_n - k \cdot AP$$

R can be calculated by applying C of the above equation into the Diastolic Equation using diastolic aortic pressure measurements. Corrected aortic diastolic pressure (CADP) is calculated using calculated R and $C_n$, back into the Compliance Equation. Corrected aortic regurgitation is calculated by replacing aortic diastolic pressure (ADP) by corrected aortic diastolic pressure (CADP), as shown in the below equation.

$$\overline{AR} = \frac{(LVDP - CADP)}{ASP}$$

Another method consists of replacing the measured aortic systolic pressure with corrected aortic systolic pressure, i.e., removing the augmentation pressure contribution from ASP. Corrected aortic regurgitation may also use mean diastolic calculations as described above rather than using end of diastolic sole pressure values.

Left ventricular diastolic elevated pressure caused by abnormal venous pressure may also lead to erroneous calculated, aortic regurgitation index. Another improved method consists in subtracting the contribution of venous pressure, or atrial pressure, from the left ventricular diastolic pressure components, as shown in the below equation.

$$\overline{AR}^* = \frac{[(LVDP - VP) - CADP]}{ASP}$$

e. Additional Pressure Sensor Calibration

As described herein, a first sensor can be calibrated against a second sensor to determine more accurate pressure measurements, which can also be referred to as equalization. For example, a pressure guidewire can be at or nearby valve location along with another pressure instrument. The other pressure instrument can be a catheter, a pigtail or other instrument used to deliver the valve and comprising a lumen connected to a pressure transducer. The pressure instrument may be another pressure guidewire or a catheter comprising a tip pressure sensor. Additional pressure instruments can include a piezoelectric sensor and/or an optical sensor. Example pressure instruments that can be equalized can be selected from, but are not limited to, a pressure guidewire, a catheter, a pigtail, a tip pressure sensor, piezoelectric sensor, and/or an optical sensor. Accordingly, example combinations of pressure instruments that can be equalized can include two pigtails, two piezo-electrics sensors, two optical sensors, and/or any other combination of pressure instruments. However, unlike some of the calibration techniques described herein where the pressure instruments are located in the same cardiovascular region for calibration purposes, other calibration techniques described herein can be performed while pressure instruments that are located in different cardiovascular regions, such as a first instrument located in the left ventricle and a second instrument located in the aorta. As described herein, calibration of the pressure instruments while the instruments are located in different cardiovascular regions in the heart can be accomplished by detecting one or more features from the pressure waveforms. In particular, the detected one or more features in the pressure waveforms can be used to perform a time adjustment and/or a gain adjustment to a pressure waveform for purposes of equalization.

The systems and methods described herein for pressure sensor calibration while the pressure instruments are in different locations can improve the efficiency of pressure readings. For example, as mentioned above, pressure calibration can occur when the pressure instruments are positioned in the same cardiovascular region. However, ensuring that both pressure instruments are positioned in the same cardiovascular region can add an additional step to a heart procedure. The techniques described herein related to calibrating with a time adjustment and/or a gain adjustment from waveform features can advantageously occur while the pressure instruments are in the different locations as necessitated by a heart procedure. Therefore, the systems and methods described herein for calibration while the pressure instruments are in the different locations can improve pressure instrument technology by being able to provide more accurate pressure readings without adding an additional step to a heart procedure.

An aortic pressure waveform can be different than a ventricular pressure waveform. For example, with respect to FIG. 20 described above, the aortic pressure can start to increase at the beginning of a systolic phase, as shown by the aortic pressure waveform 2011. In particular, the aortic pressure can start to increase when the aortic valve opens at the beginning of the time period 2012 where the aortic valve is open. The aortic pressure waveform 2011 increases until it reaches at least a local maximum in the time period 2012, which is the systolic pressure, and then abruptly decreases until it reaches the dicrotic notch at the end of the time period 2012. The dicrotic notch represents the moment when the aortic valve closes. Those two moments, when the aortic valve opens and closes, can be useful for equalization because they can represent the only points where the ventricular pressure and the aortic pressure may be equal. Those two moments, the aortic valve opening and closing, can generally correspond to the beginning and ending of the time period 2012, respectively. The left ventricular pressure waveform 2010 can cross the aortic pressure waveform 2011 at the beginning and ending of the time period 2012

Figure 24:
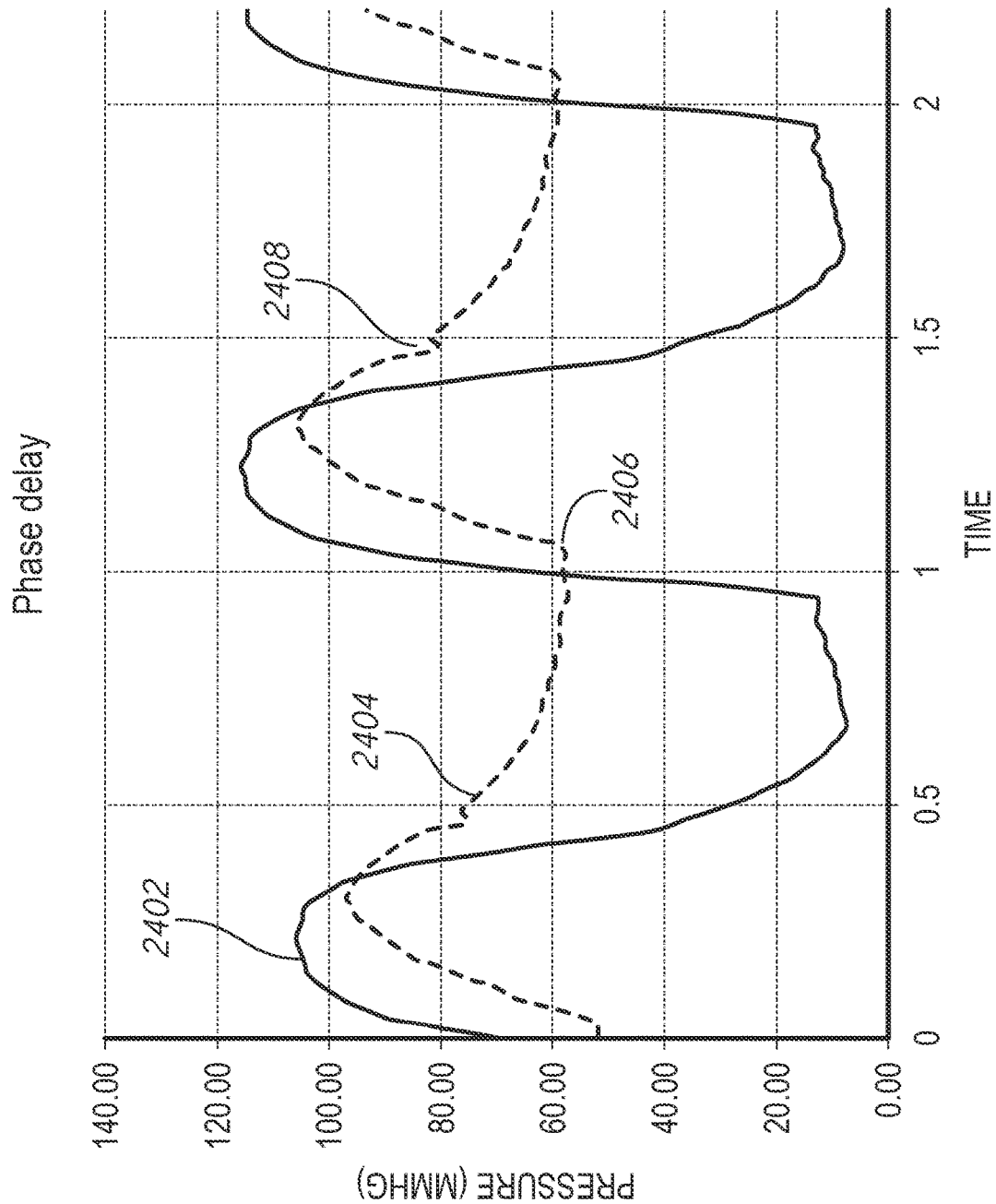

In FIG. 24, pressure waveforms are depicted that can include phase delay. In particular, a left ventricular pressure waveform 2402 and aortic pressure waveform 2404 are depicted. In contrast to the crossings of the left ventricular pressure waveform 2010 and the aortic pressure waveform 2011 in FIG. 20, the left ventricular pressure waveform 2402 can cross the aortic pressure waveform 2042 in FIG. 24 at different moments with respect to the features of the aortic pressure waveform 2042. In particular, in FIG. 24, the left ventricular pressure waveform 2402 does not cross the aortic pressure waveform 2042 at the time of the valve opening 2406 or at the time of the dicrotic notch 2408. The calibration techniques described herein can be applied to the pressure waveforms 2402, 2404 of FIG. 24. In particular, time adjustment can be applied to the pressure waveform(s) of FIG. 24.

Figure 25:
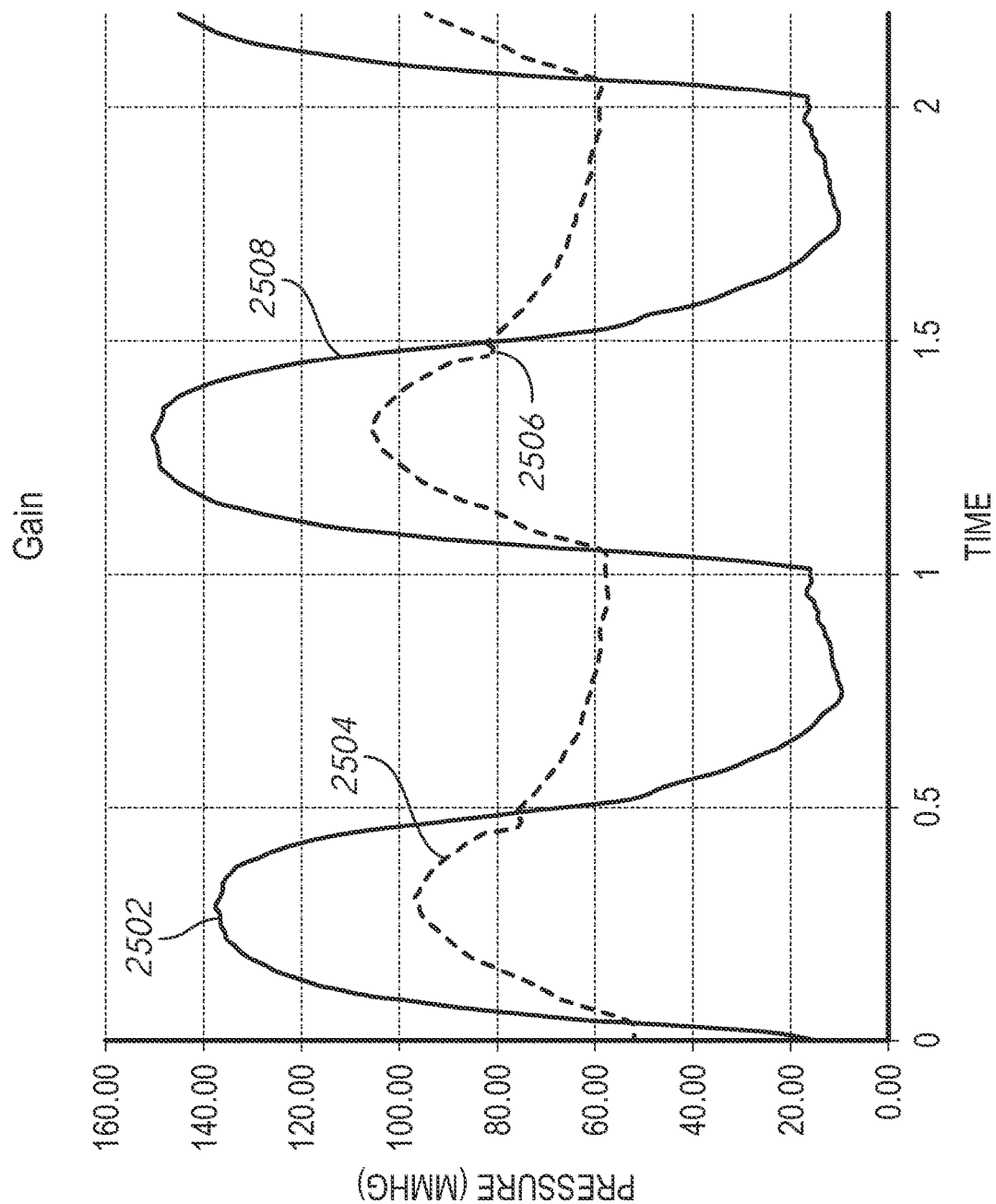

In FIG. 25, pressure waveforms are depicted that can include gain error. In particular, a left ventricular pressure waveform 2502 and aortic pressure waveform 2504 are depicted. In the pressure waveforms of FIG. 25, an error of gain can be present, which can cause amplitude variation. For example, the left ventricular pressure waveform 2502 can include gain error of approximately 1.3, which can cause a widening of the point where the left ventricular pressure waveform 2502 crosses the aortic pressure waveform 2504. In particular, the pressure value 2508 of the left ventricular pressure waveform 2502 can be higher than the pressure value 2506 of the aortic pressure waveform 2504 at the dicrotic notch feature of the aortic pressure waveform 2504. In other examples, if gain is less than one, then the crossing points would be closer together (not illustrated). The calibration techniques described herein can be applied to the pressure waveforms 2502, 2504 of FIG. 25. In particular, gain adjustment can be applied to the pressure waveform(s) of FIG. 25.

Figure 26:
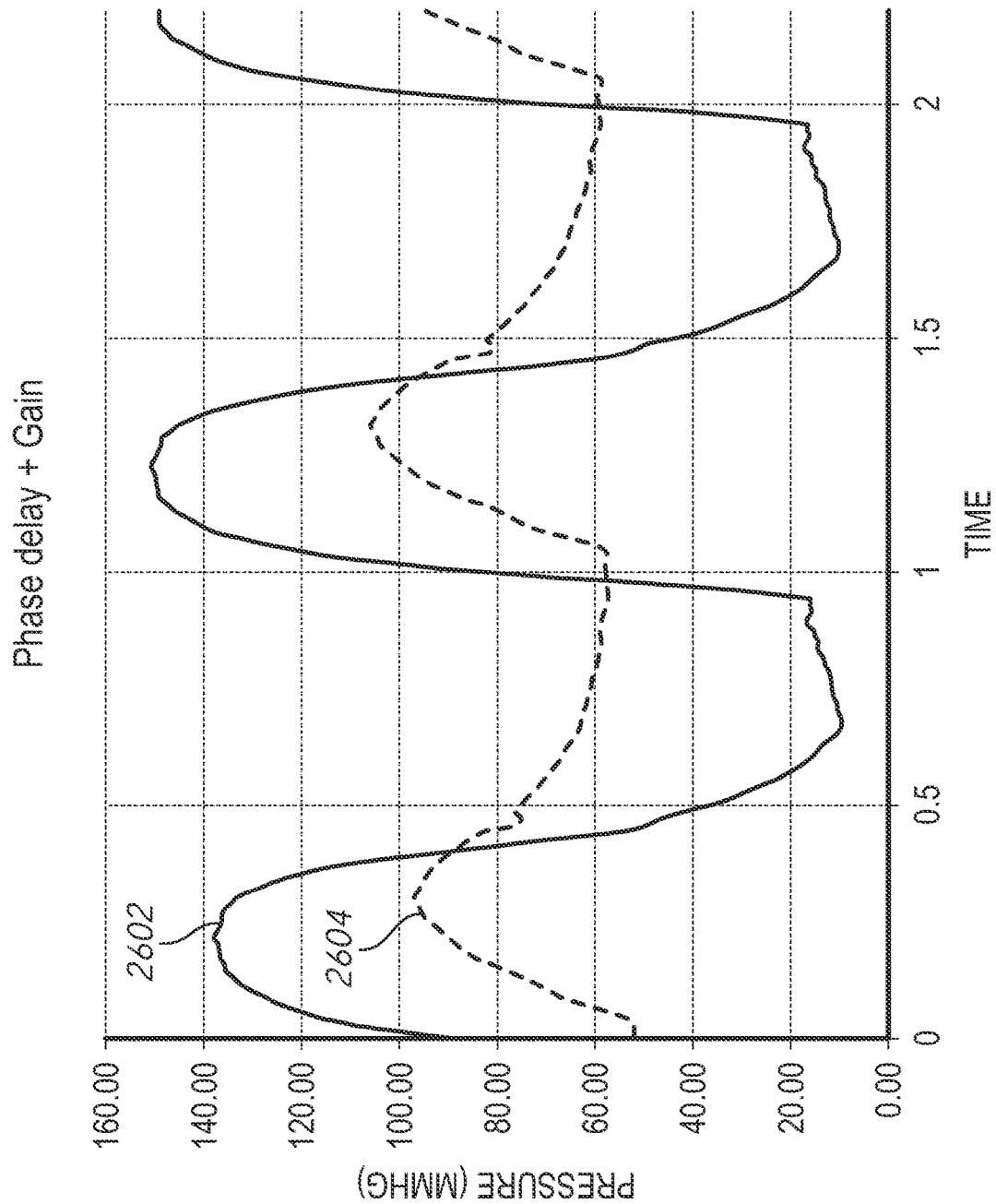

In FIG. 26, pressure waveforms are depicted that can include phase delay and gain error. In particular, a left ventricular pressure waveform 2602 and aortic pressure waveform 2604 are depicted. The calibration techniques described herein can be applied to the pressure waveforms 2602, 2604 of FIG. 26. In particular, time adjustment and/or gain adjustment can be applied to the pressure waveform(s) of FIG. 26.

Figure 27:
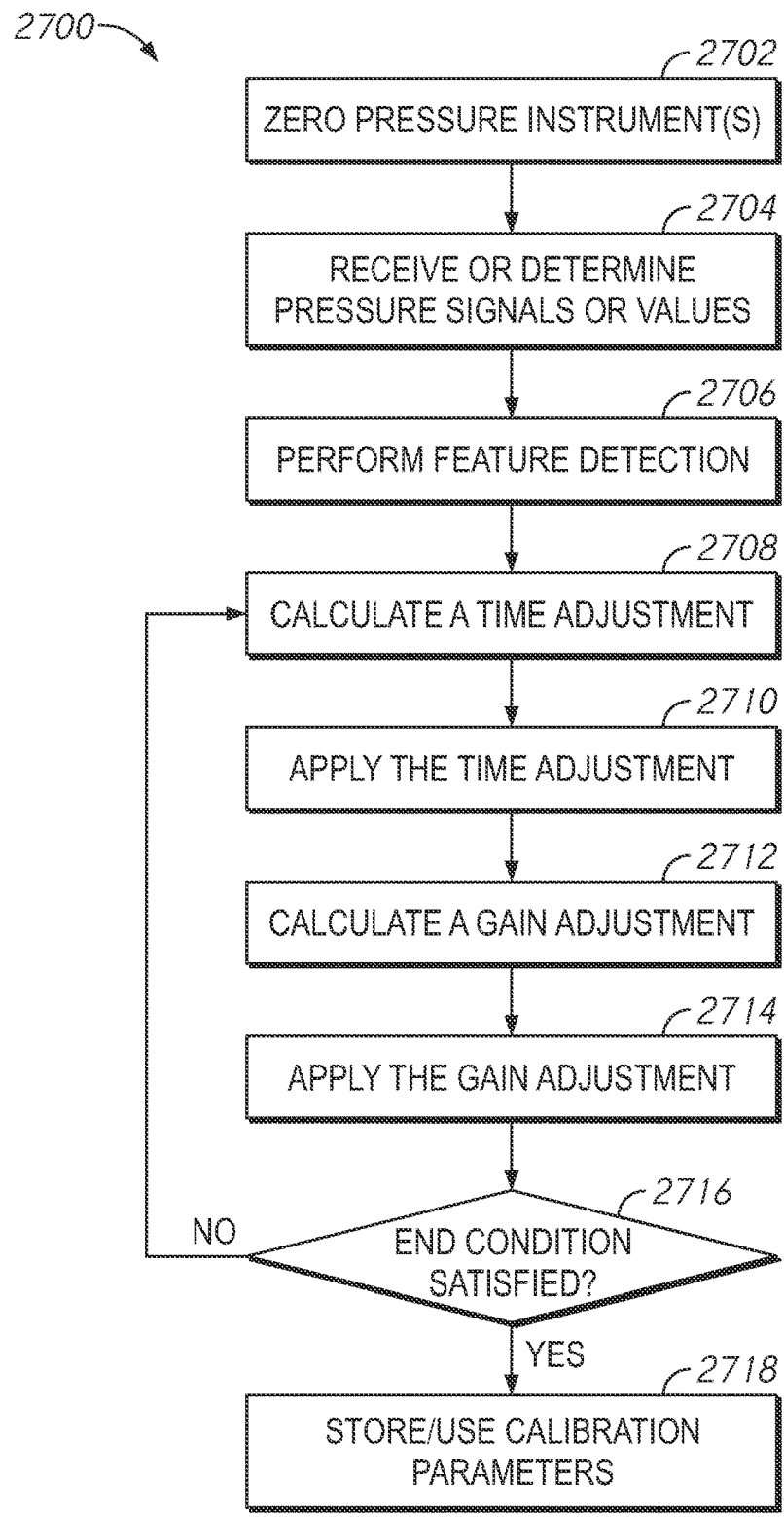
FIG. 27 is a flowchart of another calibration process.

In FIG. 27, another example calibration process 2700 is shown. Although the process 2700 is described in conjunction with a heart valve assessment system, such as the system 200 of FIG. 2A or the system 1400 of FIG. 14, any system configured to perform the process, in any order, is within the scope of this disclosure. The process 2700 may be performed by the various components of the system of FIG. 2A as discussed herein, including the monitor 204, or the system 1400 of FIG. 14. Depending on the embodiment, the process 2700 may include fewer or additional blocks and/or the blocks may be performed in an order different than is illustrated. Other embodiments of the process 2700 may include less blocks than illustrated or the blocks may be performed in a different order than as illustrated.

In some embodiments, one set of pressure values can be from a pressure sensor (such as a pressure fluid filled line) positioned in a left ventricle and another set of pressure values can be from a different pressure sensor (such as a pressure guidewire) positioned in the aorta. Moreover, in some embodiments, the heart valve assessment system 1400 can adjust the pressure values for the left ventricle based on the output of the calibration process 2700. In some cases, a pressure fluid filled line have a relatively greater delay compared to a pressure guidewire due to the pressure propagation time in the fluid filed line. Accordingly, it may be advantageous to adjust the left ventricle pressure instead of the aorta pressure. As described herein, multiple options are possible. For example, additionally or alternatively, the heart valve assessment system 1400 can adjust the pressure values for the aorta based on the output of the calibration process 2700.

Beginning at block 2702, pressure instrument(s) can be zeroed. In particular, the heart valve assessment system 1400 can zero one or more pressure instruments. As used herein, "zeroing" can refer to the process by which external pressures, such as atmospheric pressure, on the system 1400 can be negated. The system 1400 can zero the one or more pressure instruments to exclude other pressure signals other than the actual pressures from the patient. Zeroing can result in more accurate data on which to base treatment/operation decisions.

At block 2704, pressure values or signals can be received or determined. In particular, the heart valve assessment system 1400 can receive pressure signals from a pressure sensor, such as a pressure guidewire 208, a pressure sensing access catheter 20, a pressure sensing pigtail catheter 10, a tip pressure sensor, a piezoelectric sensor, and/or an optical sensor. The heart valve assessment system 1400 can determine a first set of pressure values and a second set of pressure values from received pressure signals. Each pressure value from the first set pressure values can correspond to a first signal received from a first pressure sensor measuring a first cardiovascular region. Each pressure value from the second set of pressure values can correspond to a second signal received from a second pressure sensor measuring a second cardiovascular region that is different from the first cardiovascular region. For example, the first pressure sensor can be positioned in the first portion of the heart and the second pressure sensor is positioned in the cardiovascular region adjacent to the first portion of the heart. The heart valve assessment system 1400 can determine first and second sets of pressure values from first and second sensors, respectively. The present block 2704 for receiving pressure values or signals can be similar to the block 1502 of FIG. 15 for receiving pressure values or signals.

At block 2706, feature detection can be performed. The feature detection service 1412 can perform feature detection. Example features that can be detected from a pressure waveform can include a systolic phase, a diastolic phase, a dicrotic notch, the end of diastole, and/or the beginning of systole. The feature detection service 1412 can identify features in the example pressure waveforms of FIGS. 24-26. In particular, the feature detection service 1412 can determine a substantially beginning of a systolic phase in a set of pressure values. As another example, the feature detection service 1412 can determine a dicrotic notch feature in a set of pressure values. Additional details regarding feature detection are described in further detail above with respect to process 1900 of FIG. 19. The present block 2706 for performing feature detection can be similar to the block 1508 of FIG. 15 for performing feature detection.

In some embodiments, the feature detection service 1412 can perform feature detection by applying one or more threshold(s). In some pressure waveforms, the valve opening crossing point may not be completely at the beginning of the systole, but slightly later or before. For example, the pressure required to open a highly calcified leaflet may delay the pressure transmission in the aorta leading to a flatter aortic pressure curve, which can change the crossing point. For example, the feature detection service 1412 can identify a substantially beginning of a systolic phase within a percentage of a heartbeat period before or after an end of a diastolic phase in a set of pressure values. As another example, the feature detection service 1412 can identify a timestamp corresponding to the dicrotic notch feature where the timestamp can be within a percentage of a heartbeat period before or after the dicrotic notch in a set of pressure values. Example threshold percentages can include between approximately 0 percent and 1 percent, 0 percent and 2 percent, 0 percent and 5 percent, and 0 percent and 10 percent of the heartbeat period.

At block 2708, a time adjustment can be calculated. In particular, the calibration service 1408 can calculate a time adjustment. The calibration service 1408 can calculate a time adjustment that causes a set of pressure values to cross a base set of pressure values at the substantially beginning of the systolic phase in the base set of pressure values. For example, in the context of the pressure waveforms of FIG. 24, the calibration service 1408 can calculate a time adjustment that causes the left ventricular pressure waveform 2402 to cross the aortic pressure waveform 2404 at the time of the substantially beginning of the systolic phase/the valve opening 2406. An example time adjustment can be a time value in a unit of time, such as a millisecond or a second. At block 2710 the time adjustment can be applied. In particular, the calibration service 1408 can apply the time adjustment to a set of pressure values such that a value from the set of pressure values corresponds to the value at the substantially beginning of the systolic phase in the base set of pressure values.

At block 2712, a gain adjustment can be calculated. In particular, the calibration service 1408 can calculate a gain adjustment. The calibration service 1408 can measure the pressure difference at the dicrotic notch position and calculate the gain correction needed. In particular, the calibration service 1408 can use the detected dicrotic notch feature in a base set of pressure values. The calibration service 1408 can identify a timestamp corresponding to the dicrotic notch feature and determine, from the base set of pressure values, a first value at the timestamp. The calibration service 1408 can further determine, from another set of pressure values, a second value at the timestamp. Where first value corresponds to $V_1$, the second value corresponds to $V_2$, and the gain adjustment can include g, an example equation to calculate the gain adjustment can include a determining relationship substantially as:

$$g = \frac{V_1}{V_2}.$$

For example, in the context of the pressure waveforms of FIG. 25, calibration service 1408 can calculate the gain adjustment from the pressure value 2506 of the aortic pressure waveform 2504 divided by the pressure value 2508 of the left ventricular pressure waveform 2502 (i.e., $Gain_{correction} = Ao_{Dicrotic}/Lv_{Dicrotic}$).

At block 2714, the gain adjustment can be applied. In particular, the calibration service 1408 can apply the gain adjustment to a set of pressure values to achieve a gain correction. In some embodiments, the calibration service 1408 can multiply the gain adjustment to each value form a set of pressure values to modify the amplitude of the pressure values.

A block 2716, it can be determined whether an end condition for the calibration process 2700 has been satisfied. In particular, the calibration service 1408 can determine whether an end condition has been satisfied. An example end condition can include a determination whether the crossing point(s) for a set of pressure values is within a threshold of a base set of pressure values at one or more detected features. For example, the calibration service 1408 can determine that the crossing from a left ventricle pressure waveform is within a threshold from the substantially beginning of the systolic phase in the aortic pressure values. As another example, the calibration service 1408 can determine that the crossing from a left ventricle pressure waveform is within a threshold from the dicrotic notch feature in aortic pressure values. If the condition is not satisfied, the process can return to the previous blocks 2708, 2710, 2712, 2714 to recalculate and apply the calibration parameters such as the time adjustment and/or the gain adjustment. Thus, the calibration service 1408 can operate in a loop until the end condition is satisfied. For example, the calibration service 1408 can operate in a loop until, in some embodiments, the pressure waveform crossings match a valve opening as indicated by features in a pressure waveform. If the end condition is satisfied, the process continues to block 2718.

At block 2718, the determined calibration parameter(s) can be stored and/or used. In particular, the calibration service 1408 can store and/or use the time adjustment and/or the gain adjustment. For example, the calibration service 1408 apply the time adjustment and/or the gain adjustment to a set pressure values and/or signals that are received from pressure instruments after calibration has been completed.

Implementation Mechanisms

Figure 28:
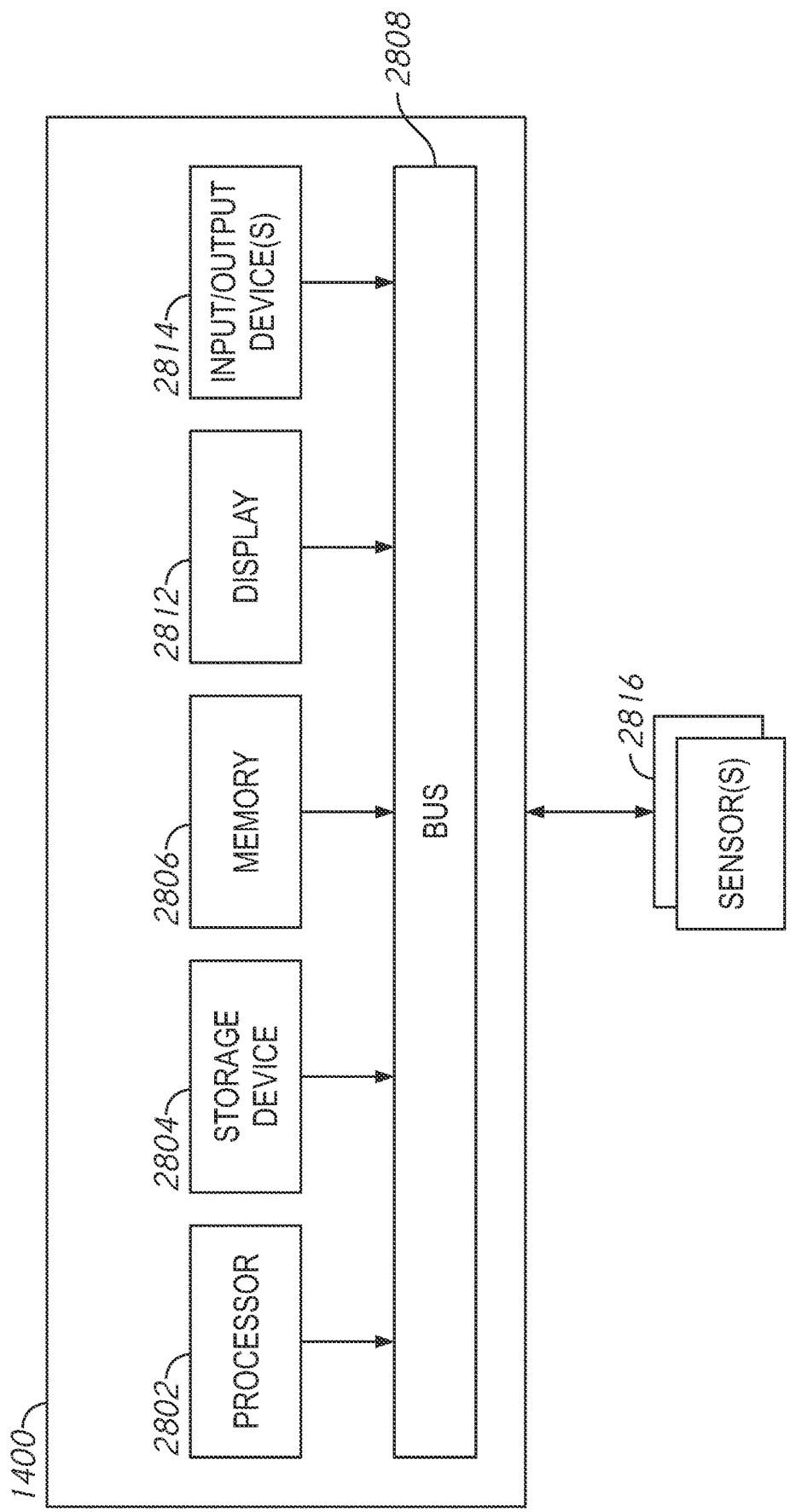
FIG. 28 is another diagram of the heart valve assessment system with which various methods and systems discussed herein may be implemented.

FIG. 28 is a block diagram that illustrates example components of the heart valve assessment system 1400. While the heart valve assessment system 1400 of FIG. 28 is depicted as a single device, the heart valve assessment system 1400 may be implemented in a server cluster, server farm, data center, mainframe, cloud computing environment, or the like. The heart valve assessment system 1400 can include any number of devices that operate as distributed computing resources that provides services, such as storage, computing, networking, and so on.

The heart valve assessment system 1400 can include a hardware processor 2802, a data storage device 2804, a memory device 2806, a bus 2808, a display 2812, and one or more input/output devices 2814. A processor 2802 can also be implemented as a combination of computing devices, e.g., a combination of a digital signal processor and a microprocessor, a plurality of microprocessors, one or more microprocessors in conjunction with a digital signal processor, or any other such configuration. The processor 2802 can be configured, among other things, to process data or to execute instructions to perform one or more functions. The data storage device 2804 can include a magnetic disk, optical disk, or flash drive, etc., and may be provided and coupled to the bus 2808 for storing information and instructions. The memory 2806 can include one or more memory devices that store data, including without limitation, random access memory (RAM) and read-only memory (ROM). The heart valve assessment system 1400 may be coupled via the bus 2808 to a display 2812, such as a LCD display or touch screen, for displaying information to a user, such as a patient. The heart valve assessment system 1400 may be coupled via the bus 2808 to one or more input/output devices 2814. The input device 2814 can include, but is not limited to, a keyboard, mouse, digital pen, microphone, touch screen, gesture recognition system, voice recognition system, imaging device (which may capture eye, hand, head, or body tracking data and/or placement), gamepad, accelerometer, or gyroscope.

The heart valve assessment system 1400 can include one or more software engines (or services) for performing the processes and functions described herein. The software engines can include programming instructions for performing processes as discussed herein (and illustrated in flowcharts) for detection of input conditions, such as pressure signals and generation of output conditions, such as heart valve condition. The engines can be executed by the one or more hardware processors 2802. The programming instructions can be stored in the data storage device 2804 and/or loaded into the memory 2806. The programming instructions can be implemented in C, C++, JAVA, or any other suitable programming languages. In some embodiments, some or all of the portions of the heart valve assessment system 1400 including the engines can be implemented in hardware processors of application specific circuitry such as ASICs and FPGAs. Some aspects of the functionality of the heart valve assessment system 1400 can be executed remotely on a server (not shown) over a network. Furthermore, some aspects of the functionality of the heart valve assessment system 1400 can be executed in one or more sensors or external devices.

The heart valve assessment system 1400 can be in communication with one or more sensor devices 2816 as described herein, such as a pressure guidewire 208, a pressure sensing access catheter 20, or a pressure sensing pigtail catheter 10.

Terminology

As used herein, the relative terms "proximal" and "distal" shall be defined from the perspective of the user of the system. Thus, proximal refers to the direction toward the user of the system and distal refers to the direction away from the user of the system.

As used herein, the relative terms "upstream" and "downstream" shall be defined from the perspective of blood flow. Thus, downstream refers to the direction toward the aorta relative to the left ventricle.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms "approximately," "about," "generally," and "substantially" as used herein represent an amount close to the stated amount that still performs a desired function or achieves a desired result. For example, the terms "approximately," "about," "generally," and "substantially" may refer to an amount that is within less than 5% of the stated amount, as the context may dictate.

The ranges disclosed herein also encompass any and all overlap, sub-ranges, and combinations thereof. Language such as "up to," "at least," "greater than," "less than," "between" and the like includes the number recited. Numbers preceded by a term such as "about" or "approximately" include the recited numbers. For example, "about four" includes "four."

Any methods disclosed herein need not be performed in the order recited. The methods disclosed herein include certain actions taken by a practitioner; however, they can also include any third-party instruction of those actions, either expressly or by implication. For example, actions such as "distally moving a locking element" include "instructing distal movement of the locking element."

Although certain embodiments and examples have been described herein, it will be understood by those skilled in the art that many aspects of the humeral assemblies shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

What is claimed is:

1. A system comprising:
   a pressure guidewire comprising:
      an outer tube,
      a core wire, and
      a first pressure sensor, wherein the first pressure sensor is positioned radially between a reduced diameter portion of the core wire and a coil portion of the outer tube;
   a second pressure sensing device comprising a second pressure sensor;
   a non-transitory computer storage medium configured to at least store computer-executable instructions; and
   one or more hardware processors in communication with the non-transitory computer storage medium, the one or more hardware processors configured to execute the computer-executable instructions to at least:
      calibrate the second pressure sensor relative to the first pressure sensor while (i) the first pressure sensor is positioned in a first portion of a heart and (ii) the second pressure sensor is positioned in a cardiovascular region adjacent to the first portion of the heart, wherein to calibrate the second pressure sensor relative to the first pressure sensor further comprises:
         determine a first plurality of pressure values from the first pressure sensor positioned in the first portion of the heart;
         determine a second plurality of pressure values from the second pressure sensor in the cardiovascular region adjacent to the first portion of the heart;
         detect a dicrotic notch feature in the first plurality of pressure values;
         identify a timestamp corresponding to the dicrotic notch feature;
         determine, from the first plurality of pressure values, a first value at the timestamp;
         determine, from the second plurality of pressure values, a second value at the timestamp; and
         determine a gain adjustment based at least in part on the first value and the second value;
      determine a third plurality of pressure values from the first pressure sensor positioned in the first portion of the heart;
      determine a fourth plurality of pressure values from the second pressure sensor positioned in the cardiovascular region adjacent to the first portion of the heart, wherein to determine the fourth plurality of pressure values further comprises:
         apply the gain adjustment to an initial plurality of pressure values from the second pressure sensor;
      detect a first feature in the third plurality of pressure values;
      detect a second feature in the fourth plurality of pressure values;
      determine a heart valve condition based at least in part on the first feature and the second feature; and
      display the heart valve condition on a user interface.

2. The system of claim 1, wherein to calibrate the second pressure sensor relative to the first pressure sensor further comprises:
   a detect a value at a substantially beginning of a systolic phase in the first plurality of pressure values;
   determine a time adjustment to the second plurality of pressure values such that a value from the second plurality of pressure values corresponds to the value at the substantially beginning of the systolic phase in the first plurality of pressure values, wherein to apply the gain adjustment further comprises:
   apply the time adjustment and the gain adjustment to the initial plurality of pressure values.

3. The system of claim 1, wherein to identify the timestamp corresponding to the dicrotic notch feature further comprises:
   identify the timestamp within a percentage of a heartbeat period before or after the dicrotic notch feature in the first plurality of pressure values.

4. The system of claim 1, wherein the first value corresponds to $V_1$, the second value corresponds to $V_2$, the gain adjustment comprises g, and wherein to determine the gain adjustment further comprises a determining relationship substantially as:

$$g=V_1/V_2.$$

5. The system of claim 1, wherein the first feature comprises at least one of a systolic phase or a diastolic phase in the third plurality of pressure values.

6. A system comprising:
   a pressure guidewire comprising:
      an outer tube,
      a connector tube positioned radially inward of the outer tube, a core wire positioned radially inward of the outer tube, and a pressure sensor assembly comprising a first pressure sensor and a pressure wire lead extending from the first pressure sensor toward a proximal end of the pressure guidewire, the first pressure sensor being distal of a distal end of the connector tube;

a second pressure sensing device comprising a second pressure sensor; and one or more hardware processors configured to at least:
calibrate one of the first pressure sensor or the second pressure sensor relative to the other one of the first pressure sensor or the second pressure sensor while (i) the first pressure sensor is positioned in a first portion of a heart and (ii) the second pressure sensor is positioned in a cardiovascular region adjacent to the first portion of the heart, wherein to calibrate the second pressure sensor relative to the first pressure sensor further comprises:
determine a first plurality of pressure values from one of the first pressure sensor or the second pressure sensor;
determine a second plurality of pressure values from the other one of the first pressure sensor or the second pressure sensor;
detect a first dicrotic notch feature in the first plurality of pressure values;
identify a timestamp corresponding to the dicrotic notch feature;
determine, from the first plurality of pressure values, a first value at the timestamp;
determine, from the second plurality of pressure values, a second value at the timestamp; and
determine a gain adjustment based at least in part on the first value and the second value;
determine a third plurality of pressure values from one of the first pressure sensor or the second pressure sensor;
determine a fourth plurality of pressure values from the other one of the first pressure sensor or the second pressure sensor, wherein to determine the fourth plurality of pressure values further comprises:
apply the gain adjustment to an initial plurality of pressure values from the other one of the first pressure sensor or the second pressure sensor;
detect a first feature in the third plurality of pressure values;
detect a second feature in the fourth plurality of pressure values;
determine a heart valve condition based at least in part on the first feature and the second feature; and
display the heart valve condition on a user interface.

7. The system of claim 6, wherein to calibrate one of the first pressure sensor or the second pressure sensor further comprises:
detect a value at a substantially beginning of a systolic phase in the first plurality of pressure values;
determine a time adjustment to the second plurality of pressure values such that a value from the second plurality of pressure values corresponds to the value at the substantially beginning of the systolic phase in the first plurality of pressure values, wherein to apply the gain adjustment further comprises:
apply the time adjustment and the gain adjustment to the initial plurality of pressure values.

8. The system of claim 6, wherein to identify the timestamp corresponding to the first dicrotic notch feature further comprises:
identify the timestamp within a percentage of a heartbeat period before or after the first dicrotic notch feature in the first plurality of pressure values.

9. The system of claim 6, wherein the first value corresponds to $V_1$, the second value corresponds to $V_2$, the gain adjustment comprises g, and wherein to determine the gain adjustment further comprises a determining relationship substantially as:

$$g = V_1/V_2.$$

10. The system of claim 6, wherein the first feature comprises at least one of a systolic phase or a first diastolic phase in the third plurality of pressure values.

11. The system of claim 6, wherein to detect the first dicrotic notch feature further comprises:
calculate a plurality of second derivative values from the first plurality of pressure values; and
identify a point of zero crossing based at least in part on the plurality of second derivative values, wherein the point of zero crossing corresponds to the first dicrotic notch feature.

12. The system of claim 6, wherein to detect the first dicrotic notch feature further comprises:
calculate, from the first plurality of pressure values, a first angle for a first point based at least in part on a first preceding point and a first following point;
calculate, from the first plurality of pressure values, a second angle for a second point based at least in part on a second preceding point and a second following point;
determine that the second angle is less than the first angle; and
identify the second point as the first dicrotic notch feature.

13. The system of claim 6, wherein the first feature comprises at least one of a systolic phase or a diastolic phase in the third plurality of pressure values, wherein to detect the at least one of the systolic phase or the diastolic phase further comprises:
identify a first subset of rising pressure values from the third plurality of pressure values;
identify a local minimum pressure value from the third plurality of pressure values;
determine a tangent from the first subset;
identify a horizontal line intersecting the local minimum pressure value;
identify a first intersection between the tangent and the horizontal line; and
identify a first point from the third plurality of pressure values as an end of the diastolic phase or a beginning of the first systolic phase based at least in part on the first intersection.

* * * * *